(12) United States Patent
MacDougall

(10) Patent No.: US 11,330,768 B2
(45) Date of Patent: *May 17, 2022

(54) SYSTEMS AND METHODS FOR PRODUCING RAIN CLOUDS

(71) Applicant: Frederick William MacDougall, San Diego, CA (US)

(72) Inventor: Frederick William MacDougall, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,453

(22) Filed: Jun. 7, 2021

(65) Prior Publication Data

US 2021/0289720 A1    Sep. 23, 2021

Related U.S. Application Data

(63) Continuation of application No. 17/100,585, filed on Nov. 20, 2020, now Pat. No. 11,026,375.

(60) Provisional application No. 62/939,136, filed on Nov. 22, 2019.

(51) Int. Cl.
*A01G 15/00* (2006.01)
*B64D 1/16* (2006.01)
*B05B 9/00* (2006.01)

(52) U.S. Cl.
CPC .............. *A01G 15/00* (2013.01); *B05B 9/002* (2013.01); *B64D 1/16* (2013.01)

(58) Field of Classification Search
CPC . A01G 15/00; B64D 1/00; B64D 1/16; B64D 1/18; B05B 9/002
USPC .......................... 239/2.1, 14.1, 135, 136, 171
See application file for complete search history.

(56) References Cited

U.S. PATENT DOCUMENTS

| | | | |
|---|---|---|---|
| 1,945,328 A | 1/1934 | Perkins |
| 1,993,635 A | 3/1935 | Towt |
| 2,776,167 A | 1/1957 | Koch |
| 3,135,466 A | 6/1964 | Reid |
| 3,489,072 A | 1/1970 | Secor |
| 3,969,842 A | 7/1976 | Velie |
| 5,295,625 A | 3/1994 | Redford |
| 5,322,219 A | 6/1994 | Esplin |
| 5,492,274 A | 2/1996 | Assaf |
| 6,315,213 B1 | 11/2001 | Cordani |
| 7,924,545 B2 | 4/2011 | Fluhrer |
| 8,166,710 B2 | 5/2012 | Chan |
| 8,823,197 B2 | 9/2014 | Klinkman |

(Continued)

FOREIGN PATENT DOCUMENTS

| | | |
|---|---|---|
| CN | 101892649 | 11/2010 |
| CN | 105075759 | 11/2015 |

(Continued)

OTHER PUBLICATIONS

Anthony Watts, Ship sprayed seawater cloud making V2.0, [retrieved from the internet on Jan. 4, 2021] https://wattsupwiththat.com/2012/08/20/ship-sprayed-seawater-cloud-making-v2-0/; Aug. 20, 2012, 35 pages.

(Continued)

*Primary Examiner* — Steven J Ganey
(74) *Attorney, Agent, or Firm* — Esplin & Associates, PC

(57) ABSTRACT

Systems and methods are described for generating low altitude clouds saturated with moisture above bodies of water including oceans, lakes, reservoirs, and rivers to generate rain down wind of the location of rain cloud generation.

20 Claims, 38 Drawing Sheets

(56) References Cited

U.S. PATENT DOCUMENTS

| | | | |
|---|---|---|---|
| 9,097,241 B1 | 8/2015 | Hollick | |
| 9,399,506 B2* | 7/2016 | Cunningham | B64B 1/66 |
| 10,006,443 B1* | 6/2018 | Vorobieff | F03G 6/045 |
| 11,026,375 B1 | 6/2021 | Macdougall | |
| 2012/0241554 A1 | 9/2012 | Davidson | |
| 2019/0000021 A1 | 1/2019 | Huang | |

FOREIGN PATENT DOCUMENTS

| | | |
|---|---|---|
| DE | 2434434 | 6/1975 |
| DE | 3737794 | 5/1989 |
| FR | 2351585 | 12/1977 |
| FR | 2366789 | 5/1978 |
| JP | 09313051 | 12/1997 |
| JP | 11196688 | 7/1999 |
| JP | 2005224151 | 8/2005 |
| JP | 2007104904 | 4/2007 |
| JP | 2011024548 | 2/2011 |
| KR | 1020070066549 | 6/2007 |
| KR | 20160017171 | 2/2016 |
| RU | 2129354 | 4/1999 |
| RU | 2234831 | 8/2004 |
| WO | 2005118961 | 12/2005 |
| WO | 2018009051 | 1/2018 |

OTHER PUBLICATIONS

Dr Daniel Harrison, Scientists trial world-first 'cloud brightening' technique to protect corals [retrieved from the internet on Jan. 4, 2021] https://www.scu.edu.au/engage/news/latest-news/2020/scientists-trial-world-first-cloud-brightening-technique-to-protect-corals.php; Published Apr. 17, 2020; 3 pgs.

John Latham, et al., Marine cloud brightening, Phil. Trans. R. Soc. A 2012 370, 4217-4262.

Lisa M. Krieger, Cloud brightening experiment tests tool to slow climate change, Bay Area News, Jul. 11, 2015 (https://www.mercurynews.com/2015/07/11/cloud-brightening-experiment-tests-tool-to-slow-climate-change/) 6 pages.

PCT International Search Report and Written Opinion, International Application No. PCT/US2020/061624, dated Feb. 12, 2021, 15 pages.

Stephen Salter, Spray Turbines To Increase Rain By Enhanced Evaporation From the Sea, tenth Congress of International Maritime Association of the Mediterranean, May 2002, 10 pgs.

* cited by examiner

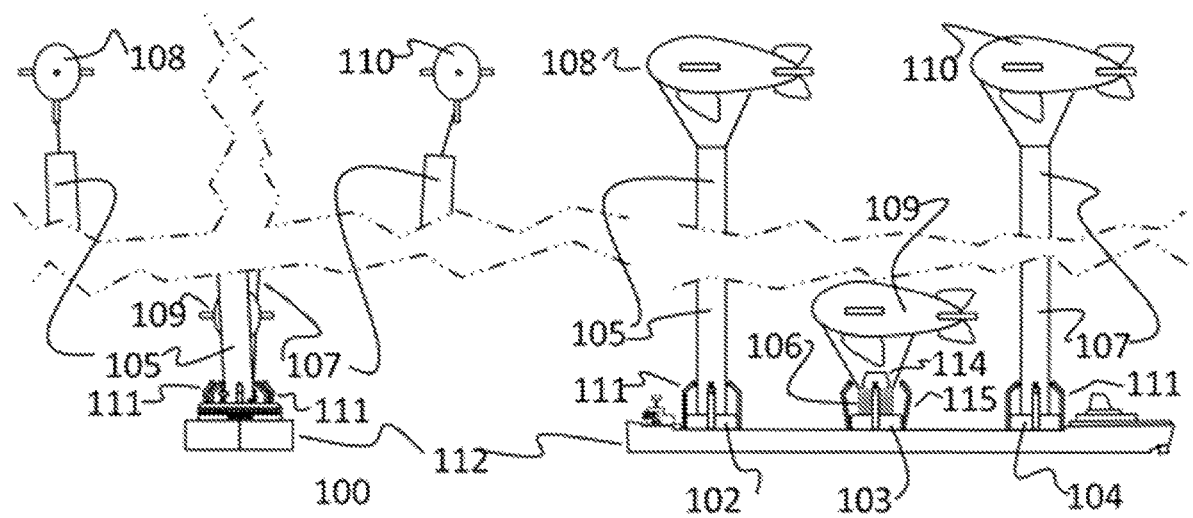
Fig. 1A                     Fig. 1B
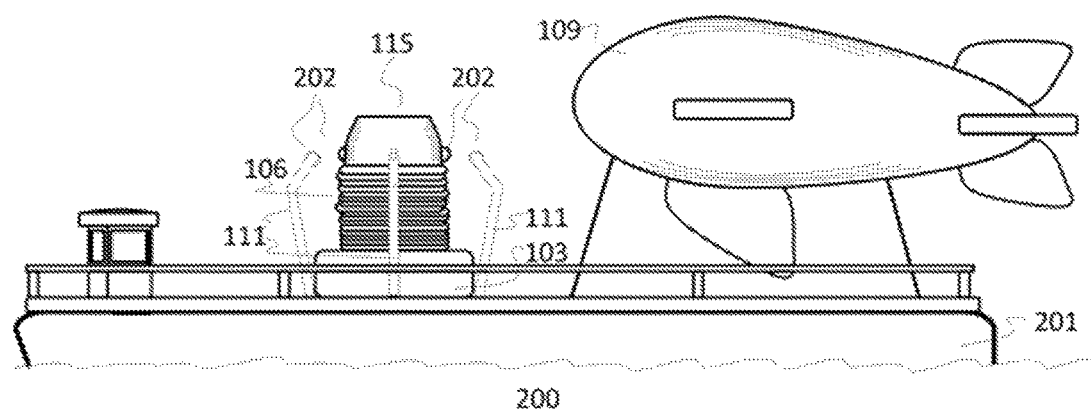
Fig. 2

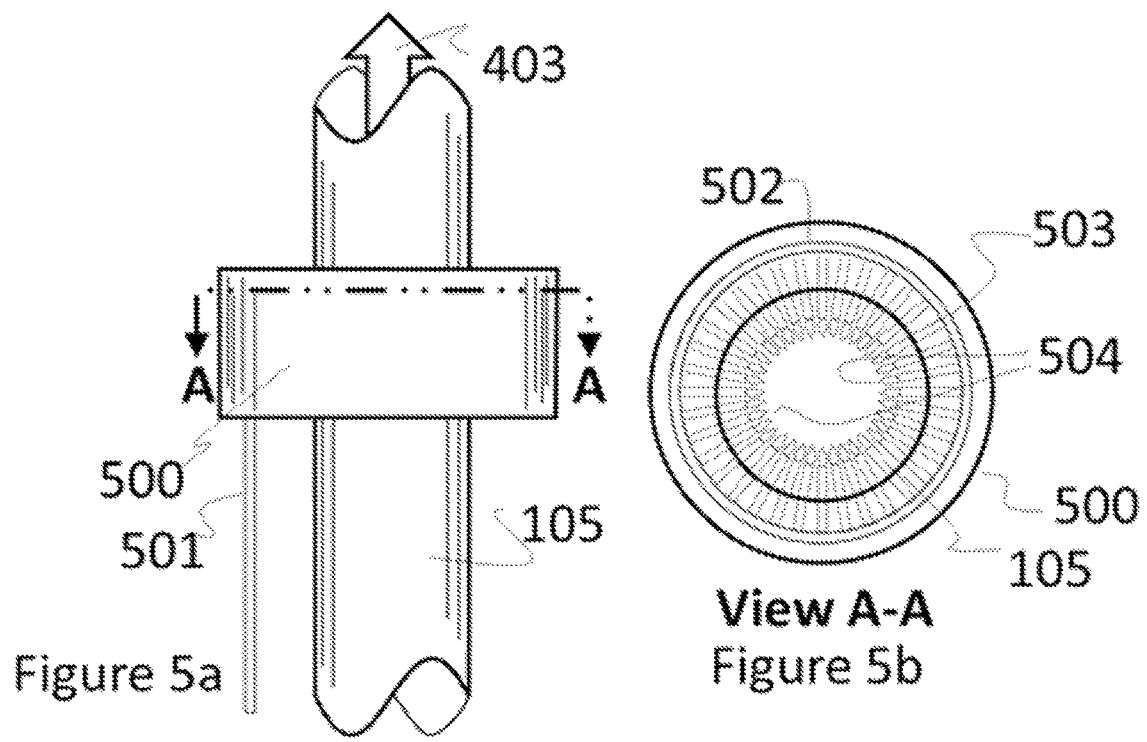
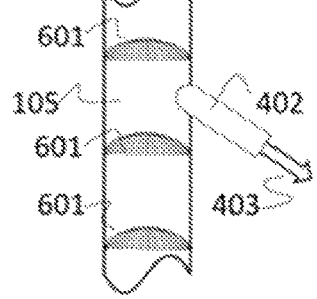
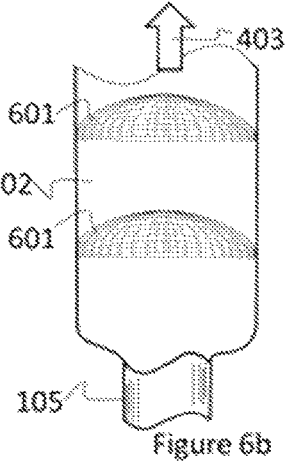
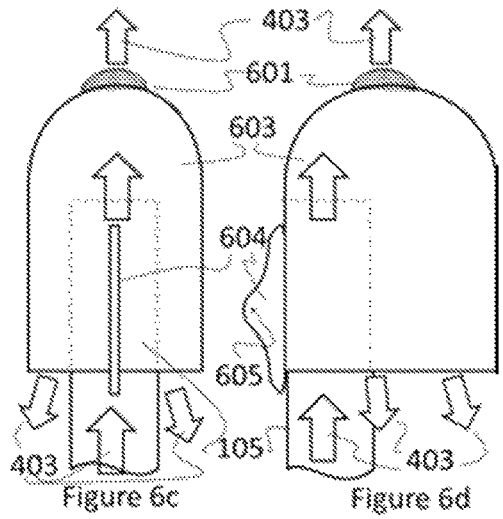

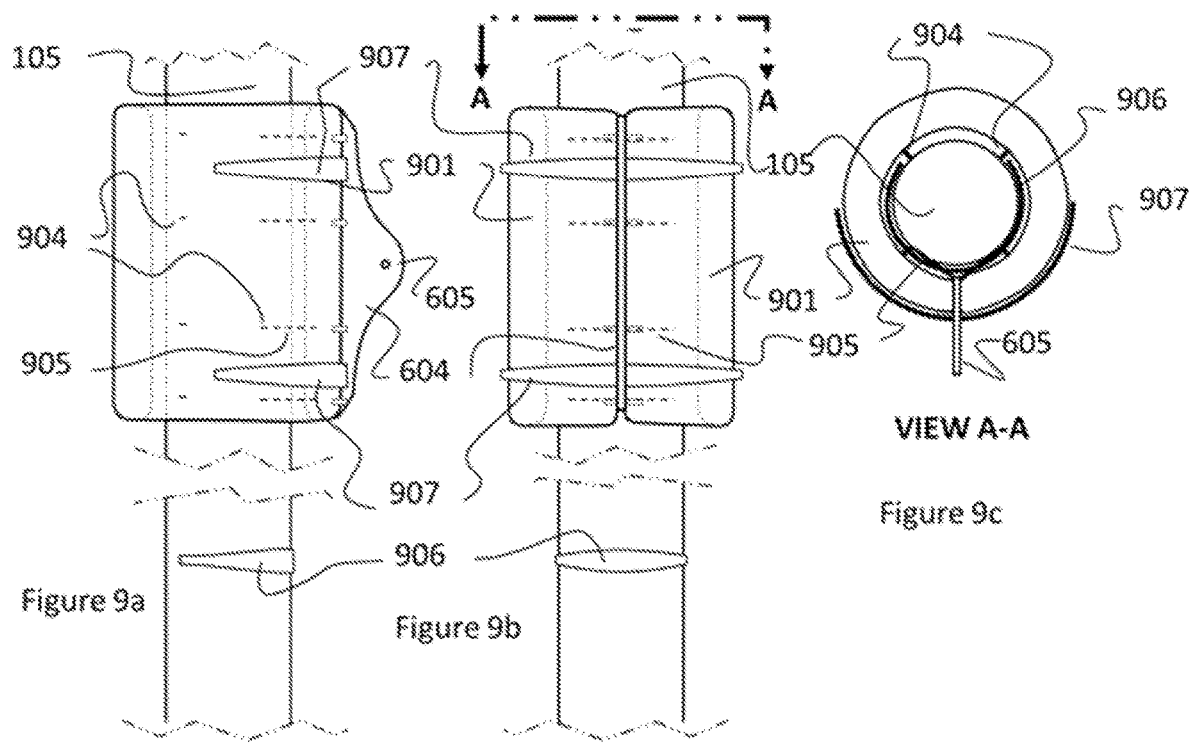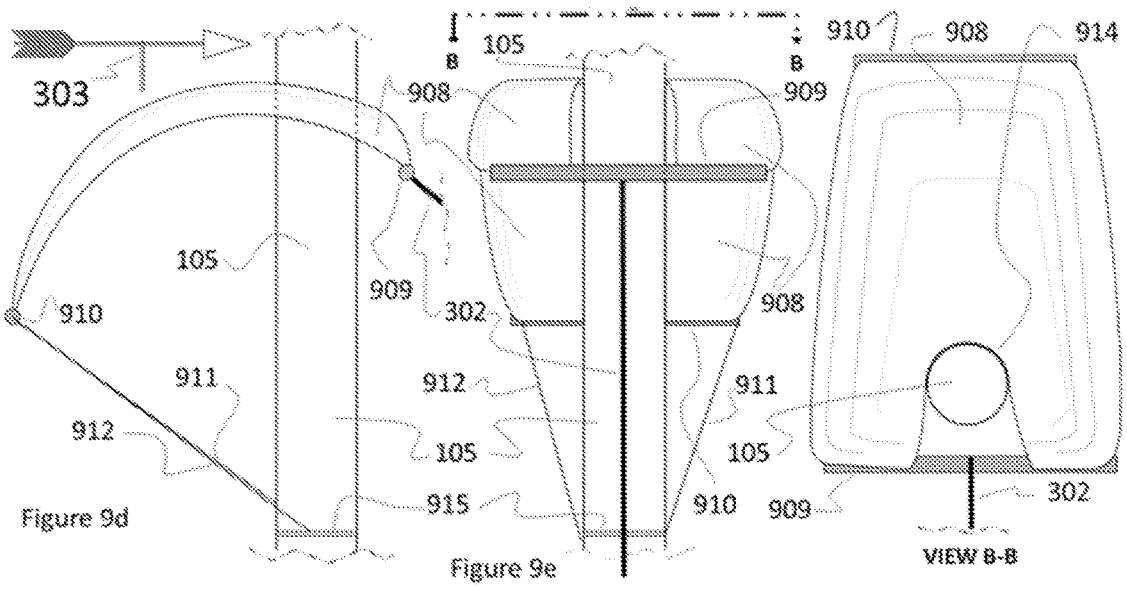

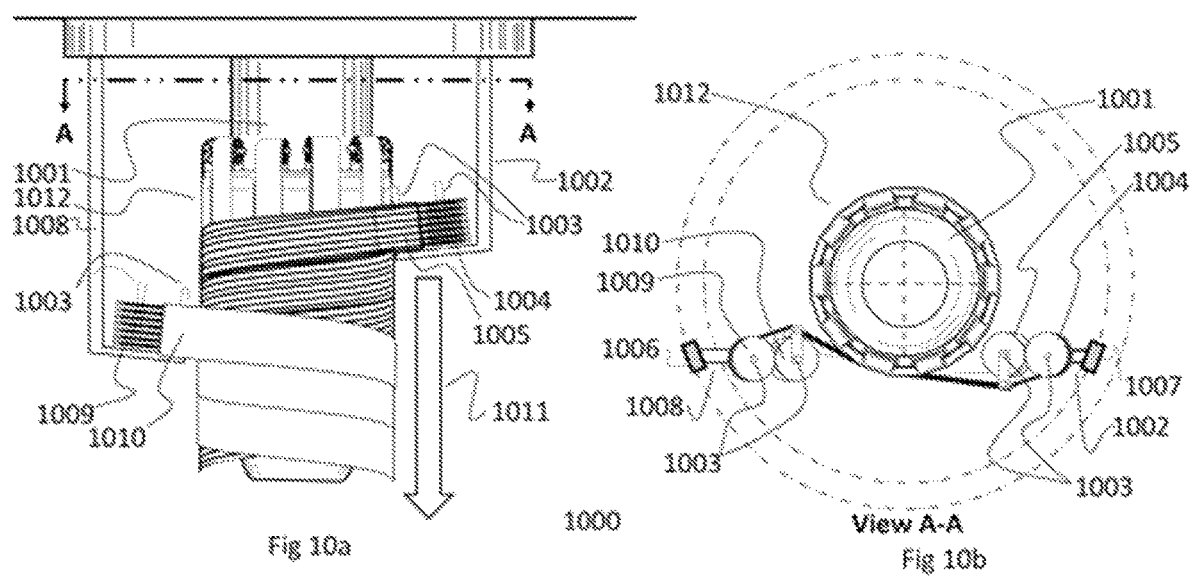
Fig 10a
View A-A
Fig 10b
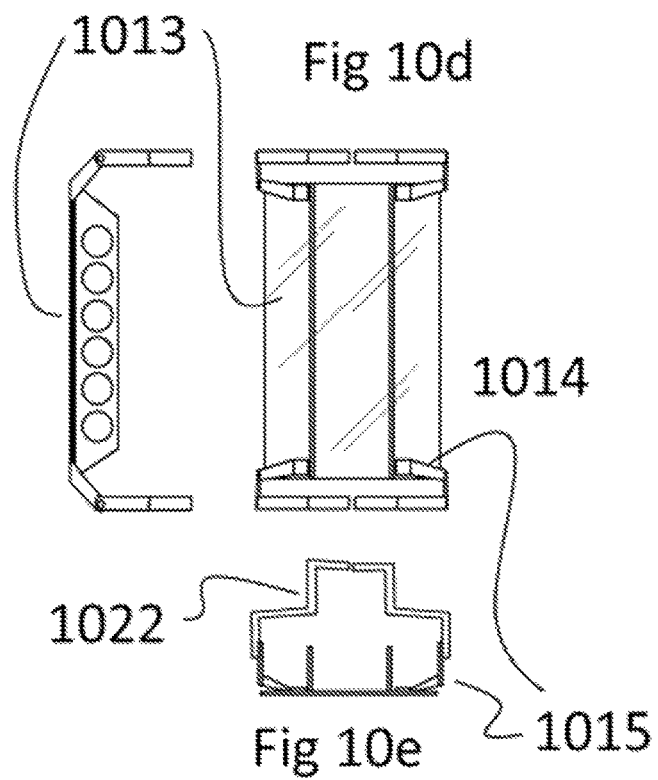
Fig 10c
Fig 10d
Fig 10e

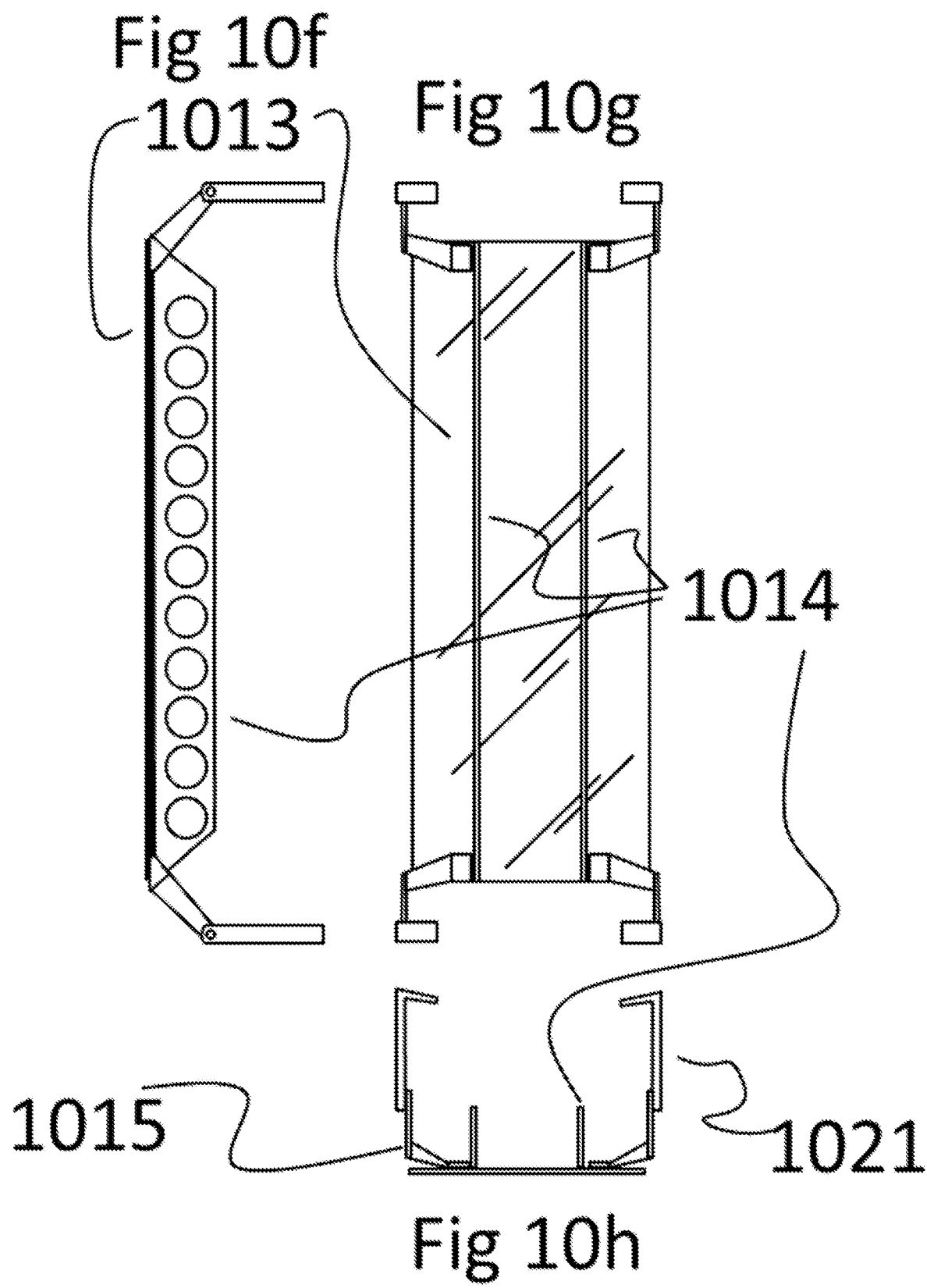

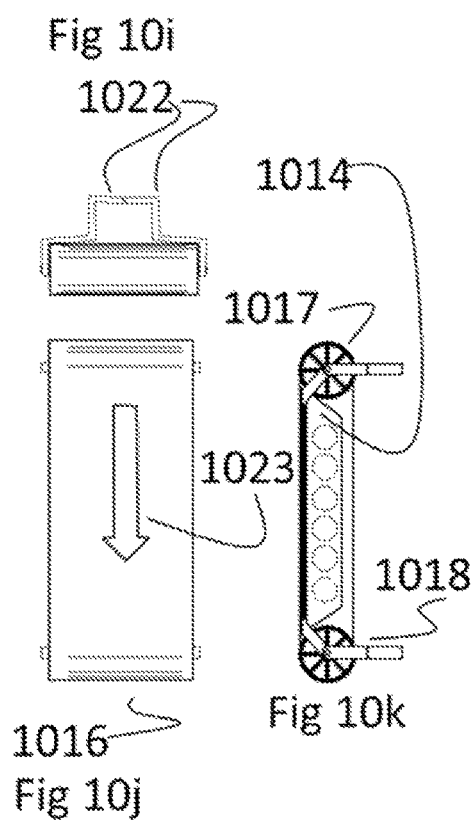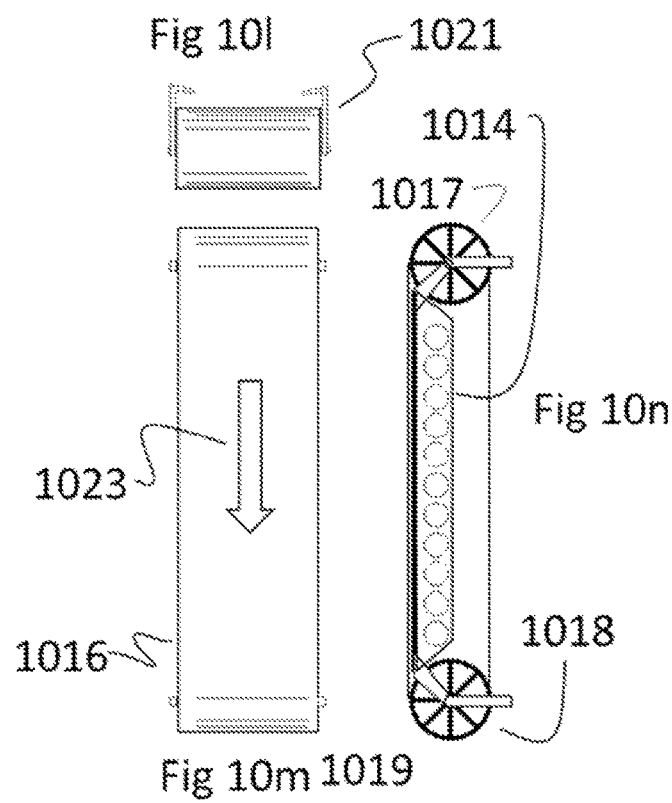

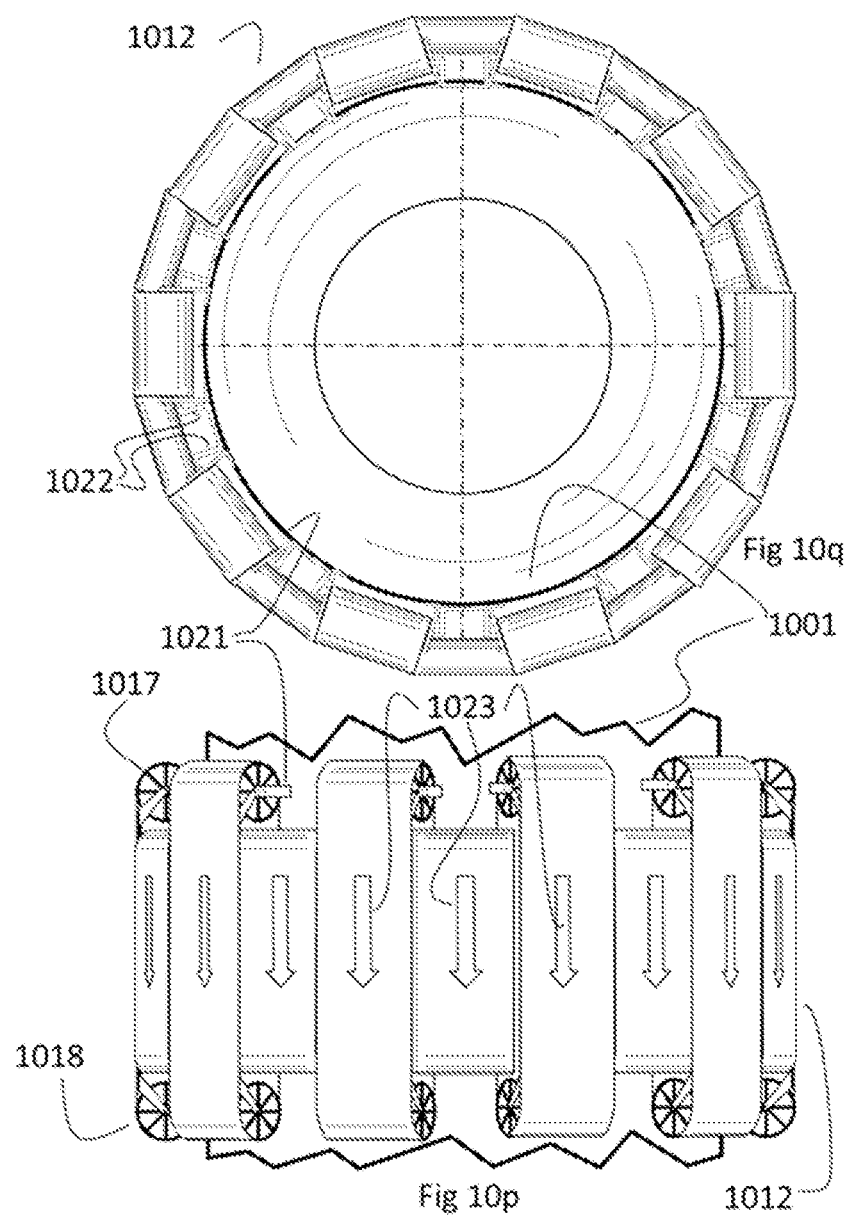

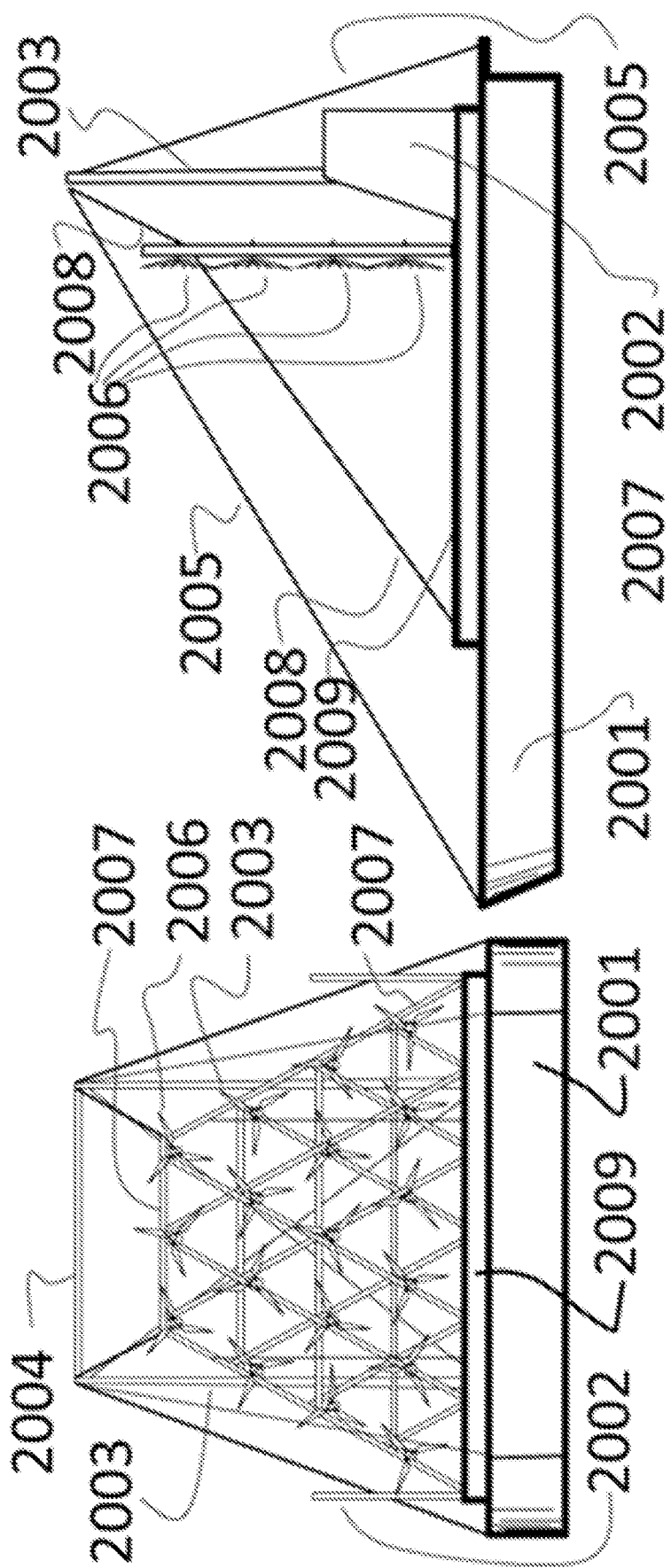

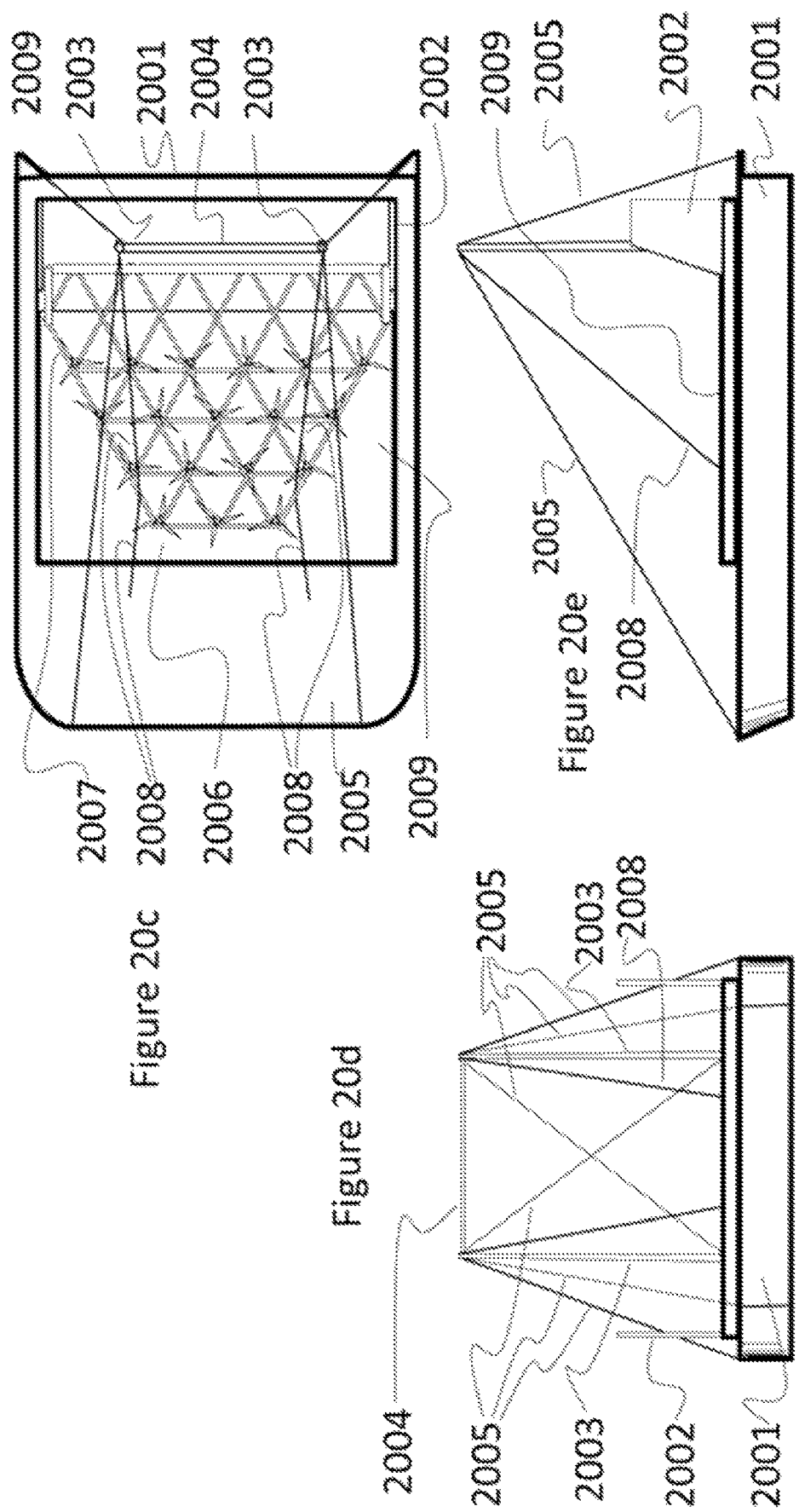

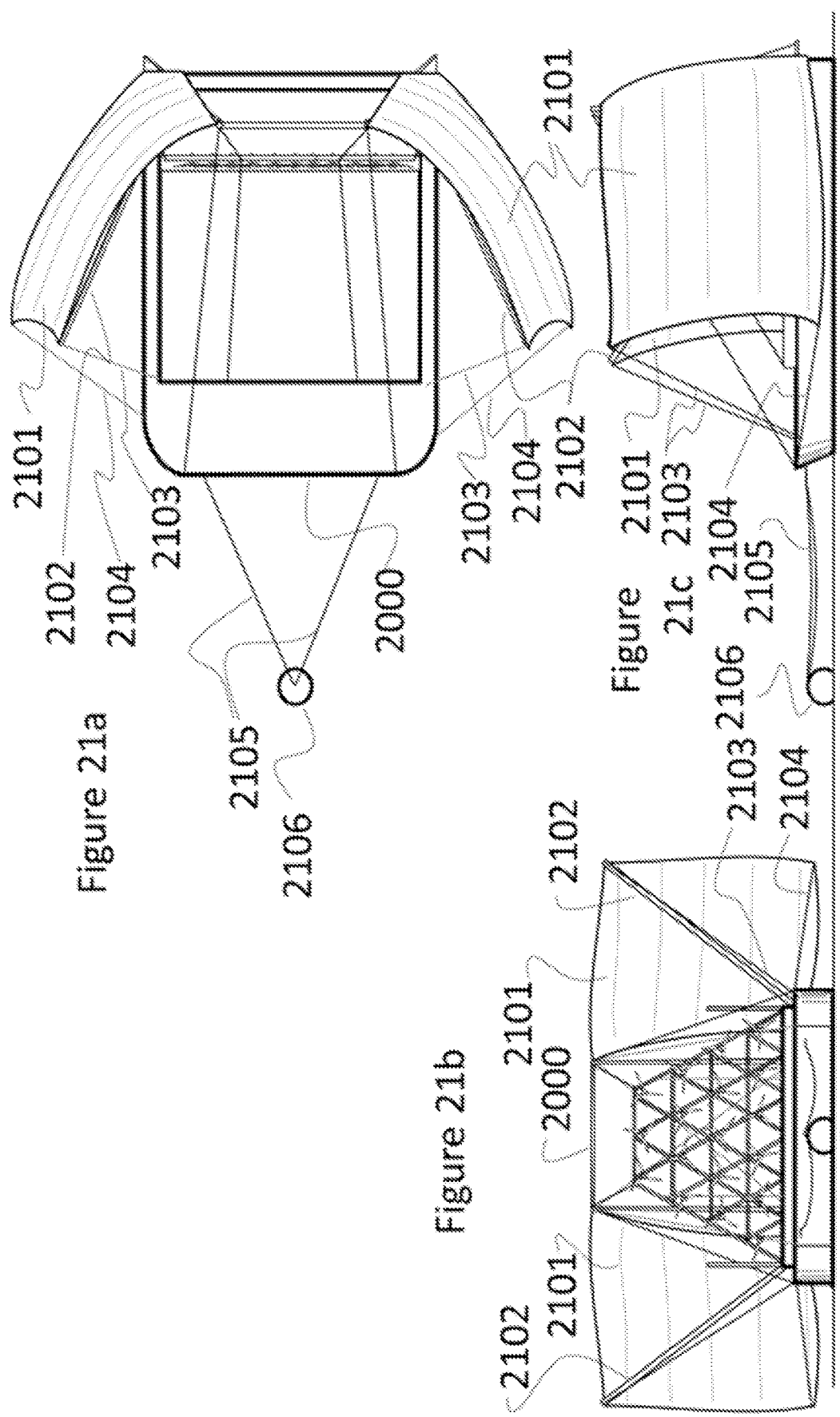

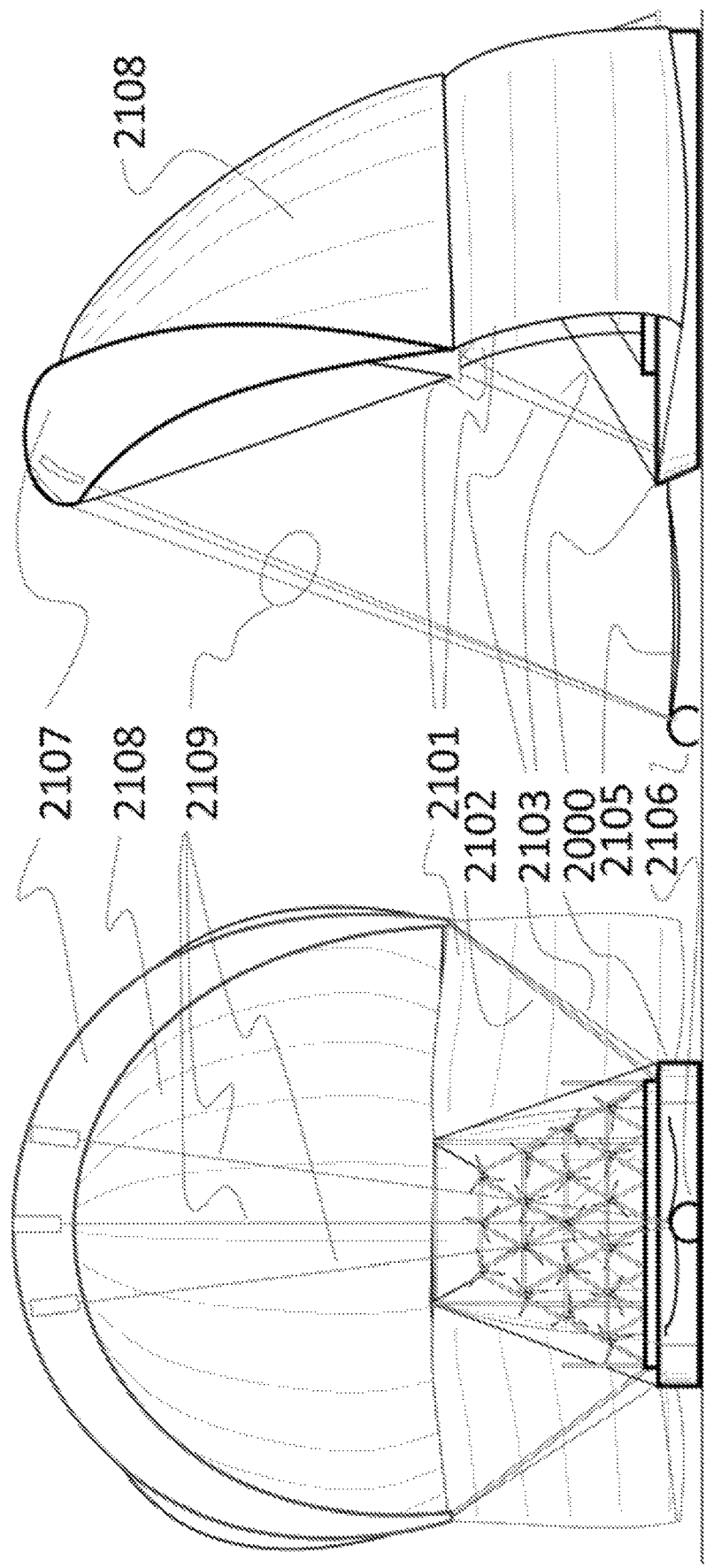

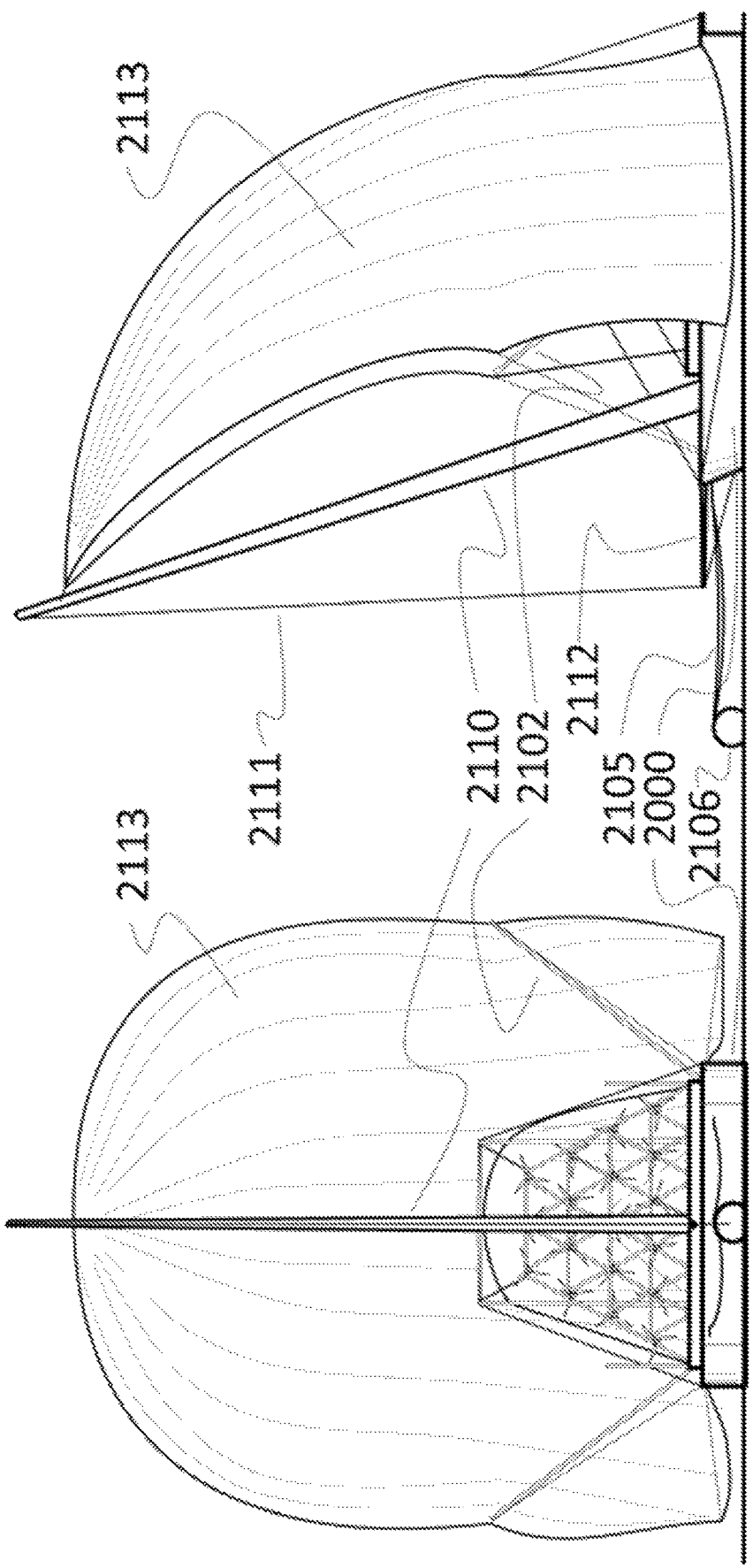

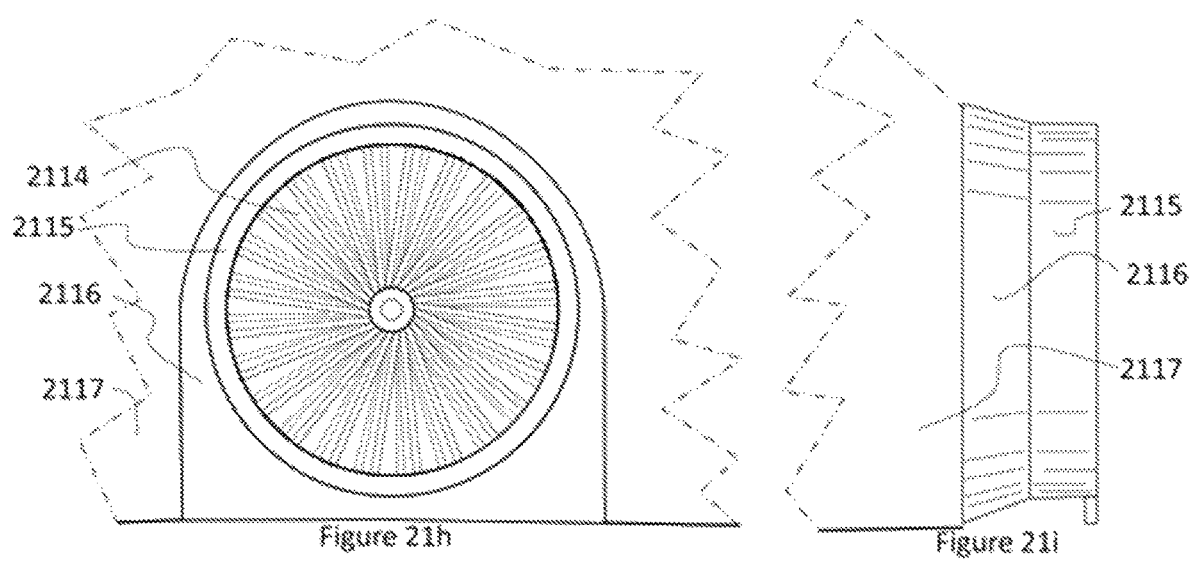

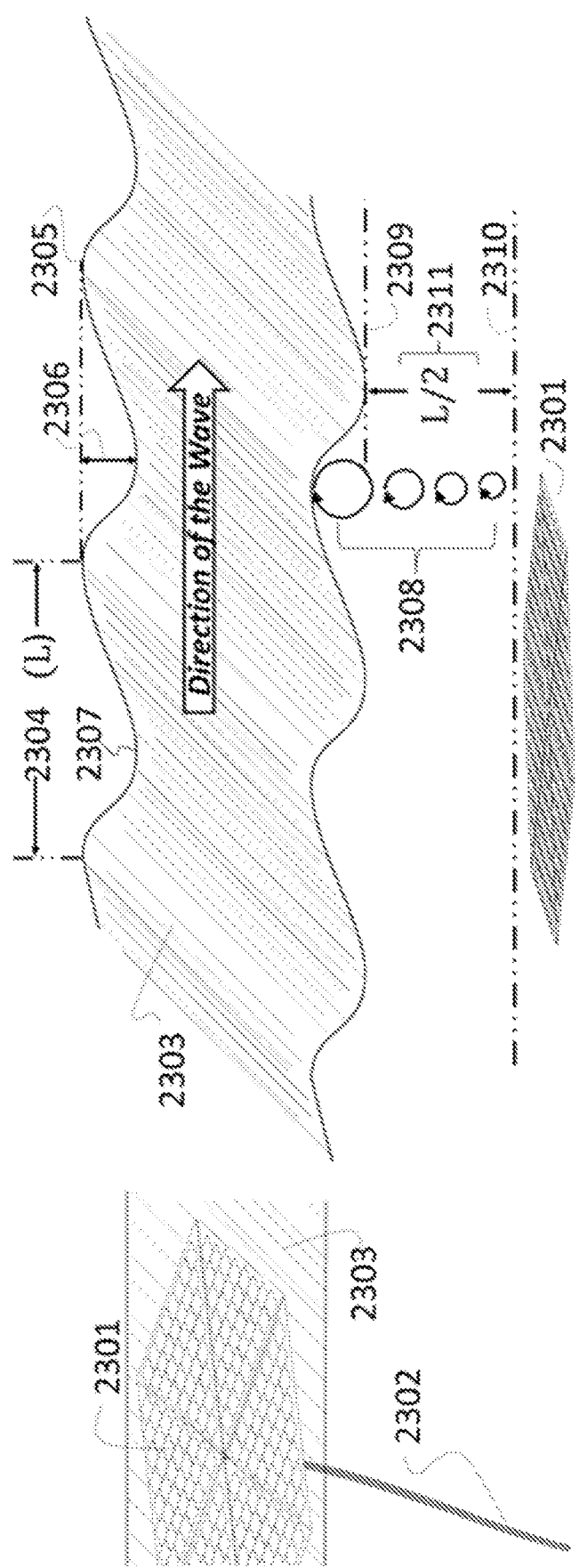

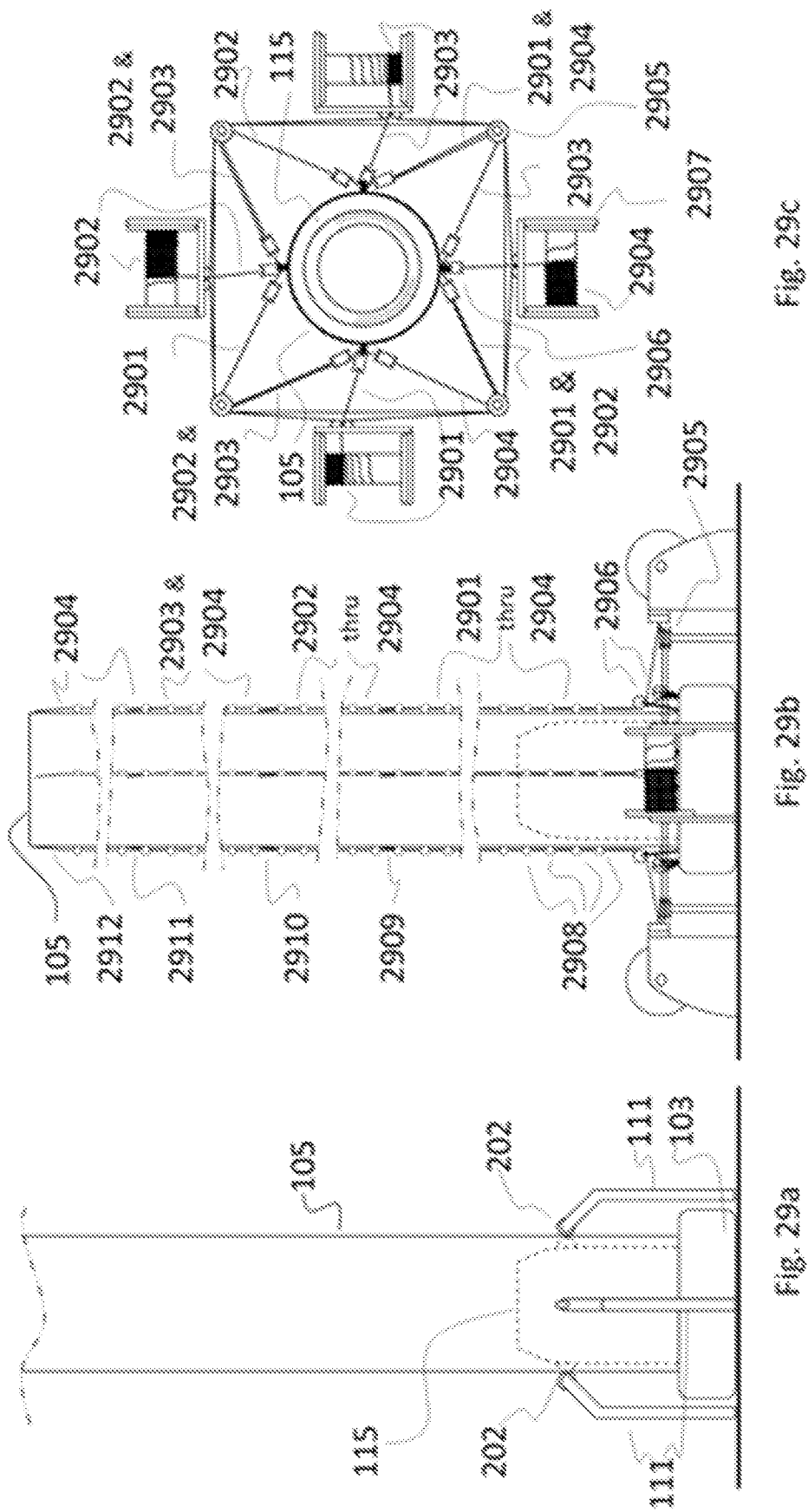

```
                                                    ┌─ 3200
                                                    ▼
┌──────────────────────────────────────────────────────────────────────┐  3202
│         Deliver Water From A Water Source To A Fanning Subsystem     │
└──────────────────────────────────────────────────────────────────────┘
                                    │
                                    ▼
┌──────────────────────────────────────────────────────────────────────┐  3204
│  Take In Oxygen, Hydrogen, Air, The Delivered Water, And/or Aerosol  │
│  Produced From The Delivered Water, Wherein The Delivered Water Is   │
│  Or Has Been Combined With The Air To Produce The Aerosol            │
└──────────────────────────────────────────────────────────────────────┘
                                    │
                                    ▼
┌──────────────────────────────────────────────────────────────────────┐  3206
│  Output The Aerosol Produced From Either The Oxygen And The Hydrogen │
│  Or From The Delivered Water, And/Or The Air, Wherein The Air Is Or  │
│  Has Been Combined With The Delivered Water To Produce The Aerosol   │
└──────────────────────────────────────────────────────────────────────┘
                                    │
                                    ▼
┌──────────────────────────────────────────────────────────────────────┐  3208
│  Transport The Aerosol From A Fanning Subsystem Into An Air Tube,    │
│  The Air Tube Having A First End And A Second End, Wherein The       │
│  Second End Is Disposed Into The Troposphere By Coupling The Second  │
│  End To An Airborne Vessel While The Airborne Vessel Is Flying In    │
│  The Troposphere                                                     │
└──────────────────────────────────────────────────────────────────────┘
                                    │
                                    ▼
┌──────────────────────────────────────────────────────────────────────┐  3210
│  Transport, By The Air Tube, The Aerosol From The First End Through  │
│  The Air Tube To The Second End                                      │
└──────────────────────────────────────────────────────────────────────┘
                                    │
                                    ▼
┌──────────────────────────────────────────────────────────────────────┐  3212
│  Exhaust A Portion Of The Aerosol From The Air Tube Into Atmosphere, │
│  By Multiple Exhaust Vents Disposed Between The First End And The    │
│  Second End Of The Air Tube                                          │
└──────────────────────────────────────────────────────────────────────┘
                                    │
                                    ▼
┌──────────────────────────────────────────────────────────────────────┐  3214
│  Produce A Man-Made Cloud, By The Aerosol Exiting The Air Tube At    │
│  The Second End Of The Air Tube, At An Altitude Targeted For         │
│  Downwind Delivery Of Precipitation From The Man-Made Cloud          │
└──────────────────────────────────────────────────────────────────────┘
```

*Fig. 32*

SYSTEMS AND METHODS FOR PRODUCING RAIN CLOUDS

FIELD OF THE DISCLOSURE

The present disclosure relates to systems and methods for producing rain clouds.

BACKGROUND

Weather systems are known. Issues related to the effects of insufficient rain are known.

SUMMARY

One aspect of the present disclosure relates to a system configured for producing a man-made cloud and deliver the man-made cloud into the troposphere at an altitude targeted for downwind delivery of precipitation from the man-made cloud. Another aspect of the present disclosure relates to a method for producing a man-made cloud and deliver the man-made cloud into the troposphere at an altitude targeted for downwind delivery of precipitation from the man-made cloud. The system and method may be being operable in conjunction with an airborne vessel. The method may include delivering water from a water source to a fanning subsystem, wherein the water source is disposed at or near ground level. The method may include taking in, by an intake of the fanning subsystem, oxygen, hydrogen, air, the delivered water, and/or the aerosol produced from the delivered water, wherein the delivered water is or has been combined with the air to produce aerosol. The method may include outputting, by an output of the fanning subsystem, the aerosol produced from either the oxygen and the hydrogen or from the delivered water, and/or the air, wherein the air is or has been combined with the delivered water to produce the aerosol. The method may include transporting the aerosol from the fanning subsystem into an air tube, the air tube having a first end and a second end, wherein the first end is arranged at or near the fanning subsystem, wherein the second end is disposed (upright and/or upwards) into the troposphere by coupling the second end to the airborne vessel while the airborne vessel is flying in the troposphere. The method may include transporting, by the air tube, the aerosol from the first end through the air tube to the second end. The method may include exhausting a portion of the aerosol from the air tube into atmosphere, by multiple exhaust vents disposed between the first end and the second end of the air tube. The method may include producing the man-made cloud, by the aerosol exiting the air tube at the second end of the air tube, at the altitude targeted for the downwind delivery of the precipitation from the man-made cloud.

As used herein, any association (or relation, or reflection, or indication, or correspondency) involving clouds, subsystems, water sources, intakes, outputs, air tubes, airborne vessels, watercrafts, exhaust vents, fins, fans, nozzles, turbines, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

As used herein, the term "coupled" does not require direct attachment, but allows for one or more intermediary components between the coupled elements. As used herein, the term "connected" suggests a direct attachment. As used herein, the term "aerosol" is defined as liquid particles dispersed in gas, i.e., in air.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 1A illustrates a front view and FIG. 1B illustrates a side view of the Shipboard Concept 100 with three rain cloud generating systems mounted on the deck of a typical Great Lakes ore carrier 112 with the engines 102 103 104 and the air tubes 105 and 107 deployed with the assistance of blimps 108 and 110 respectively.

FIG. 2—Example of The Small Boat or Barge Concept.

FIGS. 5*a* and 5*b*—Gas Heating Unit in the Tube.

FIGS. 6*a* and 6*b*—Tube with Netting and Pressure Vents.

FIGS. 6*c* and 6*d* illustrate a front and side view of a top vent with a downward exhaust vent.

FIGS. 7*a* and 7*d*, 7*b* and 7*e*, 7*c* and 7*f* illustrate front and top views of tubes with Retractable Netting for pressure control.

FIGS. 9*a*, 9*b*, and 9*c*—Lift Bags and FIGS. 9*d*, 9*e*, and 9*f*—Lift Kites.

FIGS. 10*a*, 10*b*, 10*c*, 10*d*, 10*e*, 10*f*, 10*g*, 10*h*, 10*i*, 10*j*, 10*k*, 10*l*, 10*m*, 10*n*, 10*p*, 10*q*—describe Tube Manufacturing.

FIGS. 20*a* and 20*b* illustrate a front and side view of an operational—Electric Power, Water Electrolysis, and Hydrogen Storage Barge. FIGS. 20*c* 20*d* and 20*e* illustrate a top view, front view, and side view of the same barge with the wind turbines stowed.

FIGS. 21*a*, 21*b*, and 21*c* illustrate an electrolysis barge with side sails to Enhance Wind Turbine Performance. FIGS. 21*d* and 21*e* illustrate a similar barge with side sails and a top sail where the sail is held aloft with a lighter than air pocket. FIGS. 21*f* and 21*g* is similar with a mast supporting the raised sail. FIGS. 21*h* and 21*i* illustrate different views of a single, large wind turbine designed to work with the electrolysis barge and the associated sails.

FIGS. 23*a* and 23*b*—Submersible Solar Farm.

FIGS. 29*a* and FIGS. 29*b* and 29*c* illustrate concepts for furling the tube.

FIG. 32 illustrates a method to produce a man-made cloud, in accordance with one or more implementations.

DETAILED DESCRIPTION

Figure 3:
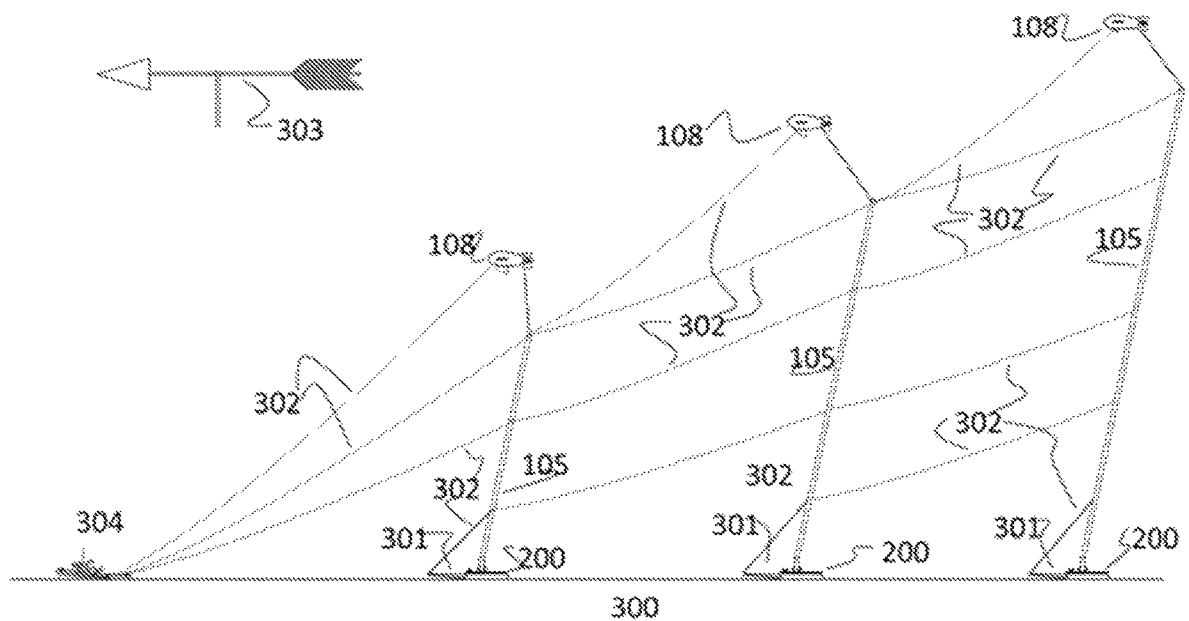
FIG. 3—Example of The Fleet Concept and Guy Wire Supports for the Air Tube.
Figures 4A, 4B:
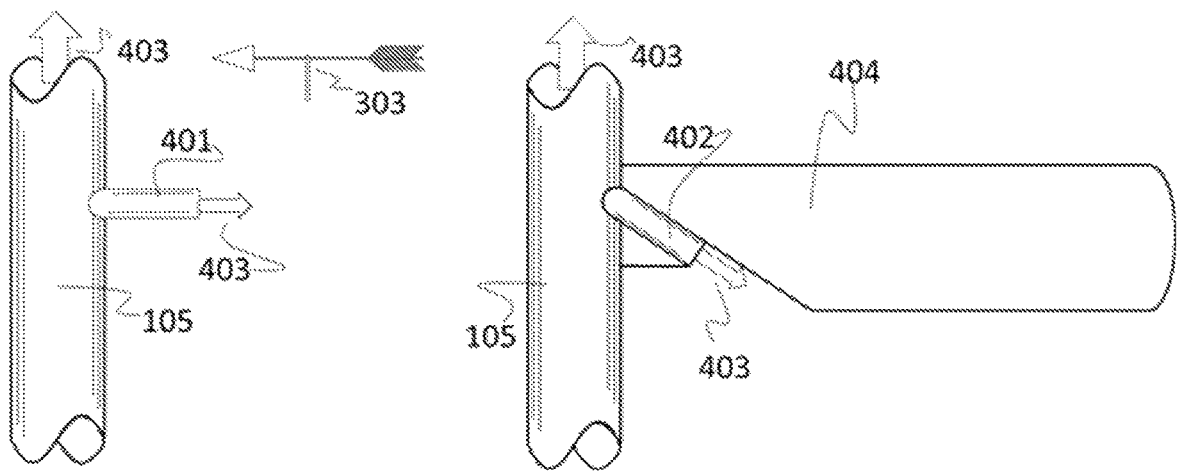
FIGS. 4*a* and 4*b*—Thrusters to Support the Tube.
Figure 7A:
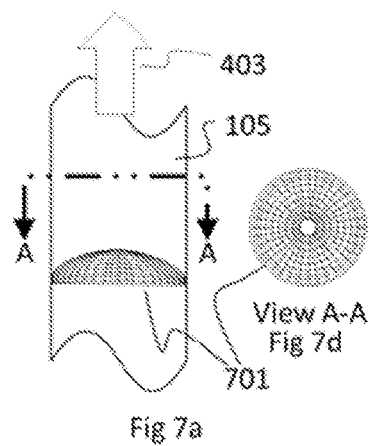
Figure 7B:
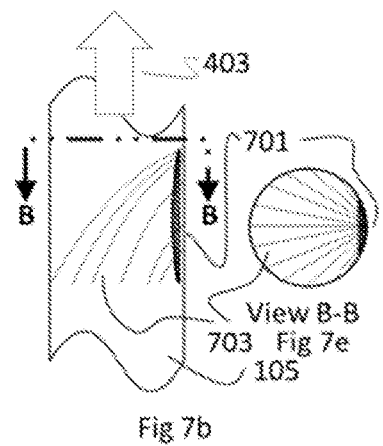
Figure 7C:
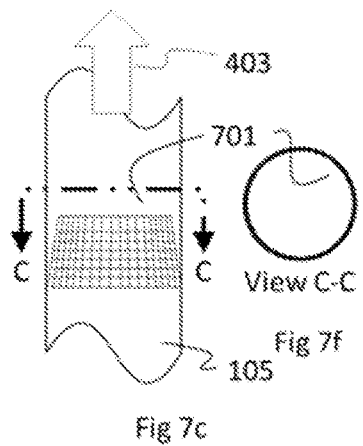
Figures 8A, 8B:
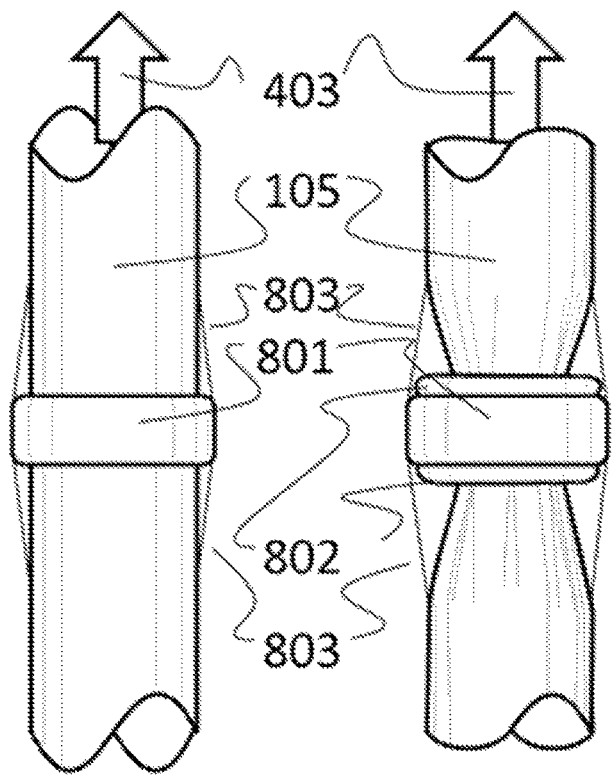
FIGS. 8*a* and 8*b*—Tube with Constricting Pressure Control.

The systems and methods described herein may be considered as geoengineering and/or cloud generation, and may be used for weather modification with a primary function of providing water in the form of rain on areas of land that need it reducing the effects of drought and the associated problems of crop failure and wildfires and the removal of air particulate contamination. In some implementations, the system may need a water source that can be saltwater or freshwater. In some implementations, the clouds may be generated where none exist or those that do exist are inadequate to generate an adequate amount of rain. The system may be generating clouds predominantly during pre-dawn and daylight hours that will travel to an area where rain may be needed before night fall. A combination of one or more of the drop in temperature associated with night fall, the orographic precipitation that occurs when clouds rise to go over mountains, and cloud seeding may be used to initiate rainfall from the man-made clouds.

These man-made clouds may have a cooling effect on global warming even though water vapor is a greenhouse gas. Clouds reflect energy from the sun during the day but tend to block some of the Earth's long wave radiation at night. It is generally accepted that the frigid high altitude contrails from jet aircraft block more energy radiating from the earth than they reflect during daylight hours which has a net effect of adding to global warming. The man-made clouds generated here may be low altitude clouds residing primarily in the troposphere and about the same temperature as the ground or sea below the clouds, with long wave radiation levels that are about the same as the ground or sea below them. During the day, the man-made clouds may be reflecting sunlight at a much higher rate than the water or land under them.

FIGS. 1*a* and 1*b* represent a typical equipment configuration 100 for the generation of rain downwind from a water source. Item 112 is a Great Lakes ore freighter, typically 600 to 1000 foot long that has been modified to carry three systems. The drives for the systems are in the fan boxes item 102, 103, and 104. Fan boxes 102, 103, and 104 will drive a water saturated aerosol into the flexible tubes 105, 106, and 107. The tubes 105, 106, and 107 will be inflated by the force of the fans and will be supported by the blimps 108, 109, and 110, respectively. Due to the height of the tubes 105, 106 and 107, the blimp 108, 109, and 110 will be fitted with appropriate air navigation warning lights and radar reflectors as will the tubes 105, 106, and 107. If engine 103 is not operating, tube 106 may be stowed around the outside of engine housing 114 and the furling system 115 may be disengaged.

The two deployed systems are set up to operate off to the sides of the ship with the system consisting of fan box 102, tube 105, and blimp 108 deployed to starboard and the system consisting of fan box 104, tube 107, and blimp 110 deployed to the port side of the ship.

FIG. 2 is a smaller boat or barge 201 carrying a similar system (as described in this disclosure). The boat may be a 100 foot catamaran with the fan box 103 mounted on a deck between the two hulls of the catamaran. The tube 106 is shown in the stowed position, the blimp 109 is tethered to the deck, and the furling rollers 111 with drive wheels 202 are disengaged.

Referring to FIG. 3, a fleet 300 of four boats may work together to generate rain clouds with the aerosol that is exiting the top of their tubes. Item 303 is a wind vane that is pointing into the wind. The winds aloft are often above 35 knots and keeping the tubes in a substantially vertical alignment most of the time (as measured and/or determined between the opposite ends of each tube, and considering only the orientation with respect to fore and aft of the respective boats, and ignoring side-to-side and/or lateral movement with respect to the respective boats, and barring periods of extreme weather) may require significant support due to the force of the wind on the air tube. It is understood that extreme weather and/or movement of the respective boats may temporarily disrupt the preferred alignment (of substantially vertical). In FIG. 3 item 304 is a tugboat providing support to the air tubes on the other three boats or barges 200 primarily to keep the tubes 105 substantially vertical. The three boats 200 may operate under their own power or could be barges in tow from the tugboat 304.

The three boats or barges, item 200 have a bowsprit item 301. There may be guys or stays 302 running from the waterline at the front of the hull to the tip of the bowsprit. Guys or stays 302 may have been added from the tip of the bowsprit up to the tubes 105 for support. Further support for the tubes is provided by the guys 302 running from the tugboat 304 up to the upper sections of the tubes 105, the tube tops, and the blimps 108.

Air Tube Design & Construction

Referring to FIGS. 4*a* and 4*b*, in some implementations, tubes 105 may be supported against incoming wind as indicated by wind vane 303 by thrusters 401 & 402. While much of the air going through the tubes will bypass the thrusters, some of the air may be exhausted through the thrusters pushing the tube 105 into the wind. Exhaust 403 may form and/or include thruster 401, and may be actively controlled when it exits the thruster pushing the thruster clockwise or counterclockwise around the tube to keep the force from the thruster pushing the tube 401 into the wind. Thruster 402 is pointed downwind as shown here to provide a force on the tube in the windward direction adding lift to the air tube. Thruster 402 may be held in a position by fin 404 to keep the force on the tube 105 pushing the tube 105 from thruster 402 into the wind. Fin 404 will keep the force from the associated thruster 403 pushing the tube 105 into the apparent wind or wind as seen by that portion of tube 105 which will change due to the movement of tube 105 and due to wind variations at different altitudes.

FIGS. 5a and 5b illustrate a gas heating unit 500 used to heat the aerosol represented by arrow 403 in the tube 105 causing the air to expand and rise in the tube. The heating unit 500 may be supplied with gas via gas pipe 501. The gas may be distributed via the circular manifold 502 to the individual tubes 503 with the flame 504 occurring inside air tube 105. Heating the air in the tube may decrease the density of the aerosol inside tube 105 and may increase its tendency of the aerosol to rise inside the tube.

FIGS. 6*a* and 6*b* illustrate a cross section view of tube 105 and extension 602 that describes netting or screening 601 inserted into the tube 105 or an extension to the tube 602. When the water saturated air 403 is pushed through the netting, the water droplets may be broken down into smaller droplets that would be less likely to form precipitation droplets on leaving the tube at altitude.

The net 602 may represent impedance to the flow of air 403 through the tube 105 or the expanded extension 602. As a result, the pressure in the tube below the nets may be higher than the pressure above the net. If a thruster 402 is located below a net 601 the air flow 403 through the thruster 402 may be higher, resulting in more force being produced by the thruster 402.

Increasing the pressure in the tube 105 or extension 602 may result of an increased stiffness to the walls of the tube 105 or extension 602. The stiffness and the pressure in the tube may tend to support the tube as it is raised (or deployed) and may decrease the need for support from the blimp 108.

If the flexible air tube 105 folds over or partially collapses the pressure inside the tube may increase significantly. In some implementations, pressure relief vents may be used to prevent permanent damage to the air tube 105. The thruster 402 may be one form or approach of a pressure relief vent that will also push the tube into the wind.

FIG. 6*c* illustrates a front and 6*d* a side view of an air 405 distribution cap 603 at the top of tube 105. The air 403 enters the cap 603 at the top of tube 105 and exits at the top of the tube through net 403 or out of the open bottom of the cap 603. The structural support 604 with a connection point 605 may accommodate a guy 302 that may haul the top of the tube into the apparent wind. The use of a guy on the windward side of the tube may result in the downward exhaust being directed downwind from the air tube 105. The downward airflow 403 may add lift to the air tube 105 and push the tube to windward reducing the external force needed to support the tube vertically and to windward.

FIG. 7*a,c,b,d,e,f* illustrate cross section view of retractable netting systems. The netting when deployed may function as expressed in the description of FIGS. 6*a* 6*b* 6*c* and 6*d*. As tube deployment position and atmospheric conditions change, it may become desirable to increase or decrease the number of nets in a tube 105 or extension 603. Two ways to retracting the net on FIG. 7*a* are illustrated in FIGS. 7*b* and 7*c*.

The force of the air 403 through the tube 105 may continually push the nets in an upward direction in FIG. 7*a*, 7*b* or 7*c*. The netting in FIG. 7*b* may be released by loosening the cords 703. The net in FIG. 7*c* is released by loosening a draw cord that encircled net 701 at the top of the net. The air 403 passing through the tube 105 forces the nets 701 against the wall of tube 105.

FIGS. 8*a* and 8*b* illustrate changing the impedance of air tube 403 by inflating a bladder 802 surrounding the air tube 105 and changing the shape of the air tube 105 from that shown in FIG. 8*a* to that shown in FIG. 8*b* when inflated. In some implementations, bladder 802 may be attached to the air tube 105 by a housing 801 and guys 803. Inflating the bladder may decrease the internal diameter of the tube 105, increase the velocity of the aerosol 403 flowing through the tube 105 and may increase the pressure in the tube below the bladder 802. In some implementations, the diameter of the tube can also be restricted by belts or synchs.

FIGS. 9*a*, 9*b* and 9*c* illustrate side, front and top view of lift bag while FIGS. 9*d*, 9*e* and 9*f* illustrate mechanisms to provide lift to tube 105. FIG. 9*a* 9*b* 9*c* illustrate a tube 105 lifting harness 900*a*. In some implementations, the harness may have a lift bag 901 that when inflated will support the air tube 105. The gas used to inflate the lift bag 901 may be lighter than air and provide lift for the tube 105 as well as support. The lift bag 901 may be attached to the air tube 105 with cords 904 and struts 905.

Also shown in FIG. 9*a* 9*b* 9*c* is a structural support 604 with a connection point 605 to accommodate the guys 302 where the structural support 902 may distribute force from the guy 302 through multiple connections to the tube 105. In some implementations, batons 906 and 907 may be added to tube 105 and lift bag 901 to add shape stability to the tube and lift bag when deployed in a wind strong enough to substantially change the shape of the devices.

FIGS. 9*d* 9*e* and 9*f* illustrate a kite that provides lift to tube 105. In some implementations, the kite may have a main canape 908, two spars 909 910, and guy lines 911 912 attached to the rear spar 910, and a band 915 that has been added to tube 105. The canape 908 may be also attached to the tube 105 at 914. The forward spar 909 may be connected to one of the main guy lines 302 used to pull the tube into the apparent wind.

Tube Manufacturing

FIGS. 10*a* and 10*b* illustrate two views of a tube winding system 1000. FIGS. 10*p* and 10*q* illustrate a side and top view of the conveyor assembly. Structural support parts of the conveyor assembly side, back and bottom view are shown in FIGS. 10*c*, 10*d* and 10*e* and FIGS. 10*f*, 10*g* and 10*h* are incorporated into subassemblies FIGS. 10*i*, 10*j*, and *k* and FIGS. 10*l* 10*n* and 10*m* respectively. The subassemblies 10*k* and 10*n* are then incorporated into assembly of FIG. 10*q* 10*p* of tube winding system 1000 with an arbor core 1001 and arbor conveyer 1012 around which material is wound with the wound material being moved down as indicated by arrow 1011 by the arbor conveyer 1012 as the material is wound as shown in FIG. 10*a*. There may be two arms 1002 and 1008 that rotate around the arbor 1001 in opposite directions with arm 1008 going around clockwise in FIG. 10*b* View A-A and arm 1002 going around the arbor counterclockwise. Each arm 1002 and 1008 may have two spindles 1003. One spindle on each arm 1002 and 1008 may carry a spool with a sheet of solid material like polytetrafluoroethylene (PTFE) and the other spindle has several spools of reinforcing cord such as carbon fiber. In some implementations, when the tube is being wound, arm 1002 first lays down a layer of film 1005 followed by a layer of reinforcing fiber 1004. Shortly after that arm 1008 lays down another layer of reinforcing fibers 1009 followed by a layer of film 1010. The four layers are held together by an adhesive or bonding layer applied to the film layers or by melting the film layers together.

The arbor conveyer assembly 1012 as depicted is made up of two different sized conveyer belt assemblies FIG. 10*i* 10*j* 10*k* and FIGS. 10*l* 10*m* and 10*n*. In order to form a tighter assembly of conveyer belts the larger belts 1019 may be arranged with smaller conveyer belt assemblies 1020 with part of the smaller assembly 1020 mounted inside the longer conveyer belt assembly 1019. The conveyer belts may be flexible and need to be supported when the films and cords 1004 1005 1009 1010 are being wound and bonded together on the arbor. The conveyer belts 1016 may be supported by back plates 1013 which is reinforced with supports 1014. As depicted, the back plate 1013 is mounted with brackets 1015 and either the long 1021 conveyer mounting bracket or the short conveyer bracket 1022 to the core of the arbor 1001.

In some implementations, the conveyer belt 1016 is powered though the drive wheel 1017. The wheel at the opposite end of the conveyer is the tension wheel and maintains the tension in the belt as it rotates. The drive wheels 1017 and the tension wheels 1018 are mounted to the arbor core 1001 though the bracket 1021 for the long conveyer assemblies 1019 or bracket 1020 for the shorter conveyer belt assemblies 1022. The direction of rotation for the conveyer belt 1016 is indicated by the arrow 1023.

In some implementations, stiffening circular hoops that will help the tube 105 maintain an open tubular shape when deployed in the wind or furled on the deck may be added at the top of the conveyors 1012 as the tube 105 is being wound.

Figure 11:
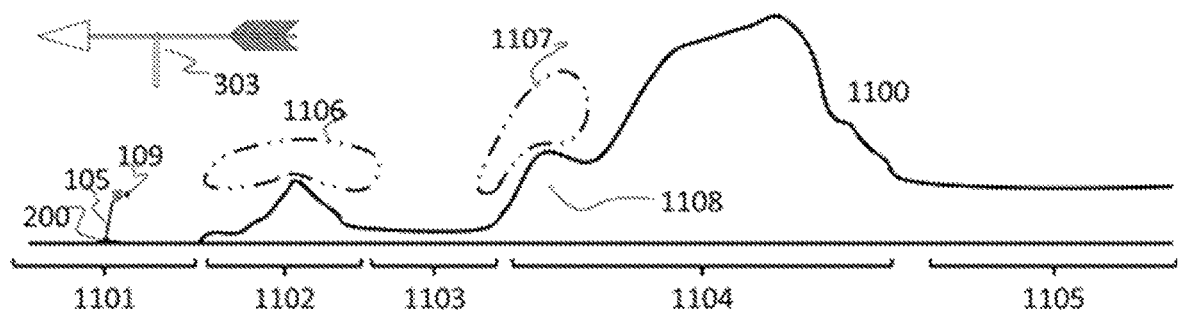
FIG. 11—The San Joaquin Valley Target Area.

FIG. 11 illustrate an east-to-west cross section of California where the system is likely to be deployed. FIG. 11 includes parts of the Pacific Ocean 1101, the Southern California Coastal Mountain Range 1102, and the San Joaquin Valley section of California's Central Valley 1103 with its fertile farmland and an ongoing shortage of water, the Sierra Nev. Mountain Range 1104, and the Mojave Desert 1105. The San Joaquin Valley 1103 has produced about 25% of the Nation's table food with 1% of the Nation's farmland. Wind vane 303 points into the prevailing westerly winds for the region. The boat 200 with its equipment and tube 105 supported by blimp 109 may be located in the Pacific Ocean 1101. The rain clouds will be generated over the Pacific Ocean with the prevailing westerly winds 303 pushing them inland.

Salt from the Pacific Ocean 1101 may be part of the aerosol exiting the air tube 105. Droplets may form around the salt and start to drop toward earth with some of moisture evaporating on the way down. One of the parameters controlling the amount of salt that will be in the man-made clouds when they are over land may be the distance between the boat 200 and the land 1102, 1103, 1108, 1104, or 1105.

The man-made clouds generated by the boat 200 may need to make it over the coastal mountains 1102 to reach the San Joaquin Valley 1103 target area. The coastal mountains 1102 tend to receive a significant amount of rain. When low level clouds or fog start to rise over the Coastal Mountains they cool, and the air becomes less dense. These two effects may combine to cause orographic precipitation. The man-made clouds generated by the boat 200 may be (designed to be) higher than the normal low lying clouds and fog and less effected by the orographic precipitation effect at the coastal mountains 1102, and may normally be in winds of a higher velocity allowing faster travel inland.

For raindrops to form in the aerosol leaving tube 105, a nucleus of some sort may need to be provided. In the case of a saltwater source, the salt may serve that purpose. In freshwater rivers, the silt in the water or the dust in the air or mud in the water may provide the needed nucleus. On a clear day in places like the Great Lakes, material like salt or dirt or silver iodide can be introduced into the system via the pumps 1405 1606 or in the case of the silver iodide, burned in the aerosol before or after leaving the tube 105. Colonially suspended particles that normally build the river deltas when they meet the saltwater and fall out may be the primary source of nuclei for forming raindrops from the aerosol generated from the waters of the muddy Mississippi and other river systems.

The man-made clouds that make it over the coastal mountains may not be likely to drop much rain directly into the San Joaquin Valley unless cloud seeding is done to encourage precipitation. It is more likely that the clouds will travel the 200 miles downwind from the ocean to the Sierra Nev. Mountain Range 1104 which stretches another roughly 150 miles to the east. At the foothills of the mountains 1108 the rising air will experience adiabatic cooling and loss of density resulting in orographic precipitation 1107 raining down on the windward side of the mountain and flowing back into the San Joaquin River Valley. The loss of moisture from the clouds may leave very little moisture to rain down on the leeward side of the Sierra Nev. Mountain Range or the Mojave Desert east of the range.

Similar results may be expected if one or more of the systems described herein are used on inland water systems like the Mississippi river system or the Great Lakes. If there are mountains in the pertinent area, orographic precipitation would generate the needed rain, or cloud seeding could be used on the open plains.

Figures 12A, 12B:
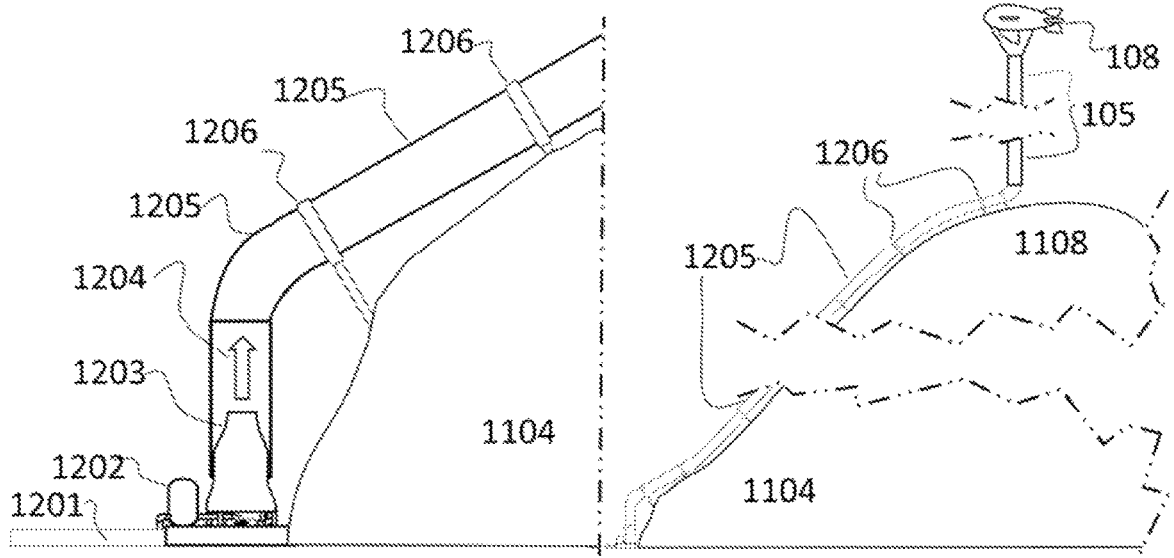
FIGS. 12*a* and 12*b*—Example of Inland Mountain Concept

FIG. 12*a* illustrates a close up of FIG. 12*b* describing an example of the system being used further inland to move water over mountains where the altitudes required exceed the capability of the ship, boat, or barge system or if the area is inaccessible to the larger equipment. The equipment in this example is located at the bottom of the Sierra Nev. foothills 1108 where they meet the San Joaquin river valley. The water source 1201 in this scenario is a tributary of the San Joaquin River. The water is piped thought filter 1202 and pumped through the propulsion unit 1203 resulting in a freshwater aerosol represented by arrow 1204 forming in the exhaust. A rigid air tube 1205 may be supported on stanchions 1206 to the top of the foothills 1108. At the top of the foothills 1108 the rigid tube 1205 may be connected to the flexible air tube 105 and aerosol 1204 may be moved into the air tube 105 which is supported by blimp 108. The aerosol 1204 will exit the air tube 105 and be released into the atmosphere at a height sufficient to allow the cloud to pass over the high ridge of the Sierra Nev. mountain range.

The concept of a system as shown in FIGS. 12*a* and 12*b* can be used on other stationary facilities such as oil drilling platforms commonly found offshore in California and in the Gulf of Mexico. Often the drilling platforms have a need to burn off gas that is commonly found when drilling for oil. This gas could be accumulated on site and use to provide power, e.g., to power the engines that drive the water vaper skyward. In the Gulf of Mexico, the clouds generated in this manner may increase the areas albedo, cool the surface water, and reduce the severity of severe weather events.

The Power System Engines

The engines used during the development stages of the various concepts described in this patent may be small piston engines. For the deployed rain system to be effective, the engines that power the effort may need to be large and be capable of moving tons of air in order to move enough moisture into the man-made clouds that they saturate to be capable of delivering rain downwind from the cloud initiation site. One type of engine has the needed performance parameters may be the large fan jet engines that power large, long rang, commercial and military air transport jet airplanes.

Figure 13:
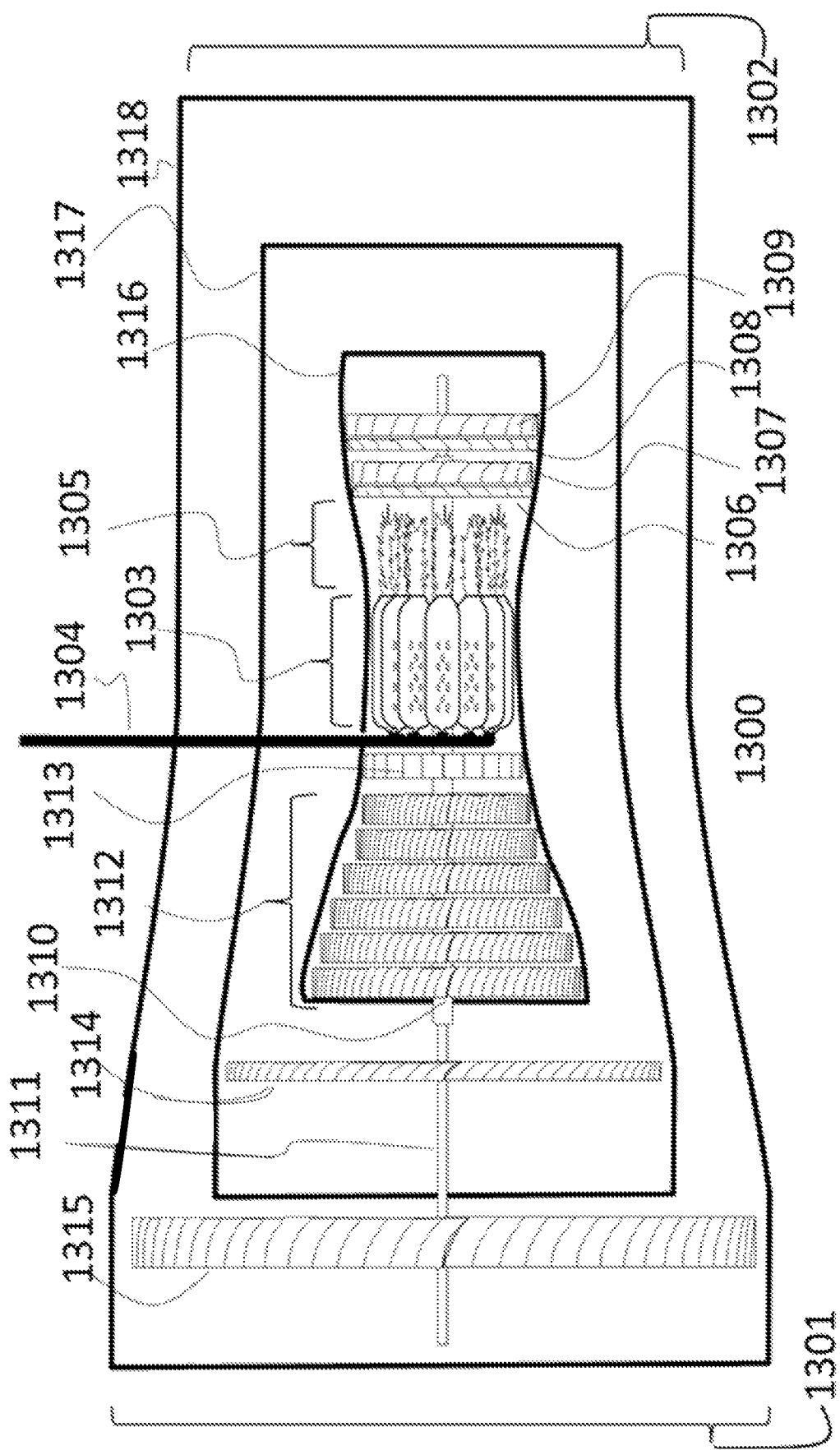
FIG. 13—Large Fan Jet Engine.
Figure 14:
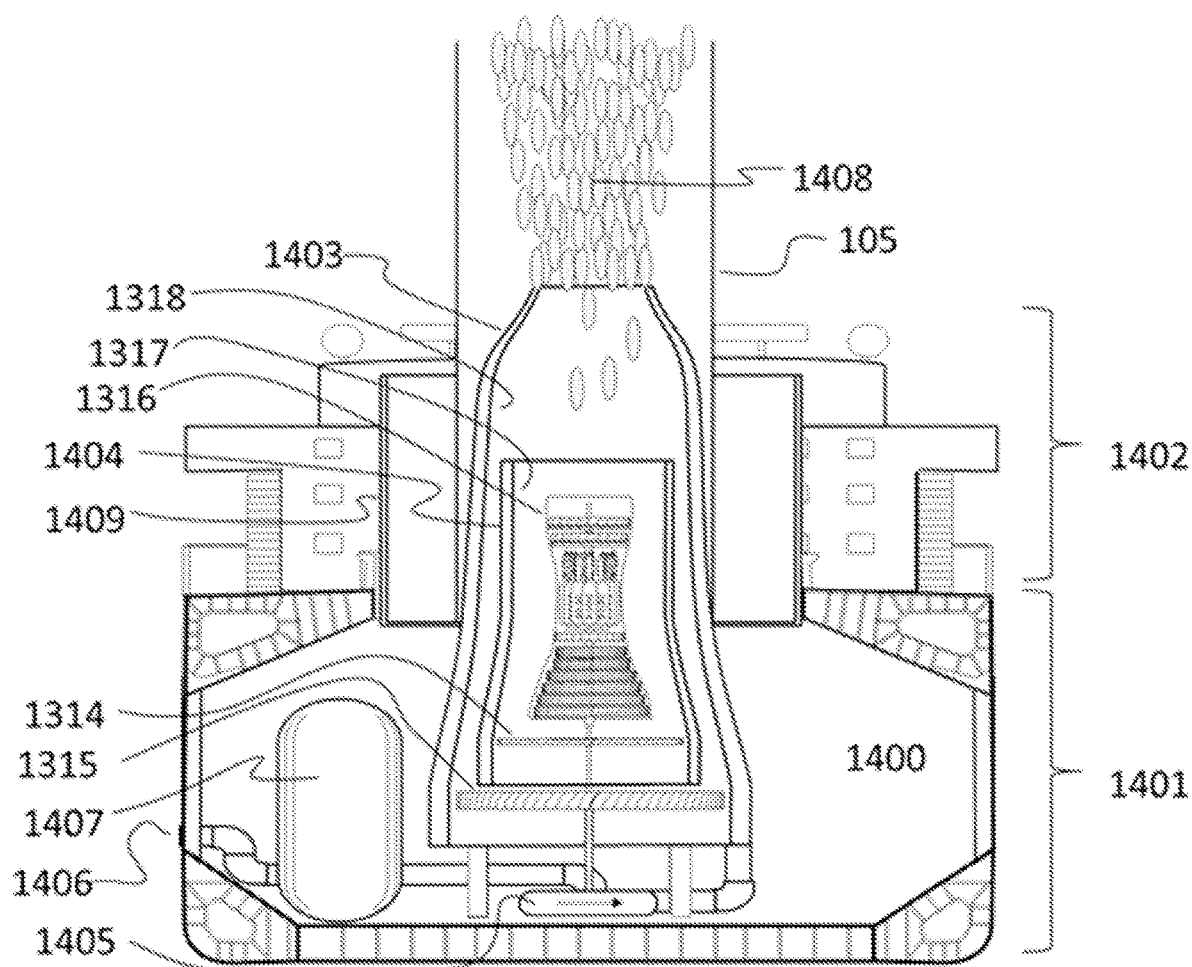
FIG. 14—Shipboard Fan Jet Cloud Generation System.

FIG. 13 illustrates a typical fan jet engine 1300 used in aviation applications for large aircraft with the cowlings 1316, 1317 and cowlings or nacelle 1318 cross sectioned. The dimensions of the engine may be about nine feet in diameter at the input end of the engine 1301 and about fifteen feet long. The thrust from the engine comes from the exhaust which exits at the back of the engine 1302. The heart of the engine is the combustion chambers 1303 that burn the full supplied via the fuel line 1304 and generates an exhaust flame 1305. The pressure from the exhaust flame 1305 turns the turban rotors 1307 and 1309 which are connected to the drive shafts 1310 and 1311 respectively. The stators 1306 and 1308 direct the air into the buckets of the turban rotors 1307 and 1309 respectively.

In some implementations, the 6 stage compressor section 1312 is connected to shaft 1310 and compresses the incoming air before it gets to the combustion chambers 1303. The stator 1313 directs rotating air from the compressor into the combustion chamber 1303. The basic gas turbine is housed in cowling 1316. The fan 1314 which is connected to shaft 1311 provides air that bypasses and cools the engine.

In some implementations, fan 1315 may be attached to shaft 1311 and provide more air that bypasses both the gas turbine consisting of cowling 1316 and internal parts and the jet engine section which includes cowling 1317 and the parts internal to that cowling. The net effect may be to provide a much larger volume of air through the engine that is moving at lower speeds, with a lower temperature exhaust, and less noise. A large fan jet is typically capable of maintaining a pressure ratio of 30 to 1 in the compression stage 1312, having an air bypass ration of 5 to 1, and the capability of pushing 1.5 tons of air per second.

Referring to FIG. 14, a large fan jet engine of FIG. 13 may be installed in an ocean going freighter 1400. In some implementations, most of the equipment is mounted in the ship's hold 1401 as opposed to the ship's superstructure 1402. The fans, 1314 and 1315 as well as the gas turbine may drive the aerosol vertically upward through the cowlings 1316, 1317, and 1318 and into tube 105. Outer cowling casings 1404 and 1403 have been added cowlings 1317 and 1318 respectively to form water jackets. In some implementations, water between the cowlings 1317 and 1404 as well as between cowlings 1318 and 1403 will be heated prior to being sprayed into tube 105 forming a very wet aerosol 1408. The water may be pumped into the system by pump 1405 which may be driven off the same shaft as the fans 1314 and 1315. The water may be supplied to the pump through an intake 1406 and filter 1407. FIG. 14 further illustrates a basket 1409 that may hold the material from the flexible tube 105 when it is not deployed skyward. In some implementations, a salty brine may be likely to collect in the basket 1409 and may be drained overboard.

The de Laval Nozzle 1500 shown in the cross section FIG. 15 is commonly used for propulsion in today's large rocket engine has been used in steam turbines as far back as the year 1890. Fuel may be supplied via an input pipe 1505 with an oxidizer via pipe 1506 to the combustion chamber 1501 where igniter 1507 initiates combustion of the fuel and oxidizer. The heated gas is forced through the convergent stage 1503, through the throat 1502 and out through the divergent section 1504. The gas velocity in the throat 1502 of the nozzle 1500 is maintained at a hypersonic speed and as such, pressure waves may not travel from the output end of the nozzle back through the throat and affect the ignition in the combustion chamber.

In pertinent regards, the de Laval nozzle combustion chamber 1501 may be similar to the combustion chamber of a fan jet 1303. The de Laval nozzle 1500 does not require a compression section 1312, stators 1313 & 1303, or the turbine 1307 needed to operate the compression section 1312. In some implementations, the simplicity of an engine built similar to a fan jet but utilizing the de Laval Nozzle may be more cost effective than alternatives described in this disclosure.

Large rockets may use liquid hydrogen ($H_2$) and an oxidizer in the combustion chamber for the short burn time associated with the launch of the rocket. Aircraft fan jet engines are not designed to run on hydrogen when used in aviation applications since the fuel storage requirement would be 5 times the volume needed for today's aviation fuel making the hydrogen gas option impractical. In the application described in this patent, fuel and oxidizer or oxygen storage volume is not a significant drawback. Hydrogen ($H_2$) fuel and oxygen ($O_2$) can be supplied in compressed gas tanks. The exhaust from the de Laval nozzle may include super-heated high pressure steam.

The de Laval Nozzle Fan Engine 1600 powered by de Laval Nozzles 1500 1614 is shown in three views. FIG. 16*a* illustrates the engine installed in a ship with only the upper deck 1615 and the lower deck 1616 cross sectioned. The major components identified in this view include the rigid fan housing 1601, the rigid turbine housing 1602, and the water tank housing 1604. The height of the rigid turbine housing 1601 can be several hundred feet where it is connected to the flexible tube 105 when greater heights are desired. The water tank 1604 is positioned to recover heat energy from the combustion process. The tank 1604 may be filled with water though the input 1607 to the tank water level 1613. The output from the tank is plumbed into a water pump 1606 which feeds a distribution system 1605 to spray nozzles mounted on manifold 1603.

FIG. 16*b* shows the de Laval Nozzle Fan Engine 1600 with ships decks 1615 and 1616 cross sectioned as well as the fan housing 1601, the turbine housing 1602, the water tank housing 1604 and the water spray system manifold 1603. In this example, there are four de Laval nozzles 1614 mounted to the turbine housing 1602 inside the water tank 1604 and below the tanks water line 1613. There may be a second water spray manifold 1610 inside the turbine housing 1602 and above the turbine 1611. The drive shaft 1609 connects the rotor 1621 on the turbine 1611 to the air fan 1608. In some implementations, a de Laval Nozzle Fan Engine may include 2, 3, 5, 6, 7, 8, or more de Laval nozzles.

FIG. 16*c* may include all the previously mentioned parts of the de Laval Nozzle Fan Engine 1600 cross sectioned as well as depicts two of the four de Laval Nozzles 1614. The insides of all four de Laval Nozzles are exposed with the insides of the de Laval Nozzles located in back visible through the mounting portholes 1612 and 1619 in the back of the turbine housing 1603.

The engine in FIG. 16*c* is shown in its operational mode. There is ignition 1618 in the combustion chambers and exhaust 1617 leaving the nozzle 1614. As depicted, the exhaust is driven up the turbine chamber 1603 through the turbine 1611 stator 1620 which drives the gas into the turbine buckets on the turbine rotor 1621. The exhaust gasses next pass through the manifold 1610 where water 1622 is sprayed into the gas column lowering the temperature of the exhaust gasses before entering the fan housing 1601. The fan housing 1601 is rigid and can extend several hundred feet operating independently or extended with the flexible air shaft 105.

When the exhaust gasses 1622 enter the fan housing 1601, they may be mixed with a combination of air and/or water being sucked into the housing by the fan 1608. The water may be sprayed from the nozzles in manifold 1610 which mix with the air entering the fan housing at the air intake 1624. The amount of water and air added to the exhaust from the turbine needs to be adequate to reduce the temperature of the super-heated steam exhaust leaving the top of the fan housing to an acceptable level for the flexible air shaft 105 (e.g., a level that is selected to not damage flexible air shaft 105, and/or not reduce the lifespan of flexible air shaft 105 in a manner deemed impractical).

In some implementations, the added aerosol 1408, 1622 and 1623 is water or saltwater. In some implementations, additives such as fire retardant, pesticides, or antifungal may be included when needed to fight fires, insect problems, or undesirable fungi.

Fuel to Power the Engines

In some implementations, small scale systems used during the development stages of the concept described in this patent may be likely to use a number of engine types to drive the fan and/or heat the aerosol resulting in the energy needed coming from the electric power grid, gasoline, diesel, aviation gas, kerosene, etc. For the deployed system, it may be advantageous to burn hydrogen since the exhaust from the engines would be high temperature steam rather than some combination of hydrocarbons and other chemicals.

In a 1955 US Air Force experiment, a B-57 bomber out of Wright Field flew with one of the jets engines fueled with liquid hydrogen and the other on conventional jet fuel. Many of the rockets used to launch objects into space were powered by liquid hydrogen burned in a de Laval Nozzles. The exhaust exiting the jet and rocket engines burning hydrogen is high temperature steam and that would be advantageous in the application described in this patent. Liquid hydrogen rather than hydrogen in the gaseous form is used in rocket applications because the volume needed to store the gaseous hydrogen would be larger than the vehicle itself. Large volumes are manageable in the cloud generating application described herein. A common way of generating hydrogen that could be used to power an internal combustion engine, the fan jet engine 1300, or the de Laval Nozzle fan engine 1600, is by splitting water with electrolysis. The basic equations for electrolysis and the combustion of hydrogen gas are:

Electrolysis: $2H_2O \rightarrow 2H_2 + O_2$

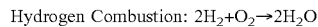

Hydrogen Combustion: $2H_2 + O_2 \rightarrow 2H_2O$

There may be byproducts associated with electrolysis from salt water, but a properly designed system can manage the problems of byproducts of saltwater electrolysis which may include chloride $CL_2$, sodium hydroxide NaOH, potassium hydroxide KOH, and/or other byproducts.

Figure 17:
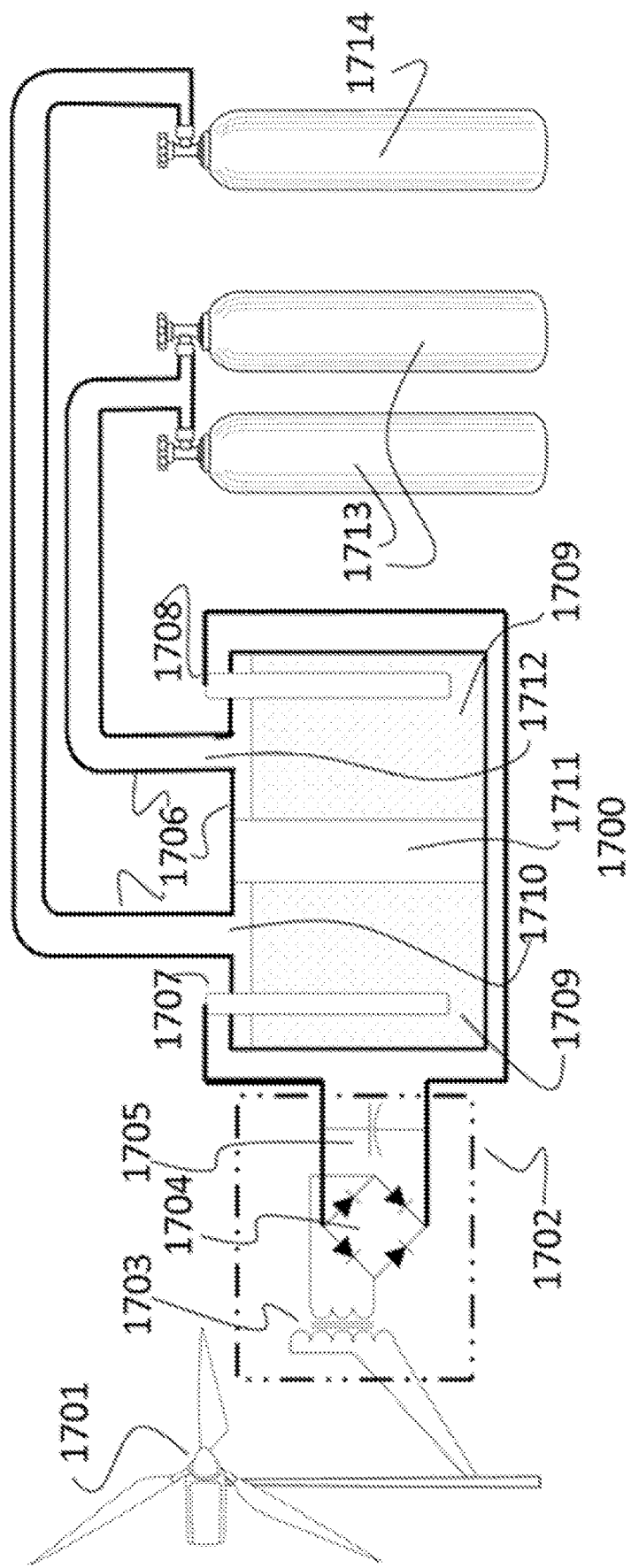
FIG. 17—A Basis Polymer Electrolyte Membrane Electrolysis System.

FIG. 17 illustrates a basic polymer electrolyte membrane (PEM) electrolysis system. A PEM 1711 located between the anode 1705 and cathode 1708 is not required but is normally used since it makes this type of system smaller and more efficient.

The input to the electrolysis system may be a wind powered electric generator 1701. In some implementations, the AC output from the generator may be fed into a power conditioning unit 1702 where the voltage is stepped down via transformer 1703, rectified with a full wave bridge 1704 and filtered using the capacitor 1705 resulting in a low DC voltage at the output of the power conditioning unit 1702 and going to the electrolyzer tank 1706 with the positive connection going to the electrolysis anode 1707 and the negative connection going to the cathode 1708. In the electrolyzer tank 1706 water acts as liquid electrolyte 1709 allowing hydrogen protons that form at the anode 1707 to move to the cathode 1708 to form $H_2$ molecules while the oxygen ions move in the opposite direction forming $O_2$ molecules near the anode. The hydrogen gas in the form of $H_2$ accumulates above the water in the tank near the cathode 1708 in the area 1712 and the oxygen accumulates on the anode 1707 side in area 1710. The hydrogen and oxygen is moved to gas bottles 1713 and 1714 respectively for storage and transportation.

Figure 18:
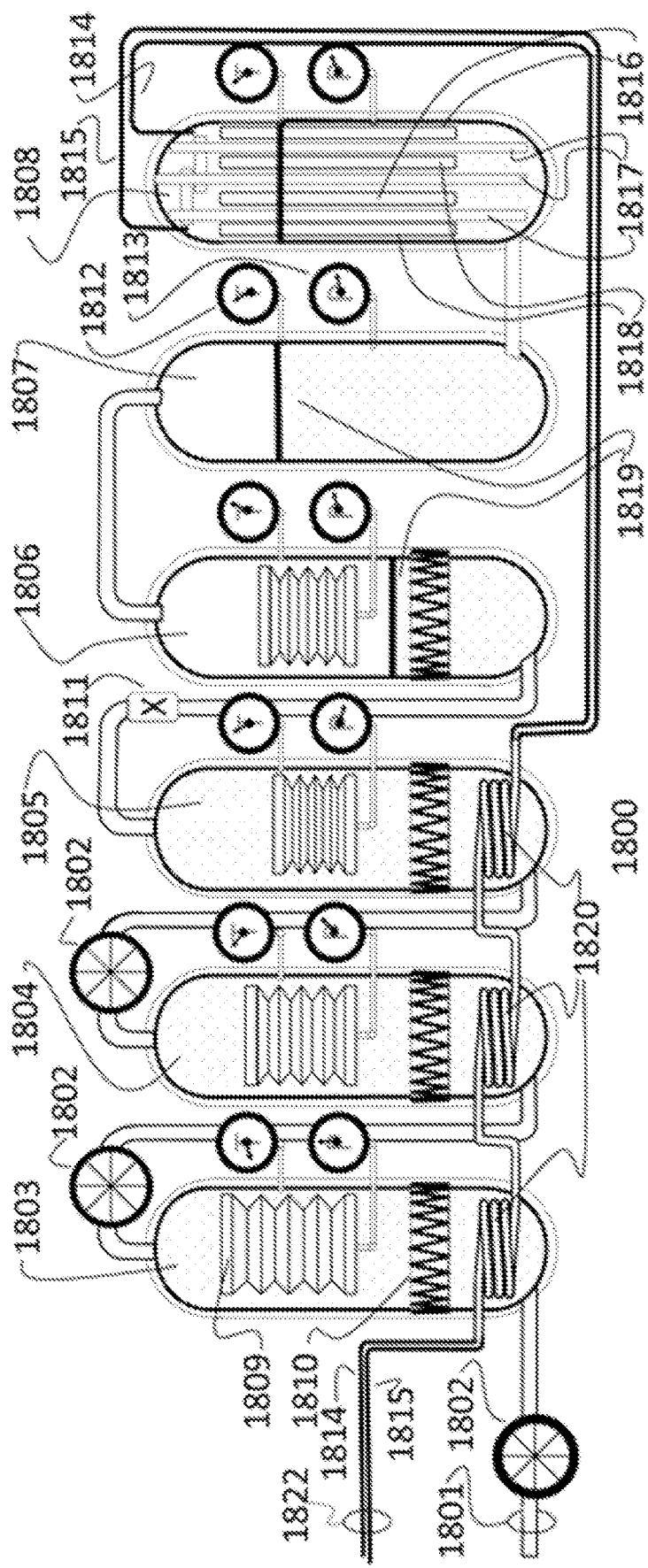
FIG. 18—A 6 Stage High Temperature High Pressure PEM Electrolysis System.

FIG. 18 illustrates a type of electrolysis equipment 1800 that may be likely to be utilized with the equipment described herein. In some implementations, at the high pressure and temperature end of the system tank 1808, the gasses and liquid may be operating in the 600° C. range and at pressures in 5 kPSI range. The equipment is shown with the pressure vessels and surrounding thermal insulation in cross section.

In some implementations, saltwater or freshwater may enter at the system's input 1801 and be pressurized by pump 1802. From there it may enter pressure vessel 1803 where the heating element 1810 will increase the temperature of the water. The metal bellows 1809 may maintain the pressure in the vessel as the water expands or contracts or is pumped into or out of the vessel. The water in each tank may be monitored by temperature gage 1812 and the pressure gage 1813. From pressure vessel 1803 it is pumped into pressure vessel 1807 where the pressure and temperature are again increased. From there another pump 1802 is used to pump the water at higher pressures in pressure vessel 1805 where further heating of the water will take place.

In some implementations, between pressure vessels 1805 and 1806 there may be a pressure reducer 1811 that will reduce that along with the heating element in pressure vessel 1806 will cause the water to vaporize. The liquid level in the tank may be maintained at the waterline 1819. The water vapers will move to pressure vessel 1807 where it may condense and maintain a liquid level at the waterline 1819.

In some implementations, from pressure vessel 1807 the hot, pressurized, distilled water will move into the PEM electrolyzer in pressure vessel 1808. The electrolyzer has two anodes 1818 and two cathodes 1816 separated by PEM 1817. The heated and pressurized oxygen gas form the anodes is collected exits the pressure vessel 1808 via pipe 1815 while the hydrogen is collected from the cathodes and exits via pipe 1814.

In some implementations, at the system output, the hydrogen in pipe 1814 and the oxygen in pipe 1815 may be at high pressure and relatively low temperature. At that point, the hydrogen and oxygen if needed may be stored in tanks that will be used for storage and/or transportation.

Figure 19A:
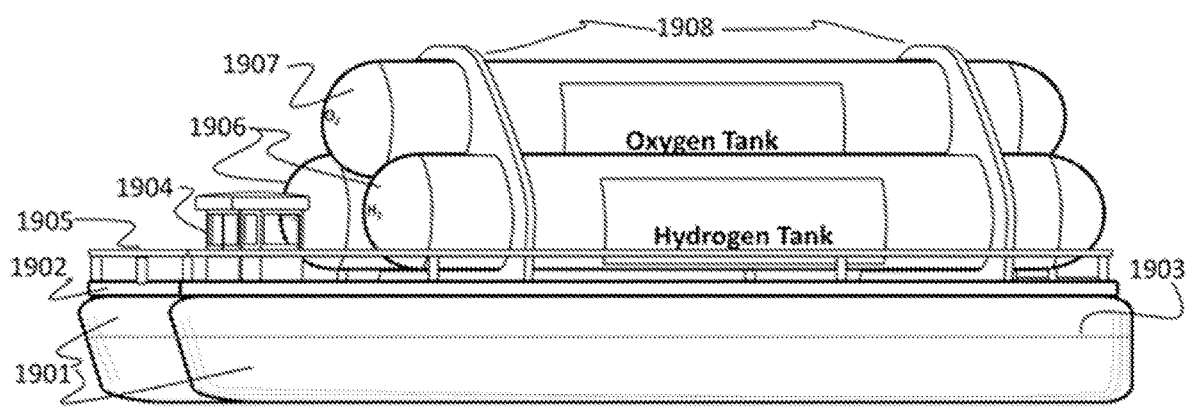
FIGS. 19*a* and 19*b*—A Hydrogen and/or Oxygen Storage and Transportation Boat or Barge.
Figure 19B:
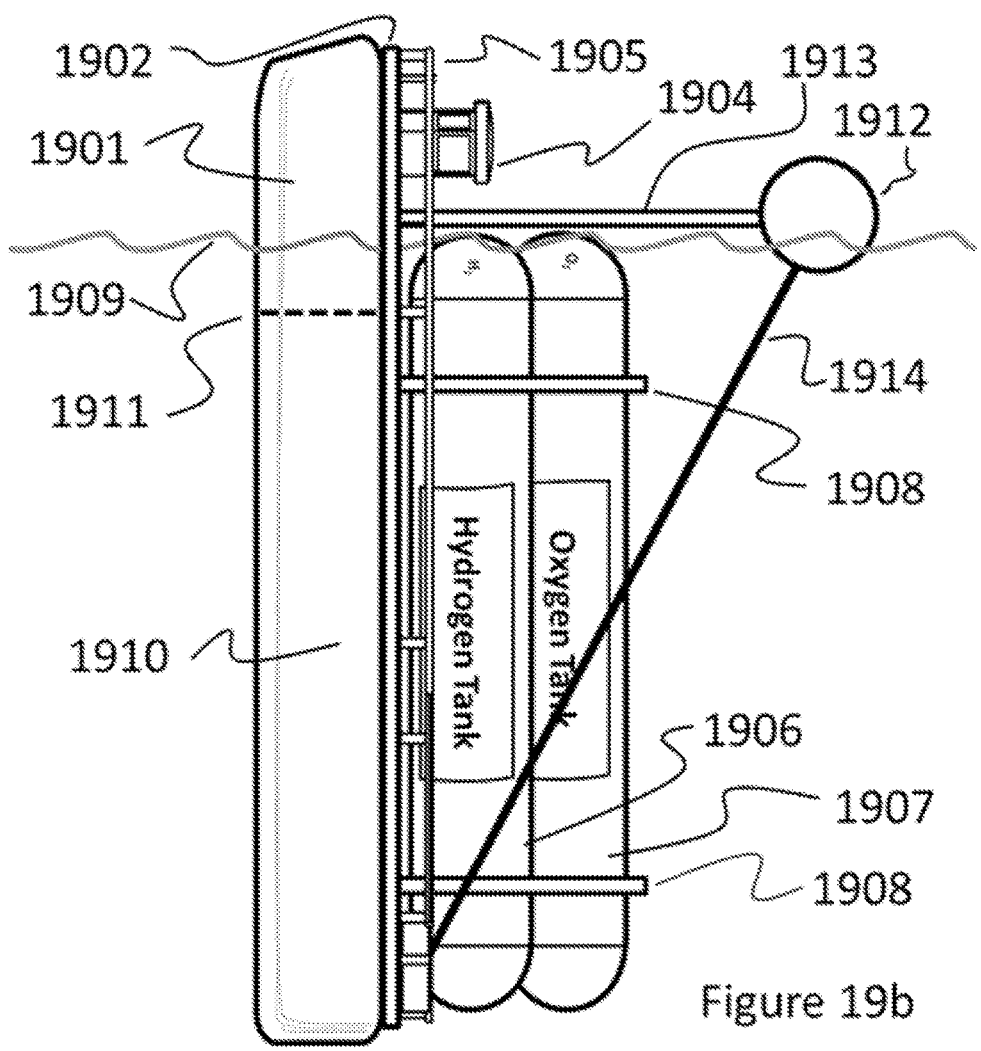

FIGS. 19a and 19b illustrates a hydrogen and/or oxygen storage and transport boat or barge. In some implementations, during the loading process, the empty tanks may first be flooded with water resulting in the partial sinking of the boat and tanks as shown in FIG. 19b. When the high pressure gas is introduced into the tanks the pressurized water that is forced out of the tank may be used in an energy recovery effort to drive the pressurization pumps 1802, electrical generators that provide energy to the heating element 1810 or similar tasks.

In some implementations, the fuel barge (or boat) 1900*a* or 1900*b* may be a catamaran with two hulls 1901, a deck 1902, equipment shack 1904, guard rail 1905, two hydrogen tanks 1906 and an oxygen tank 1907. The tanks are secured to the deck with structure 1908. The barge can be designed so that the weight associated with a loading process where the tanks are flooded with and the water is then displaced by gas can be accommodated without sinking the barge below a safe water line 1903 shown in 1900*a*. This will allow the tanks to be filled with water or other fluid prior to introducing the pressurized gas from the output 1822 of an electrolysis system 1800. The pressurized fluid leaving the storage tanks 1906 1907 can then be used to drive the compression pumps 1802 or other energy recovery devices. If the tanks 1906 1907 are large they can be submerged when filled with water as shown in 199*b* where the assembly 1900 has been flipped. As depicted, the back compartment 1910 half of the hull 1901 has been flooded along with tanks 1906 1907 allowing the tanks and part of the hull 1901 to be submerged below the water's surface 1909. A stabilizing float 1912 has been added and is connected to the hull by spars 1913 and cable 1914.

Power for Electrolysyis

Power to operate the electrolysis equipment needed to separate hydrogen and oxygen may come from multiple sources. The environmental impact, quality of life for those in the area, the mobility of the system, and the applicability of the source are all considerations. For the application described herein, one power source is an offshore windfarm. Placing a buoy or mooring in deep or littoral waters may cause new ecosystems to develop much like a coral reef. The low level altitude winds are normally stronger and more consistent at sea than on land. Generating and storing hydrogen and oxygen fuel offshore would help the impact on residential areas would be minimized.

Referring to FIG. 20, a way is illustrated of providing the electrical power at sea needed for an electrolysis process that would generate and accumulate hydrogen gas that would be used in the fan jet engine system 1400 or the hydrogen and oxygen needed for a de Laval Nozzle fan engine system 1600. In some implementations, the electrolysis system 1800 would be mounted in the forward section of the hull 2001 forward of the hold 2009. Those schooled in the art would know that there have been many such schemes suggested for generating power from ocean winds The wind powered hydrogen generating station 2000 described here may be a boat or barge that is tethered to a mooring and uses common wind powered generators 2006 to generate electrical power. The hull 2001 includes a hold 2009 where the generators 2006 are kept when the frame 2007 is lowered. The energy source for the system is the wind which turns the wind powered electrical generators 2006. As depicted, the 18 wind power electrical generators 2006 shown here are mounted on frame 2007 that can be in the raised position FIGS. 20*a* and 20*b* for normal operation. The frame 2007 and associated generators 2006 can be lowered as shown in FIGS. 20*c* 20*d* and 20*d* when not in use. The generating station has wind vanes 2002 located near the stern of the generating station 2000 hull 2001 that will keep the bow of the equipment pointed into the wind while tethered at a mooring. In some implementations, the wind vanes can also be lowered to the deck when not in use.

The hydrogen generating station 2000 may be also equipped with masts 2003 used to support the raising and lowering of the frame 2007 and associated generators 2006. The mast is self-standing but supported by stays 2005. Included are halyards 2008 that are controlled from the deck area and can be lengthened or shortened to lower or raise the frame 2007. The supports for the masts 2003 include spreader 2004 that hold the masts 2003 apart.

Those schooled in the art will recognize that there are many ways to support the masts as well as raise and low the frames. Multiple stays and shrouds are commonly used to reduce the structural requirements on the masts. In this configuration, the masts 2003 are mounted on the deck and can be lowered when not in use.

Wind turbine electricity generators are designed to operate efficiently within a range of wind speeds. Typical land based installations are mounted on tall masts to take advantage of the increase in velocity of the wind as the altitude above the earth increases.

At sea on a barge 2000 a tall mast can become a significant stability problem when the winds increase. In one specific application considered herein, the greatest demand for $H_2$ and $O_2$ fuel for generating rain in the San Joaquin Valley target area is during the summer months when the skies are blue (clear) and the winds are gentile. In the weeks when only light winds are forecasted, sails will be used on the barge or boat 2000 to increase the velocity of the wind seen by the wind turbine electrical generators 2006 or 2118.

The sails 2101 in FIGS. 21*a*, 21*b* and 21*c* may be connected to the aft section of the hull 2001, the masts 2003 and the top of a whisker pole 2102. The whisker poles 2102 have one end mounted to the deck and a pole guy 2103 connected to the outside ends of the whisker poles 2102. There is a sheet 2104 or line 2104 attached to the outside lower corner of the sails 2101 that will be used to trim the shape of the sail 2101 along with changing the length of the whisker pole 2102 and adjusting the pole guy 2103. With the configuration of FIGS. 21*a* 21*b* and 21*c* an increase in wind velocity is likely resulting in greatly increasing the wind energy available to the wind turbine electrical generators 2006.

FIGS. 21*d* and 21*e* include an upper sail 2108 attached to the masts 2003 and the outside ends of the whisker poles 2102. The upper section of the sail 2108 is a lighter than air inflated balloon. The balloon 2107 section of sail 2108 is likely to be filled with hydrogen from the electrolyzer 1800 in the hull 2001 of the barge or boat 2000. The top of the sail 2108 is tethered to the mooring float 2106 or buoy 2106 by guys 2109. The advantage of this approach may be that the maximum cross section area of the sail 2108, the guys 2109, the whisker poles 2102, and the mooring lines 2105 can be increased significantly and can make very light wind days extremely productive.

FIGS. 21*f* and 21*g* illustrate a more conventional design where the sail 2113 resembles a spinnaker on a sailing yacht. To accommodate this sail, a main mast 2110 a stay 2113, and a bow sprit 2112 have been added. With this design, the maximum usable size of the sail 2113 would be limited by the height of mast 2110.

FIGS. 21*h* and 21*i* illustrate a front and side view of an alternative way of mounting a wind turbine 2118. The wind turbine blades 2114 are mounted in a housing 2115. The housing is connected an air duct 2116 that is connected to the sail 2117. The arrangement is designed to maximize the efficiency of the wind turbine system. Wind turbines can be arranged in series with the wind turbine of FIGS. 21*h* and 21*i* mounted behind the wind turbines of 21*d* and 21*e*.

Figure 22A:
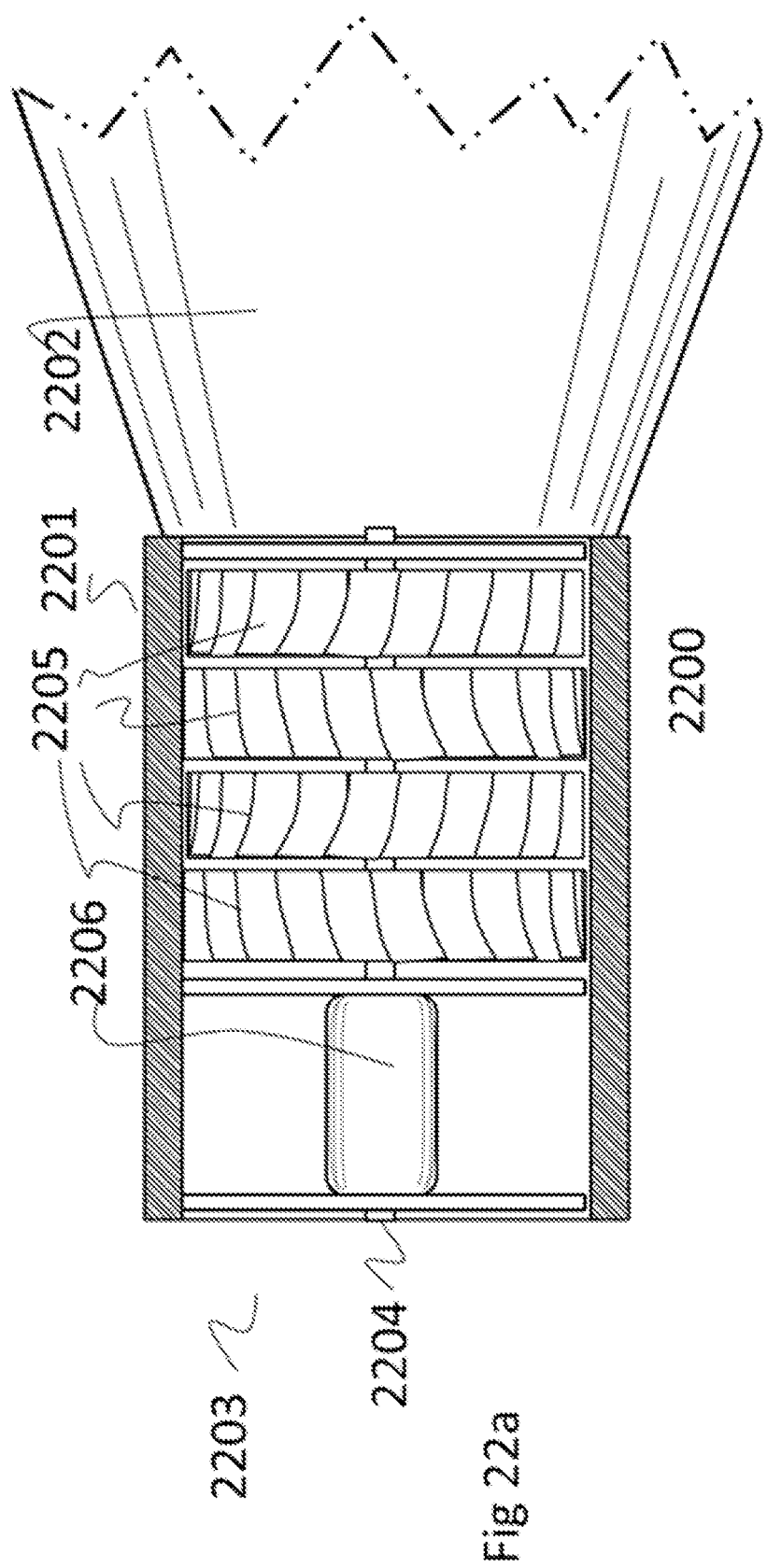
FIGS. 22*a*, 22*b*, 22*c* and 22*d*—Water Turbine Electric Power Generator.
Figure 22B:
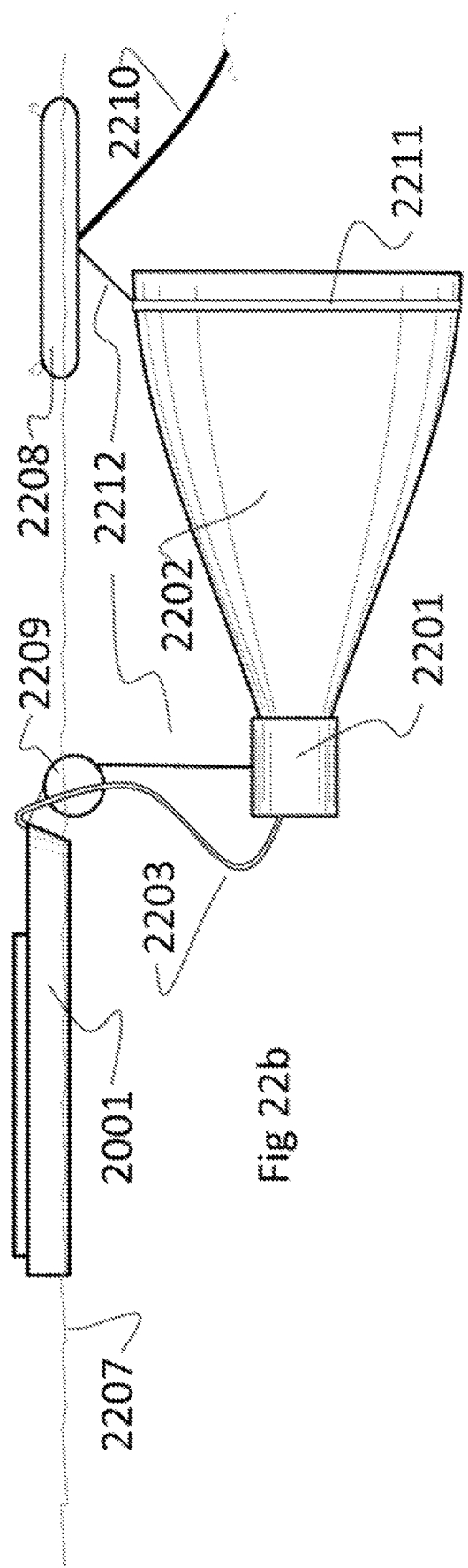
Figure 22C:
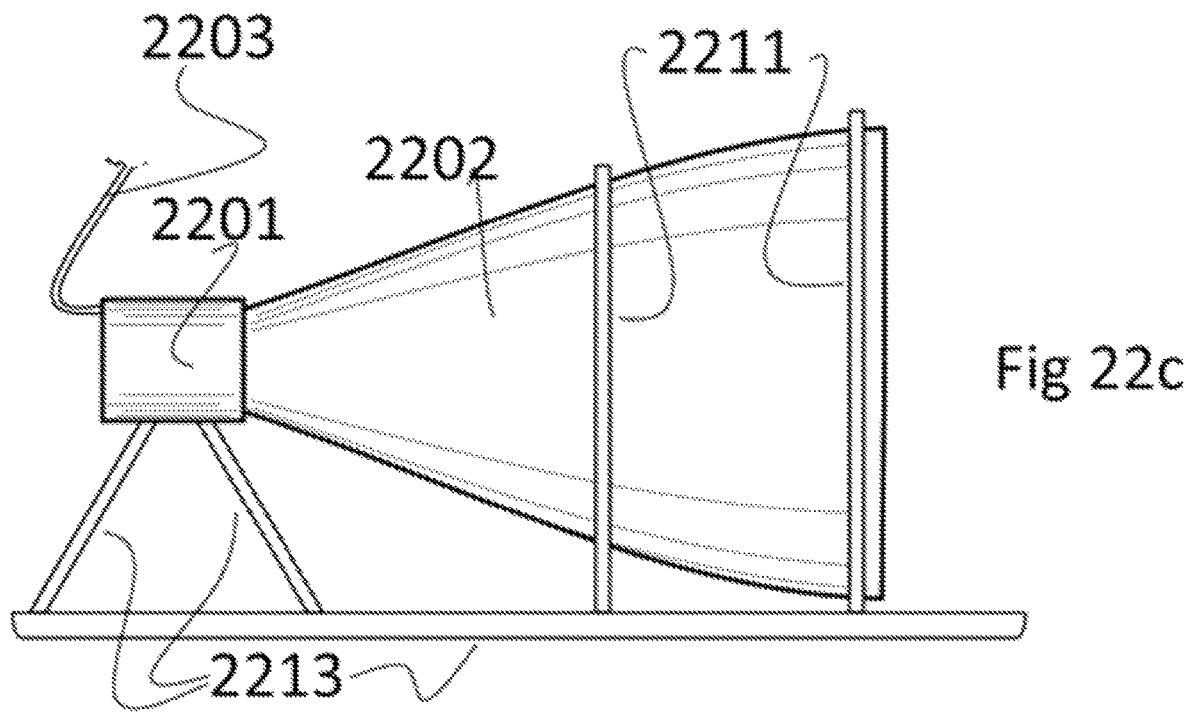

FIGS. 22*a* 22*b* and 22*c* illustrate water turbine electric power generator 2200 that may generate electrical power at sea or on a river for the electrolysis process that breaks down water into its components of oxygen and hydrogen. FIG. 22*a* illustrates the water turbine with housing 2001, four concentric shaft 2004, four turbines 2205 mounted on the concentric shafts with each consecutive turbine 2205 rotating in the opposite direction as the next. The four turbines 2205 are mounted on four concentric shafts with each shaft connected to one of four separate rotors in the generator 2206. The water leaving one of the turbine 2206 buckets is directed into the bucket of the next turbine downstream. The flow of water may be concentrated with funnel 2202 increasing the flow through the turbines 2205. The electrical generator 2206 has output cable 2203 providing electrical power to the barge or boat 2001

FIG. 22b illustrates a deep water configuration where the generator 2201 and funnel 2202 are suspended below the surface of the ocean 2204. The funnel 2202 input end may be supported by a frame 2211 that may be connected to a large mooring buoy 2208 with a tether 2212 and the generator housing 2201 is tethered to a smaller float 2209. A barge or boat 2001 with the electrolysis equipment aboard may be fed power via the electrical cable 2203. The large mooring buoy 2208 is connected to the seabed with mooring cable 2210.

FIG. 22c illustrates a configuration designed to sit on a river bottom or ocean floor. The funnel 2202 has two frame supports 2211 and is mounted on a skid 2213 which supports the funnel 2202 via the frames 2211. As depicted, the electrical generator 2201 is supported by the skid 2213 and is connected electrically to the surface by cable 2203.

Figure 22D:
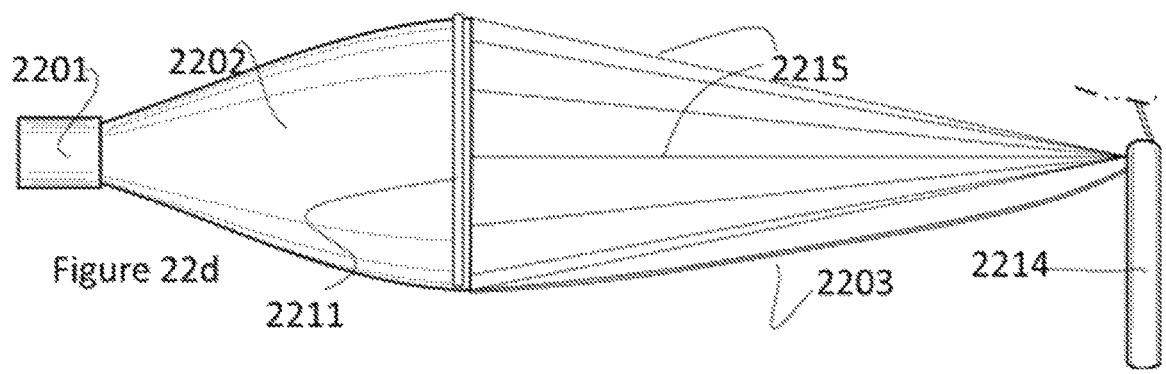

FIG. 22d is set up for areas where the direction of the water current changes directions as it does in a tidal zone. The generator 2201 and funnel may be slightly buoyant and float upward when the water is not flowing. The generator and funnel 2202 are held in place by tethers 2215 that are connected between the funnel 2202 support frame 2211 and a mooring post 2214 anchored in the seabed or river bottom.

FIG. 23a illustrates a solar farm 2301 floating on the surface of the ocean 2303 or other body of water and held in place by a mooring cable 2302. A solar farm 2301 deployed on the open ocean is likely to be exposed to sever storms that may damage or destroy the solar farm. Finding a safe place for a solar farm that may cover several acers of ocean could be difficult and the time needed to secure a solar farm 2301 in a traditional manner may not be available. FIG. 23b illustrates the same area of the ocean under hurricane conditions. The wave seen at the ocean's surface 2303 has peaks 2305, troughs 2307, wavelength 2304, and wave height 2306. The wave action causes water particle movement 2308 below the ocean's surface with less movement as the depth increases.

Ocean storms with hurricane force winds may generate huge waves with water particle 2308 movement deep into the ocean. This particle motion 2308 is negligible one-half-wavelength 2311 below the wave trough 2306 2309. During a storm, the hull or hulls of the solar farm may be flooded causing solar farm 2301 to sink below the significant water particle motion 2310 for safe keeping during a storm. During hurricanes, wavelengths 2304 of eight hundred feet and wave heights 2306 of one hundred feet can be reached resulting in safe depth 2310 for the submerged solar farm 2301 four-hundred-fifty feet below the surface of the ocean 2303. The submergible solar farm 2301 can be designed to survive at shallower depth when a storm passes through. Once the storm has passed, the submergible solar farm 2301 will be raised by inflating a bladder or part of the hull with air or other gas, or lifting the farm with cables or some combination thereof. Once on the surface, water may be pumped out of the hulls of the solar farm 2301 allowing normal operation.

In some implementations, this submersible storage technique can also be used for the fuel storage barges of FIGS. 19a and 19b when faced with a storm at sea or for long term storage.

Figure 24:
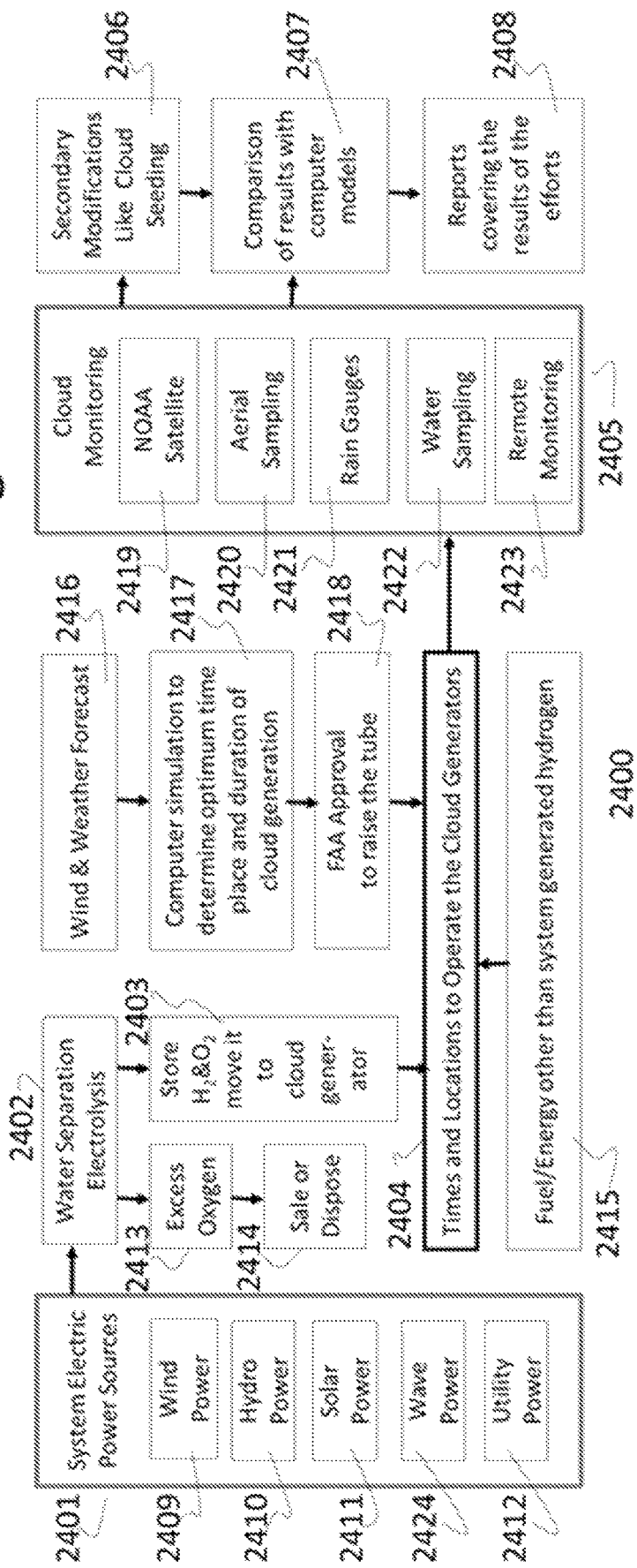
FIG. 24—Exemplary System Block Diagram.

FIG. 24 illustrates an exemplary block diagram of the cloud generating process for a deployed system. One chain of events to generate clouds would be to start with the system generated electrical power source 2401 wind power 2409 with an offshore barge 2000 to power the electrolysis operation 2402 to generate hydrogen ($H_2$) and Oxygen ($O_2$). The $H_2$ & $O_2$ would be stored 2403 and moved in a transport boat 1900 to the cloud generating station 2404 to meet up with the cloud generator 200. The cloud monitoring 2405 may be done by aerial sampling 2420 and using fixed wing aircraft and drones to sample the clouds as well as rain gages 2421 on the ground. The county that was being targeted for rain would cloud seed 2406 with silver iodine. The results would be evaluated 2407 and results reported 2408.

There are a number of options for System Electrical Power Source 2401. Wind Power 2409 is a likely source that would be readily available if the System Electric Power Source 2401 and the Water Separation Electrolysis 2402 are being done offshore and away from populated areas and the equipment might look like that shown in FIGS. 21d and 21e. It would be recognized by those skilled in the art that there have been many wind power schemes suggested over the decades.

Hydro Power 2410 is another possibility for System Electric Power 2401. When considering hydro power for a system operating off the California coast, the coastal currents that flow south from Alaska can be harnessed with a device like that shown in FIG. 22b could be used. There are a number of devices that have been built that harness strong tidal currents that flow in places like the Bay of Fundy or off the northern coast of Scotland. In a river system, the river currents could be harnessed directly or through the introduction of a dam to concentrate the river current into a turbine generator. One of the products of water electrolysis 1700 is $O_2$ and if the engine for the rainmaker is a Fan Jet 1300 rather than a de Laval Nozzle, the disposition of the excess $O_2$ 2413 would need to be determined 2414.

The fuel that is used to power the Cloud Generators 2404 does not have to be system generated hydrogen. In the initial stages of the program, there will not be powered by large fan jet motors converted to run on hydrogen or de Laval Nozzles. The mechanisms driving the fans in the Cloud Generators 2404 are likely to be internal combustion engines, electric motors, or gas turbines running on aviation fuel or bottled gas. The fuel for these fan engines will be supplied a fuel source 2415 that is outside the system shown in the block diagram of FIG. 24.

A primary input into the decision making is the Wind & Weather Forecast 2416 which has improved significantly in recent decades. Another primary input is the topology of the land between the target area and the point chosen to initiate the Cloud Generation 2404. These inputs may be used in a computer simulation 2417 to determine the optimum time, place, and duration of cloud generation. Raising the tube 105, 106 & 107 to the heights described herein may involve meeting the requirements of the Federal Aviation Administration (FAA) including obtaining prior FAA Approval 2418.

FIG. 11 describes a section of California where the Pacific Ocean 1101 is adjacent to a significant section of the coastal mountains 1102. This is not the case in all parts of the California coast. The area with the least significant impedance for the prevailing winds from the coastal mountains into the Central Valley may be the sea level California ship canal which stretches from San Francisco Bay to Sacramento and Stockton Calif. in the heart of California's Central Valley. The San Joaquin Valley 1103 which is the southern part of the Central Valley has one of fastest rising land masses between it and the Pacific 1101 where the Santa Lucia Mountains rise out of the Pacific in the area known as Big Sur. Rather than trying to go over this area, it is likely that more efficient cloud paths would be found by going over the Pacheco Gap to the north of Big Sur and east of Monterey Bay or the Templeton Gap to the south near Paso Robles.

In California, the rainy season is in the winter and the summers are when the water scarcity becomes apparent. Since 1900 approximately 40% of the years have been draught years in the central valley. Much of the available water in the summer comes from the snowpack in the Sierra Nev. Mountains. Pumping ground water in the San Joaquin Valley has resulted in land subsidence of more than 30 feet in spots with the water table dropping ten times that in several places. It is likely that the greatest demand for water will come during the summer months in California.

Figure 25:
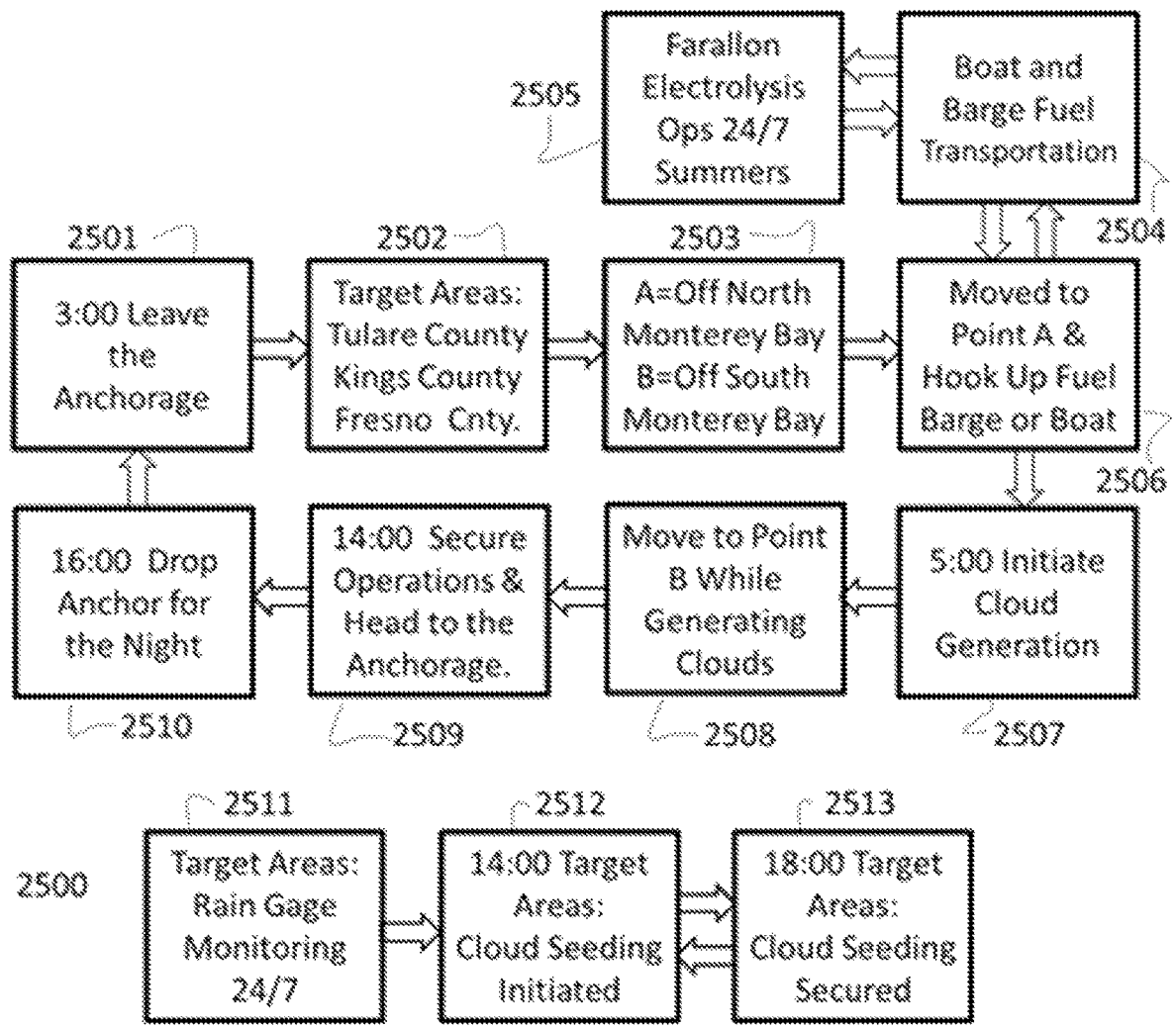
FIG. 25—Typical Daily Operation Block Diagram.

The daily operating sequence will be modified based on land topology, weather conditions, prevailing winds, available equipment and desired results. FIG. 25 is a block diagram of the daily sequence of operation 2500 for the system when operating in mid-summer in California, a period when water demand is often at its greatest.

Figure 26:
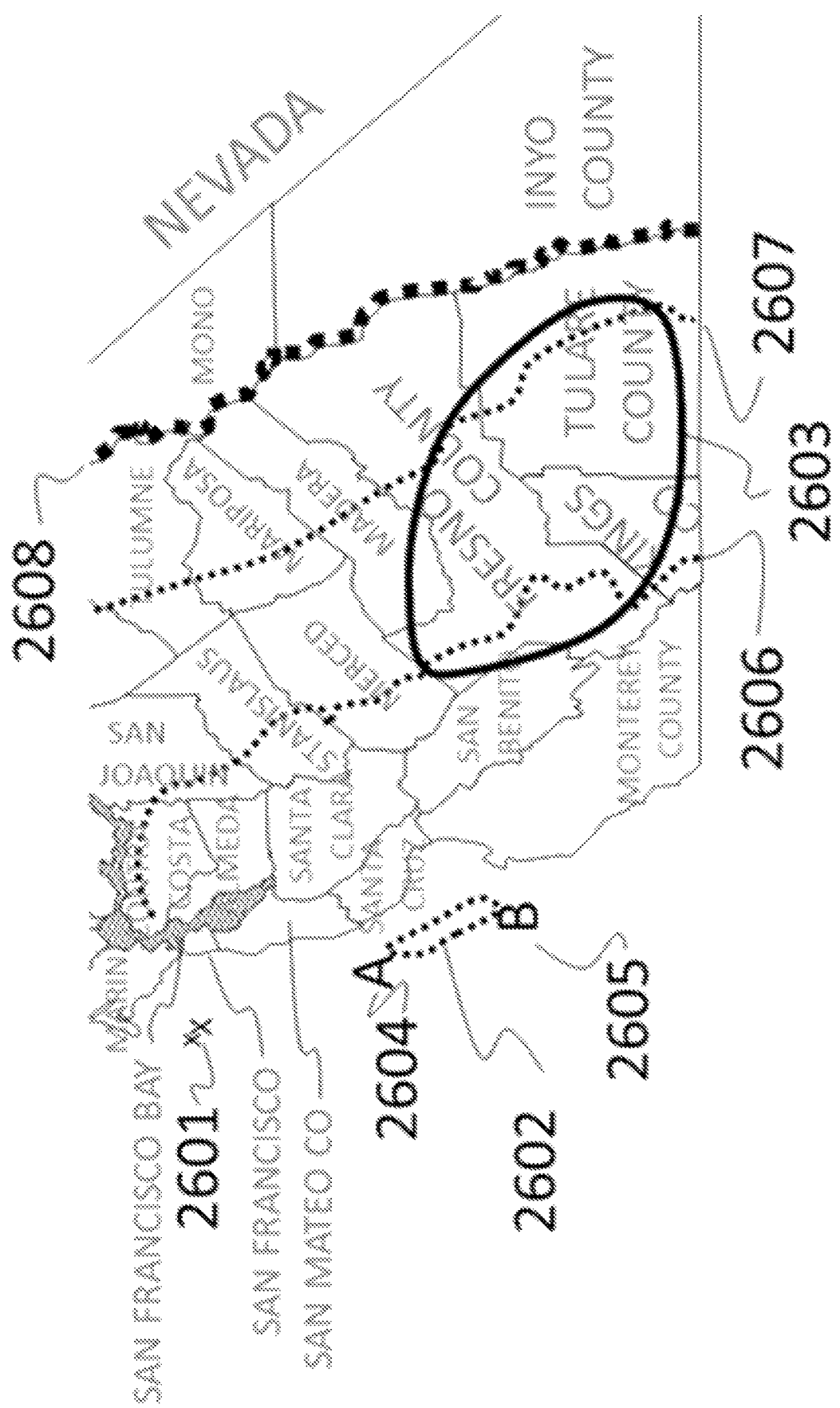
FIG. 26—Map of the Typical Daily Operations.

FIG. 26 illustrates a map with the counties in California in the area involved for this scenario. The electrolysis system 2505 generating $H_2$ and $O_2$ will be running twenty four hours a day and seven days a week moored in the shallows near the Farallon Islands 2601 some 30 miles from the coast. Boats 1900, some towing barges 1900 may be moving back and forth 2504 hauling $H_2$ and $O_2$ to the cloud initiation sites 2602 in high pressure tanks.

Thermal winds in California tend to have a daily cycle. When the Central Valley and Mojave Desert beyond it heat up, the air rises and pulls in air from the coast. The predictions for the thermal winds will heavily influence the daily schedule. The cloud generating equipment 100, 200, 300 will leave the docks or anchorages early 2501 and head to point which will be chosen based on the intended target area 2502 and wind forecast. In this scenario, the ships 100, boats 200 and or fleets 300 will be generating clouds between Point A 2604 offshore west-northwest of the city of Santa Cruz, and point B 2503 2605 offshore west of the city of Monterey. The cloud generating equipment 100, 200, 300 will meet up with the fuel carriers 1900 near Point A 2506 2604.

The target area 2603 is located in California's fertile San Joaquin Valley between the foothills of the Coastal Mountains 2606 and the foothills of the Sierra Nev. Mountains 2607. Without cloud seeding, most of the man-made clouds that make it into the Central Valley will travel to the Sierra Nev. Mountains where they may form orographic precipitation that will occur before the clouds make over the ridge line of the High Sierras 2608. Cloud seeding would likely be required to initiate rainfall over the fertile fields.

As depicted, at 5:00 am the fleet may start pushing tons of water skyward generating clouds between Point A 2604 and Point B 2507 2508 2605. The position of the cloud generating equipment may be maintained with respect to the shore, in accordance with prior analysis and determinations. One consideration is the formation high concentrations of droplets around salt particles that fall back into the sea. As deployed, the air tubes 105 may be maintained at a height between a few hundred feet and a few thousand feet depending on wind conditions. As depicted here, the cloud generating process will be terminated about 14:00 hours (see 2509) with the fleet heading in around that time (see 2510).

The rain gage monitoring system will be operating continuously in the target area 2511 2603. The man-made clouds are predicted to reach the valley by 9:00 and the foothills of the Sierra Nev. Mountains by 13:00. The inland cloud seeding operation will begin at 14:00 hours 2512 and end at 18:00 hours 2513.

Lightening Protection

Electrostatic charges are likely to form in the clouds generated by the systems described in this disclosure. Several mechanisms may be used to control the charge and/or the resulting lightning discharges.

Figure 27A:
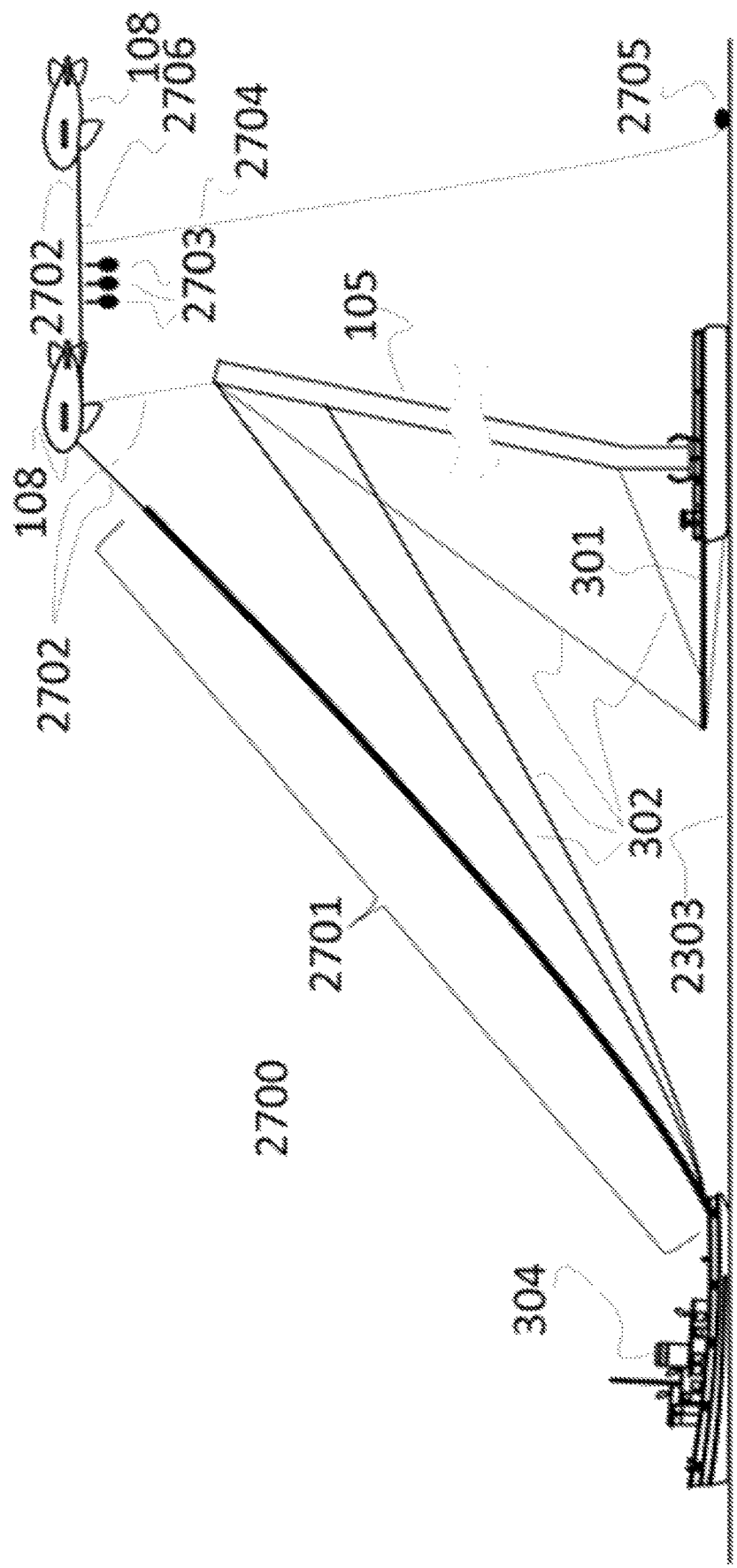
FIGS. 27*a* and 27*b*—Lightening Rod Deployment and Light Wight High Altitude Ground System.

FIG. 27*a* shows two types of lightning control systems that are designed to protect the deployed tubes 105 by providing a grounding wire that extends above the tubes forming a partial ground potential shield above the tubes. Guy wire 2701 may be a heavy ground cable, capable of surviving multiple lightning strikes and protecting the air tube 105 from lightening damage by diverting the electrical charge away from the tube. The ground cable 2701 may be supported by blimp 108 through insulating guy wires 2702. The thickness and weight per foot of the ground cable 2701 may need to be considerable, and may be difficult to manage as the deployed height of the air tube 105 is increased.

Figure 27B:
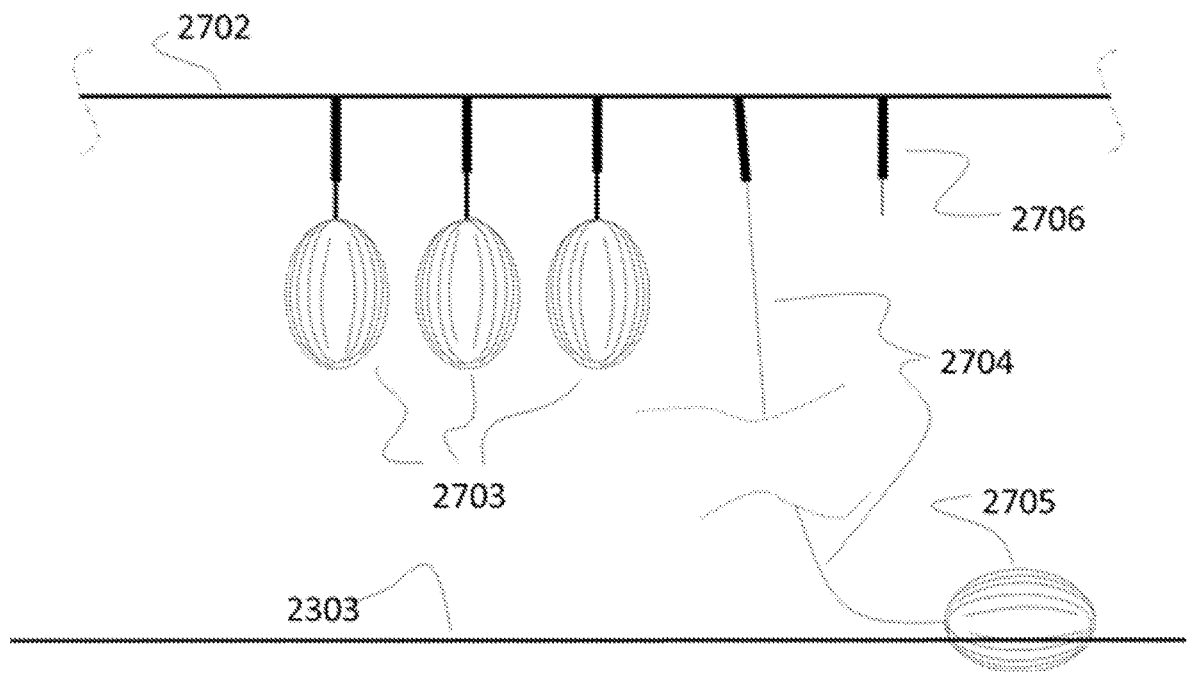

FIGS. 27*a* and 27*b* show a lightweight high altitude ground system 2702, 2703, 2704, & 2705 is also shown in FIGS. 27*a* and 24*b*. The grounding system ready to employ 2703 is supported with insulator support 2702. A deployed ground 2704 with the pod that held the ground wire 2705 resting on the surface of the water 2303. It is not necessary for the ground wire 2705 to reach the earth to successfully protect the air tube. As depicted, item 2706 is the remains of a high altitude ground that was deployed and absorbed a lightning strike. Lightening is generated when the charge in the clouds generates enough voltage between the charged cloud and another cloud or the ground to cause the air to ionize and become highly conductive.

Figure 28:
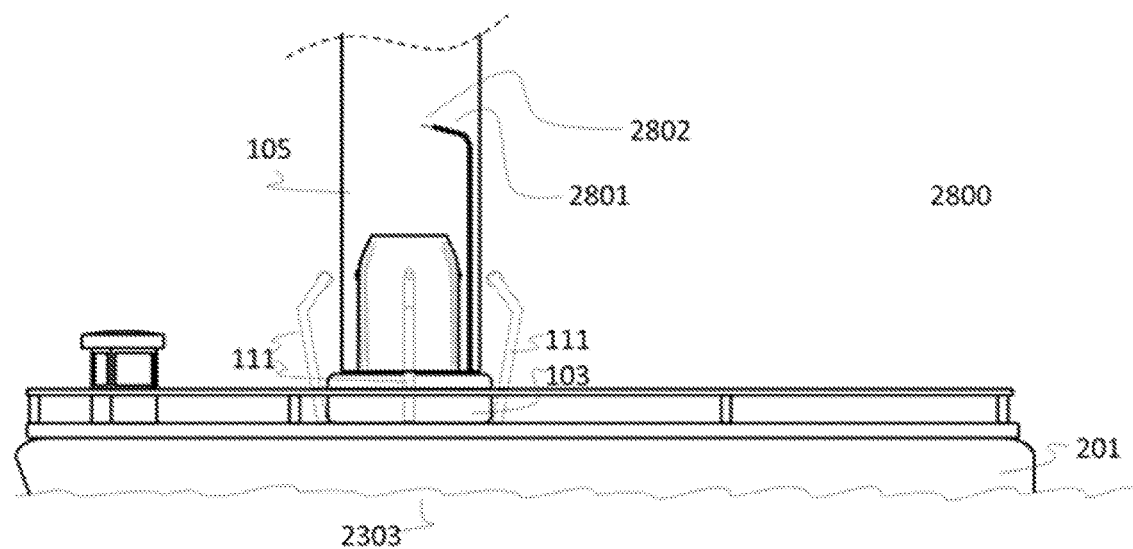
FIG. 28—Cloud Charge Balancing System.

FIG. 28 illustrates a way to neutralize the charge in the clouds by providing ions or cations to the air tube 105. The aerosol is driven by the fan in the fan box 103 into the air tube 105 and up to the cloud being generated above the air tube. High voltage emitter 2802 may be attached to a high voltage cable 2801. When deployed, the air passing emitter 2802 may be ionized to the opposite charge of the clouds and may neutralize the charge in the cloud when the aerosol exits the air tube.

The lightning protection systems shown in FIGS. 27 and 28 can be deployed away from the cloud generating systems to decrease the probability of lightening initiating forest fires near the target areas 2603.

Furling Systems for Air Tubes

FIGS. 29*a*, 29*b*, and 29*c* is a depiction of two different furling systems for the air tube. FIG. 29*a* is a furling system with drive rollers 202 mounted in the engine housing 115 inside the air tube 105 and the arm 111 outside the air tube 105. In some implementations, the air tube 105 is held aloft with blimp 108. The system may be designed to pull the air tube 105 down with the retrieved air tube piling up to a small fraction of its initial height.

FIG. 29*b* and FIG. 29*c* illustrate a side and top view respectively of a second furling system. Control cords 2901, 2902, 2903 and 2904 are mounted on reeling equipment 2907. The control cords are a group of four each individual cords that are reeled in and out in unison. In some implementations, each of the four individual cords pass through a series of horizontal pulleys 2905 and vertical pulleys 2806 and up the side of the air tube 105 passing through the cord control loops 2908 at a point separated from the other cords coming off the same real by approximately ninety degrees. The four sets of control cords 2901, 2902, 2903 and 2904 may be connected to the air tube 105 at heights 2909, 2910, 2911, and 2912, respectively. The air tube 105 may be held aloft with the pressure in the tube, the blimp 108, thrusters 402 or 403, tube lifting harness 900, or combinations of these and other mechanisms. The tube may be pulled down by reeling in the control cords bring the air tube 105 down in an orderly manner and resulting a stowed air tube that is a small fraction of the deployed height of the air tube. The mechanisms illustrated in FIGS. 29a, 29b and 29c are also appropriate for use in the sails 2101, 2102 and 2103 of FIG. 21b, 21d, or 21f.

Figure 30A:
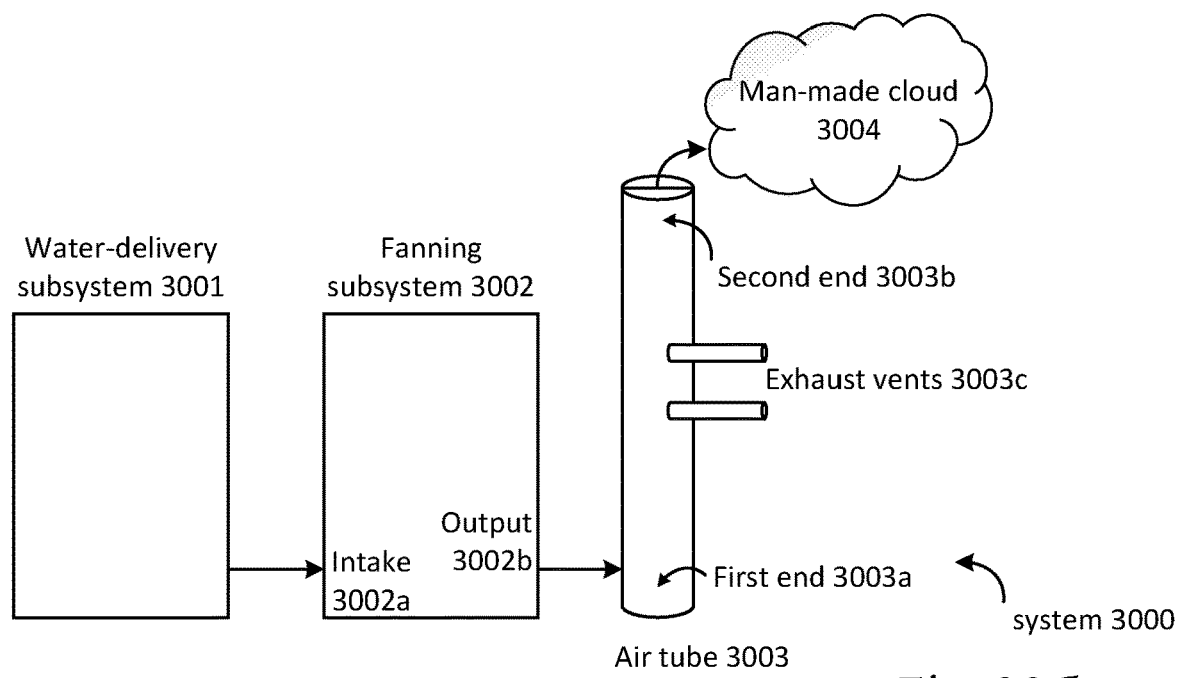
FIGS. 30A and 30B illustrate a block diagram of a system configured to produce a man-made cloud, in accordance with one or more implementations.

Referring to the block diagram of FIG. 30A, system 3000 may be configured to produce one or more man-made clouds, including but not limited to nimbostratus clouds, and to deliver the one or more man-made clouds into the troposphere at one or more altitudes targeted for downwind precipitation from the one or more man-made clouds, including but not limited to rain. For example, system 3000 may produce a man-made cloud 3004 as depicted in FIG. 30A. System 3000 may be operable in conjunction with one or more airborne vessels (not depicted in FIG. 30A). As used herein, the phrase "airborne vessel" references any device or system that can stay aloft in the air at the altitudes described in this disclosure. By way of non-limiting example, airborne vessels may include one or more of aircrafts, blimps, dirigibles, zeppelins, balloons, kites, and/or other devices capable of providing lift (whether powered or not) to air tube 3003 when coupled to air tube 3003. System 3000 may include one or more of a water-delivery subsystem 3001, a fanning subsystem 3002, air tube 3003, and/or other components.

In some implementations, water-delivery subsystem 3001 may be configured to deliver water from a water source (not depicted in FIG. 30A) to one or more components of system 3000. In some implementations, the water source may be disposed and/or located at ground level (e.g., the surface of an ocean or lake or river). For example, in some implementations, the water source may be an ocean, a river, a lake, and/or another body of water (whether man-made or natural). In some implementations, one or more components of system 3000 may be carried by a watercraft (not depicted in FIG. 30A). For example, see FIGS. 2-3 for the same or similar systems using various watercrafts (additionally, see descriptions elsewhere in this disclosure for additional watercrafts). In some implementations, a watercraft may be used as water-delivery subsystem 3001. For example, while navigating water and moving, a watercraft may be configured to take in water while moving, and deliver the water to, e.g., fanning subsystem 3002, via the use of one or more of tubes, pipes, conduits, hoses, manifolds, pumps, filters, and/or other connectors (none depicted in FIG. 30A). In some implementations, alignment and/or positioning of air tube 3003 may be supported by one or more guy-wires that are coupled to a stationary object such as, e.g., a ground anchor, or an oil rig (as depicted, e.g., in FIGS. 12A-12B). In some implementations, an alignment between first end 3003a and second end 3003b of air tube 3003 may range between a 45 degree angle and a 90 degree angle with respect to the ground level. In some implementations, this alignment may range between a 60 degree angle and a 90 degree angle with respect to the ground level. In some implementations, this alignment may range between a 75 degree angle and a 90 degree angle with respect to the ground level. As used herein, the phrase "substantially vertical" may be used to refer to angles within 20 degrees of perfectly vertical (as measured and/or determined between the opposite ends of an air tube and considering only the orientation with respect to fore and aft of the respective boat, and ignoring side-to-side and/or lateral movement with respect to the respective boat, and barring periods of extreme weather). Moreover, it is understood that extreme weather and/or movement of the respective boats may temporarily disrupt the preferred alignment (of substantially vertical). In some implementations, alignment of air tube 3003 may be supported by one or more guy-wires that are coupled to a stationary object such as, e.g., a ground anchor, or an oil rig (as depicted, e.g., in FIGS. 12A-12B).

As depicted in FIG. 30A, in some implementations, fanning subsystem 3002 may include an intake 3002a, an output 3002b, and/or other components. In some implementations, intake 3002a may take in, e.g., water from water-delivery subsystem 3001. Alternatively, and/or simultaneously, in some implementations, intake 3002a may take in air. Alternatively, and/or simultaneously, in some implementations, intake 3002a may take in aerosol. Alternatively, and/or simultaneously, in some implementations, intake 3002a may take in oxygen and hydrogen, which may be ignited within fanning subsystem 3002 to produce aerosol.

In some implementations, output 3002b may output, e.g., air and/or aerosol for transportation into air tube 3003. In some implementations, air tube 3003 may include a first end 3003a and a second end 3003b, disposed at opposite ends. For example, first end 3003a may be disposed at or near fanning subsystem 3002. For example, second end 3003b may be disposed into the troposphere (e.g., at an altitude targeted for downwind delivery of precipitation from man-made cloud 3004). By way of non-limiting example, the altitude may range between a few hundred feet and a few thousand feet. In some implementations, the altitude may be at least 400 feet. In some implementations, the altitude may be about 1000 feet. In some implementations, the altitude may be between 400 and 1000 feet. In some implementations, the altitude may be between 1000 and about 3000 feet. Other altitudes and/or ranges of altitudes are envisioned within the scope of this disclosure. For example, other altitudes may be determined as suitable to reach a particular targeted geographical area for the delivery of precipitation from man-made cloud 3004, from a particular location of deploying air tube 3003.

In some implementations, air tube 3003 may be coupled to one or more airborne vessels while flying (not depicted in FIG. 30A). See, for example, FIG. 3. In some implementations, air tube 3003 may be implemented using one or more components described elsewhere in this disclosure, including but not limited to (flexible) tubes (see, by way of non-limiting example, tubes 105, 106, 107 in FIG. 1, as well as other FIGs), rigid air tubes, air tubes that are flexible in part and rigid in part (see, by way of non-limiting example, air tube 1205 in FIGS. 12A-12B), air tubes with an arbor core and/or including PFTE and carbon fiber (see, by way of non-limiting example, FIGS. 10A-10Q), and/or combinations of these different types of air tubes or different types of materials used to construct an air tube. In some implementations, air tube 3003 may be at least 400 feet long. In some implementations, air tube 3003 may be about 1000 feet long. In some implementations, air tube 3003 may be between 400 and 1000 feet long. In some implementations, air tube 3003 may be between 1000 and about 3000 feet long. In some implementations, air tube 3003 may have a particular length sufficient to maintain second end 3003b of air tube 3003 at an altitude ranging between a few hundred feet and a few thousand feet. In some implementations, air tube 3003 may have a particular length sufficient to maintain second end 3003b of air tube 3003 at an altitude sufficient to reach wind speeds of at least 35 knots. In some implementations, air tube 3003 may have a particular length sufficient to maintain second end 3003b of air tube 3003 at an altitude sufficient such that man-made cloud 3004 can cross a particular coastal mountain range in California.

Referring to FIG. 30A, in some implementations, air tube 3003 may include multiple exhaust vents 3003c, configured to exhaust a portion of the aerosol within air tube 3003. In some implementations, individual ones of exhaust vents 3003*c* may be the same as or similar to the exhaust vents described in relation to FIGS. 4A-4B.

In some implementations, air tube 3003 may include one or more fins (not depicted in FIGS. 30A-30B-31) disposed between first end 3003*a* and second end 3003*b* of air tube 3003. Individual ones of the one or more fins may be configured to counteract rotation of air tube 3003 such that the individual ones of the one or more fins are aimed in a leeward direction by the force applied by the wind to air tube 3003. In some implementations, individual ones of the fins may be the same as or similar to the fins described in relation to FIGS. 4A-4B.

In some implementations, air tube 3003 may include one or more pressure-control components (not depicted in FIGS. 30A-30B-31). The pressure-control components may be disposed between first end 3003*a* and second end 3003*b* of air tube 3003. Individual ones of the one or more pressure-control components may be configured to control pressure within air tube 3003 at or near the individual ones of the one or more pressure-control components. In some implementations, individual ones of the pressure-control components may be the same as or similar to the nets described in relation to FIGS. 7A-7F and/or the sleeves described in relation to FIGS. 8A-8B.

In some implementations, air tube 3003 may include one or more lift-providing components (not depicted in FIGS. 30A-30B-31). The lift-providing components may be disposed between first end 3003*a* and second end 3003*b* of air tube 3003. Individual ones of the one or more lift-providing components may be configured to provide lift to air tube 3003. In some implementations, individual ones of the lift-providing components may be the same as or similar to the tube-lifting harness, lift bags, and/or kites/canapes described in relation to FIGS. 9A-9C. In some implementations, downward-angled exhaust vents and/or thrusters may provide lift and be considered lift-providing components (see, by way of non-limiting example, the thrusters as described in relation to FIGS. 4A-4B).

In some implementations, fanning subsystem 3002 may be implemented using one or more components described elsewhere in this disclosure, including but not limited to fan boxes (see, by way of non-limiting example, fan boxes 102, 103, 104 in FIG. 1), fan jet engines (see, by way of non-limiting example, fan jet engine 1300 in FIG. 13 and FIG. 14), de Laval Nozzle Fan Jet Engines (see, by way of non-limiting example, de Laval Nozzle 1500 in FIG. 15 and de Laval Nozzle Fan Engine 1600 in FIGS. 16A-16C), and/or other components described herein as capable of accelerating air and/or aerosol, or capable of producing aerosol (e.g. super-heated steam as described elsewhere in this disclosure) that is exhausted into air tube 3003, or both. For example, in some implementations, fanning subsystem 3002 may be configured to push and/or propel at least 1 ton of water per second. In some implementations, fanning subsystem 3002 may be configured to push and/or propel about 1.5 ton of air per second. In some implementations, fanning subsystem 3002 may be configured to push and/or propel at least 1.5 ton of aerosol per second.

In some implementations, one or more variations of system 3000 may include additional components. For example, as illustrated in FIG. 30B and FIG. 31, a system 3000*b* or a system 3000*c* may include the same or similar components as system 3000 in FIG. 30A. Additionally, system 3000*b* may include one or more of a heating subsystem 3005, one or more lightning control systems 3006, a control system 3007, and/or other components. Additionally, system 3000*c* may include one or more of a fuel-delivery subsystem 3008, and/or other components. In some variations, components from system 3000*b* and 3000*c* (and/or other components described in this disclosure) may be combined.

Referring to FIG. 30B, in some implementations, heating subsystem 3005 may be configured to increase the temperature of either the water (e.g., as delivered by water-delivery subsystem 3001), air (e.g., as taken in by intake 3002*a*), and/or aerosol (e.g., as output by output 3002*b*, or within air tube 3003). In some implementations, heating subsystem 3005 may be configured to couple between water-delivery subsystem 3001 and second end 3003*b* of air tube 3003. In some implementations, heating subsystem 3005 may include one or more heating units (not depicted in FIG. 30B) disposed between first end 3003*a* and second end 3003*b* of air tube 3003. For example, individual ones of the one or more heating units may be configured to increase the temperature of the aerosol within air tube 3003, e.g., at or near the individual ones of the one or more heating units. In some implementations, heating subsystem 3005 may be implemented using one or more components described elsewhere in this disclosure, including but not limited to gas heating units (see, by way of non-limiting example, gas heating unit 500 in FIGS. 5A-5B). In some implementations, heating subsystem 3005 may be implemented using one or more components described elsewhere in this disclosure that provide heat, including but not limited to de Laval Nozzle 1500 as depicted in FIG. 15, fan jet engine 1300 as depicted in FIG. 13, and/or other components that provide heat.

One or more lightning control systems 3006 may include one or more of a ground cable, a ground wire, a high voltage emitter, and/or other components. In some implementations, one or more lightning control systems 3006 may be implemented using one or more components described elsewhere in this disclosure, including but not limited to a guy wire (see, by way of non-limiting example, guy wire 2701 in FIGS. 27A-27B), a light weight high altitude ground system (see, by way of non-limiting example, items 2702-2703-2704-2705-2706 in FIGS. 27A and 27B), a high voltage emitter (see, by way of non-limiting example, high voltage emitter 2802 in FIG. 28), and/or other components configured to provide protection from lightning strikes.

Control system 3007 may be configured to control the operation of system 3000 (and/or its variations such as system 3000*b* and/or system 3000*c*). Control system 3007 may be configured to select a target area for the delivery of the precipitation from man-made cloud 3004. In some implementations, control system 3007 may be configured to obtain a wind and weather forecast for a particular geographical area. For example, the particular geographical area may include at least a portion of the water source and the selected target area. In some implementations, the wind and weather forecast may include expected wind velocities at various altitudes and locations. In some implementations, control system 3007 may be configured to determine a suitable time, a suitable location, and a suitable altitude for production of man-made cloud 3004 by system 3000 (or another system described in this disclosure). The determinations by control system 3007 may be based on one or more of the selected target area, the wind and weather forecast, the expected wind velocities, the topology of the geographical area, and/or other information. In some implementations, system 3000 (or another system described in this disclosure) may be configured to deploy air tube 3003 at a time, a location, and an altitude in accordance with the determinations by control system 3007. In some implementations, air tube 3003 and fanning subsystem 3002 may be carried by a watercraft configured to navigate at the determined suitable location. In some implementations, a fleet of multiple watercraft may carry a set of multiple systems such that aerosol exiting multiple air tubes (the same as or similar to air tube 3003) may be used (e.g., at the same time) to produce multiple man-made clouds. In some implementations, control system 3007 may be implemented using one or more components and features described elsewhere in this disclosure, including but not limited to a wind & weather forecast (see, by way of non-limiting example, wind & weather forecast 2416 in FIG. 24), a computer simulation (see, by way of non-limiting example, computer simulation 2417 in FIG. 24), and/or other descriptions related to at least FIG. 24.

Figure 15:
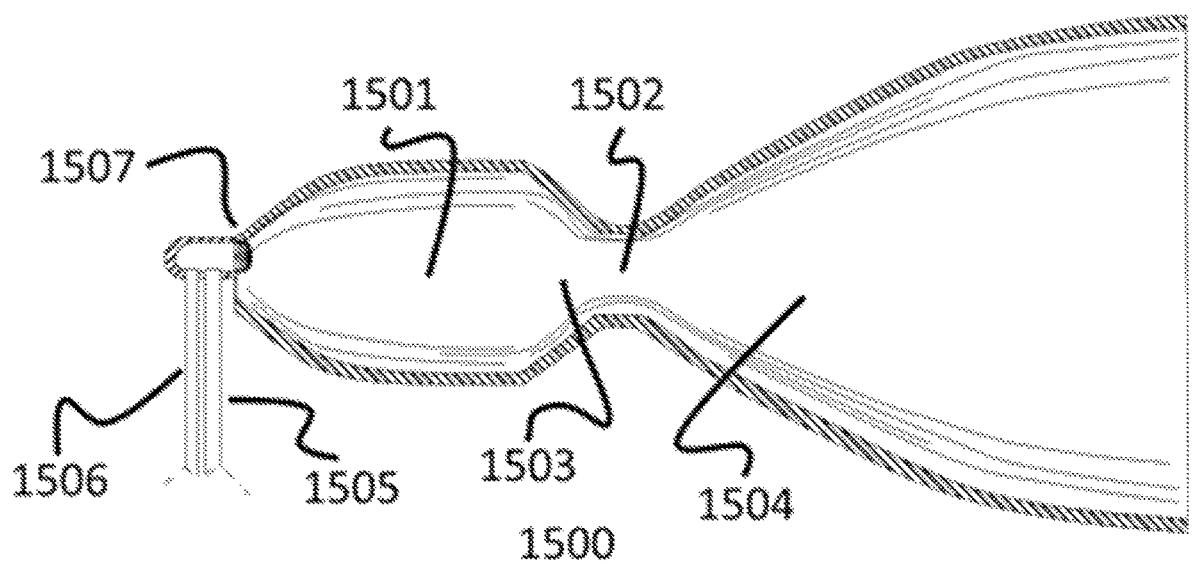
FIG. 15—The de Laval Nozzle.
Figure 16A:
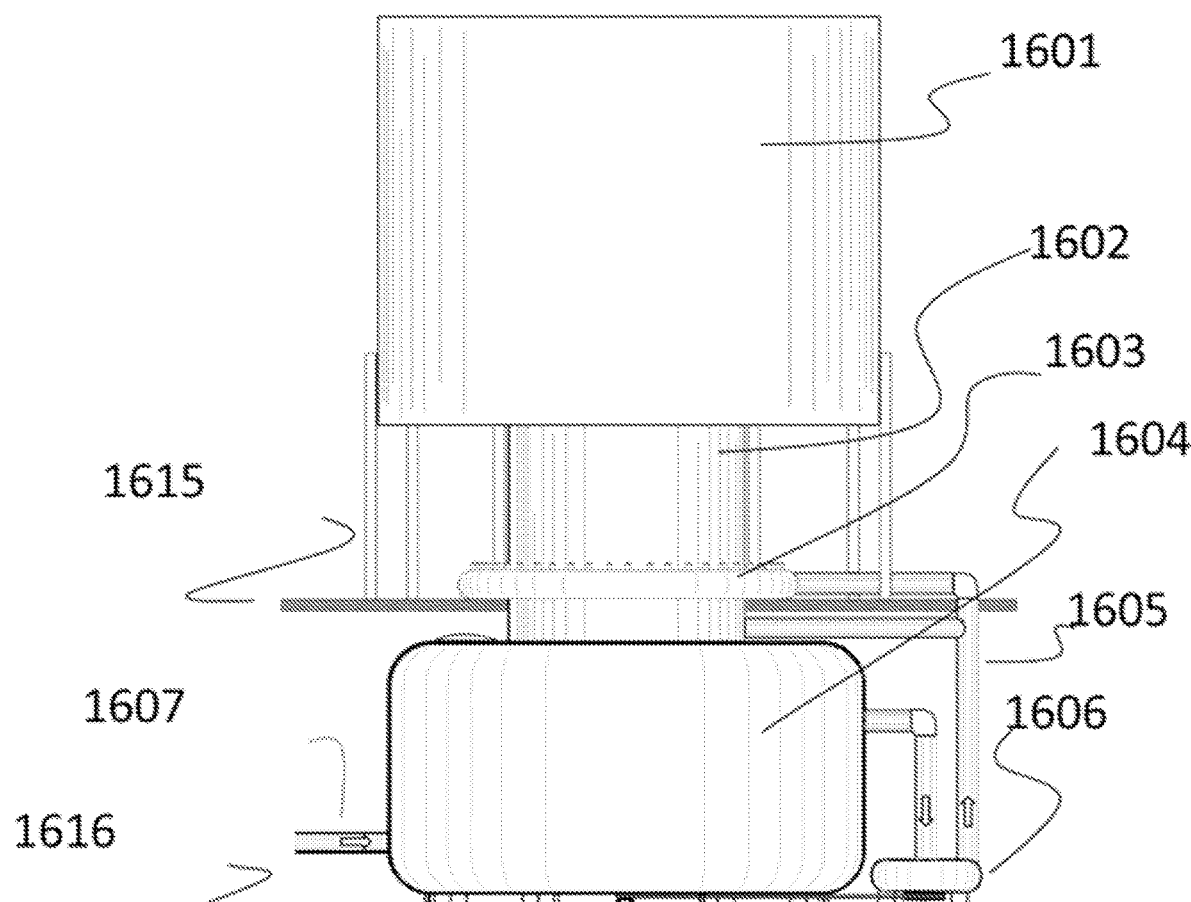
FIGS. 16*a*, 16*b*, and 16*c*—the de Laval Nozzle Fan Jet Engine.
Figure 16B:
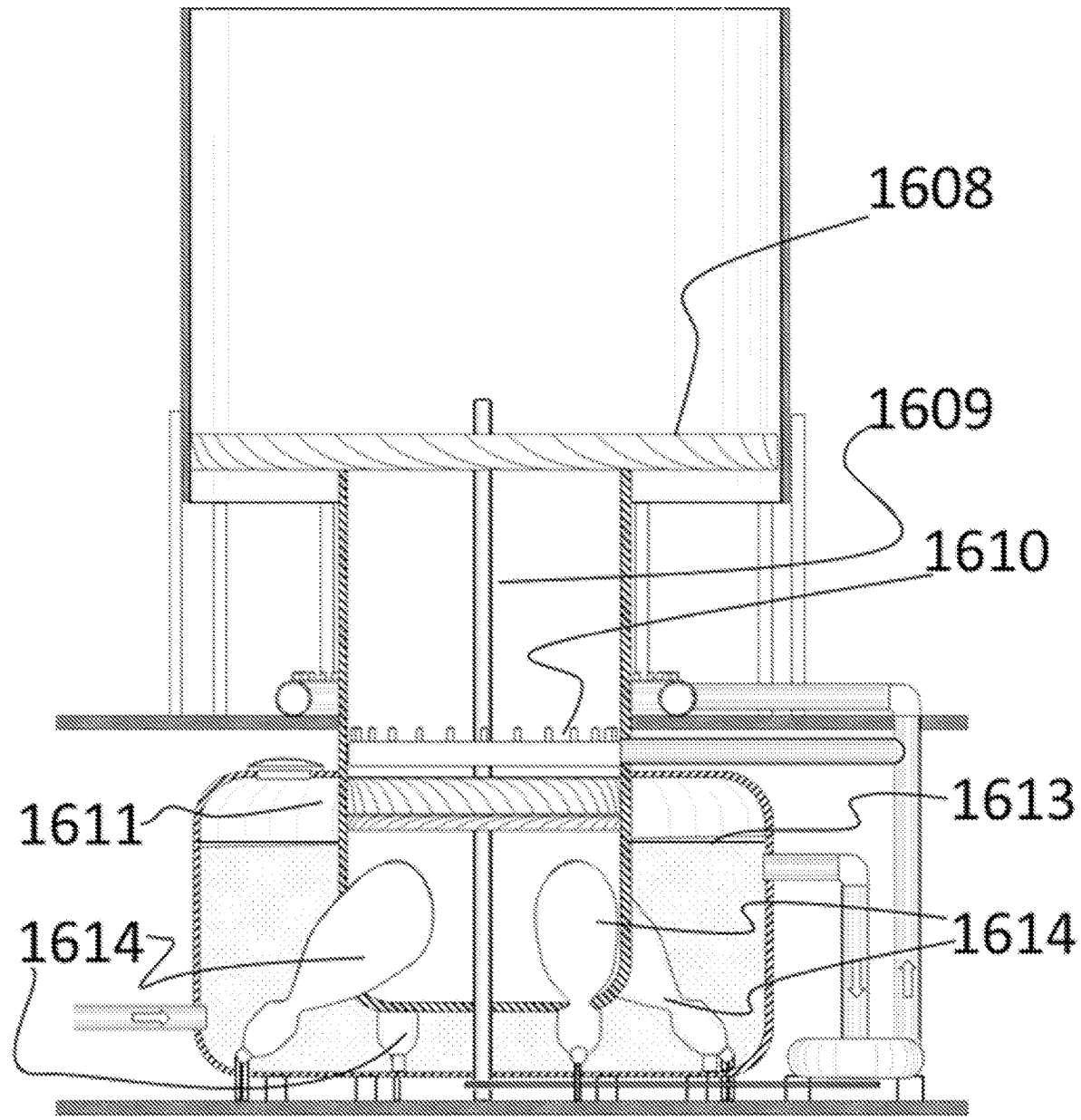
Figure 16C:
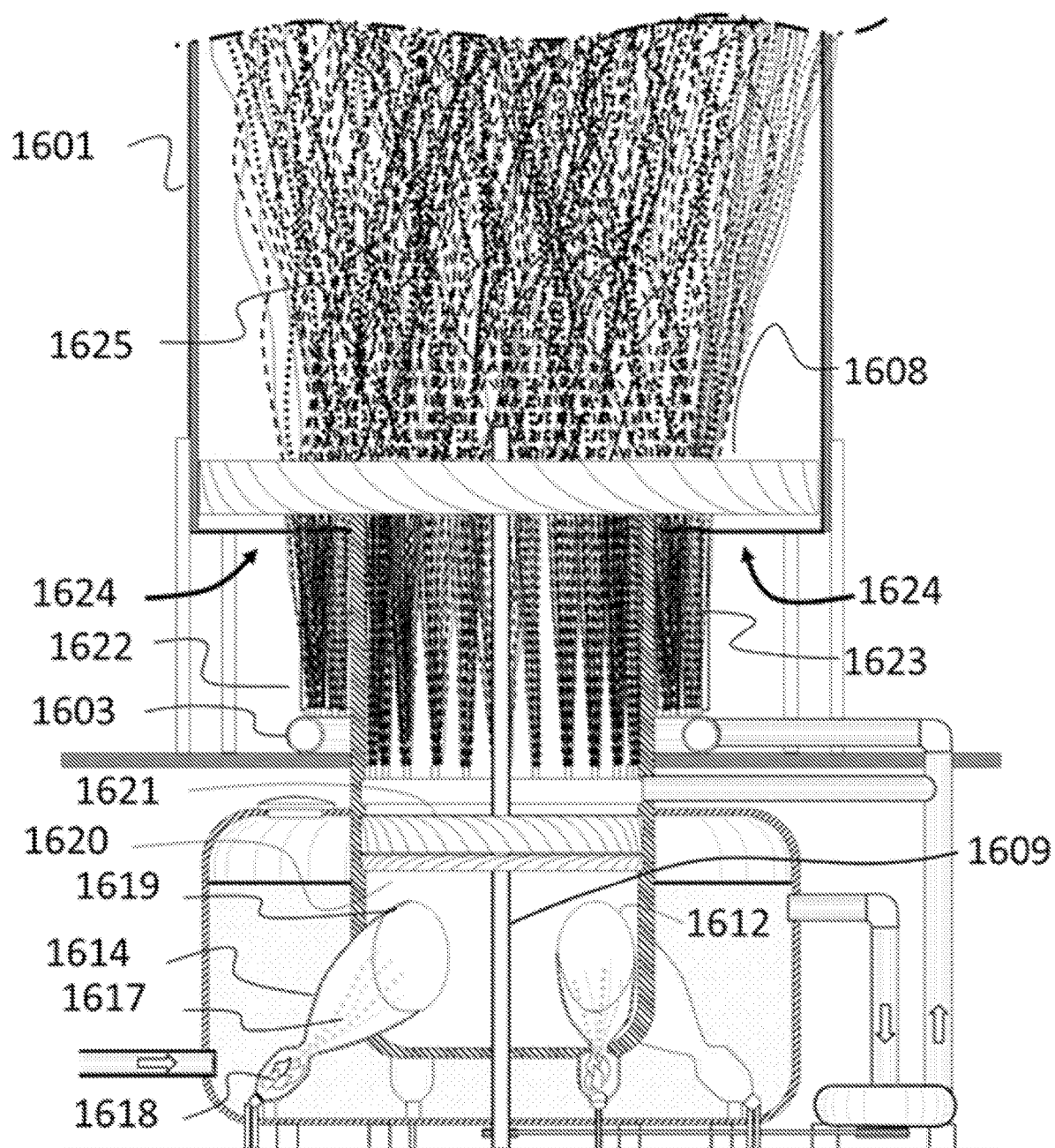

Fuel-delivery subsystem 3008 may be configured to deliver oxygen and hydrogen to fanning subsystem 3002. For example, in some implementations, fanning subsystem may include one or more de Laval nozzles 3009 that are configured to ignite oxygen and hydrogen (provided by fuel-delivery subsystem 3008) and produce aerosol (in particular, super-heated steam) within the one or more de Laval nozzles 3009. One or more de Laval nozzles 3009 may be configured to drive de Laval turbine 3010 of fanning subsystem 3002. The output of de Laval turbine 3010 may be transported, via output 3002*b*, to air tube 3003. In some implementations, at least a portion of the delivered water may be combined with the produced aerosol prior to entry into air tube 3003 (e.g., by using one or more components to spray water, such as, by way of non-limiting example, water spray manifold 1610 as depicted in FIG. 16*c*). This may increase the amount of water within air tube 3003, and this may decrease the temperature of the aerosol at first end 3003*a*. In some implementations, fuel-delivery subsystem 3008 may be implemented using one or more components described elsewhere in this disclosure, including but not limited to tanks (see, by way of non-limiting example, storage tanks 1906 and 1907 in FIGS. 19A-19B), and/or other components described in this disclosure. In some implementations, one or more de Laval nozzles 3009 may be implemented using one or more components described elsewhere in this disclosure, including but not limited to de Laval Nozzle 1500 as depicted in FIG. 15. In some implementations, de Laval turbine 3010 may be implemented using one or more components described elsewhere in this disclosure, including but not limited to de Laval Nozzle Fan Engine 1600 as depicted in FIGS. 16A-16C.

Figure 30B:
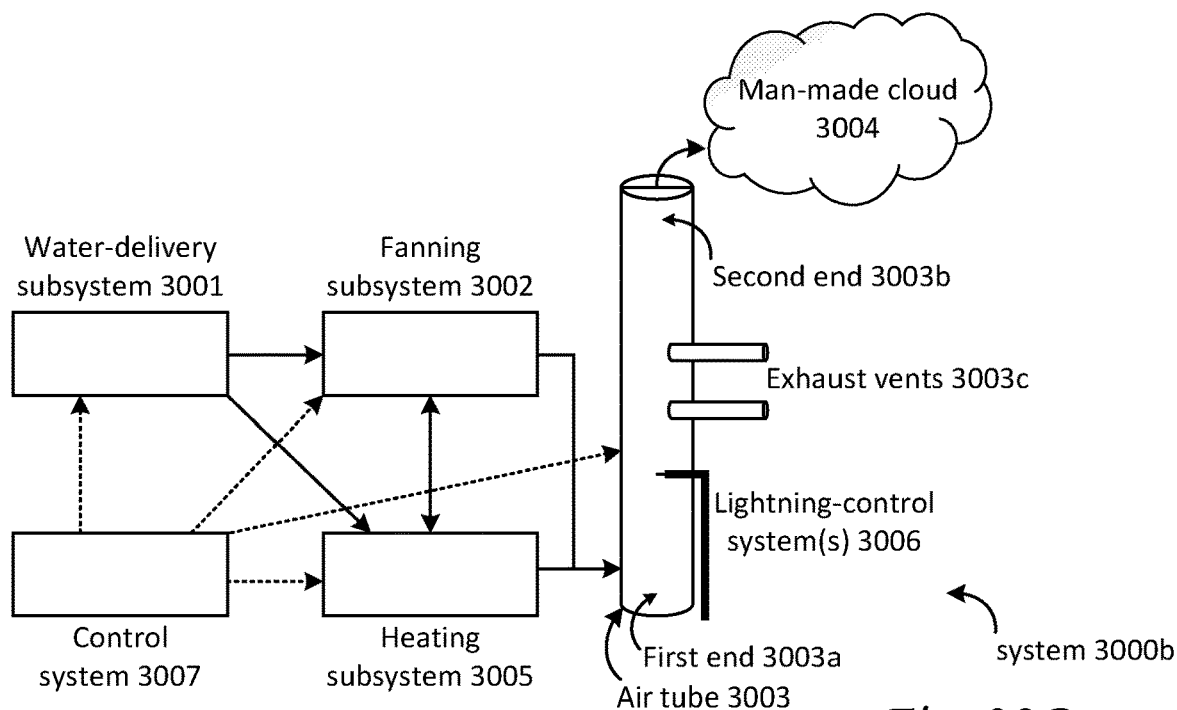
Figure 31:
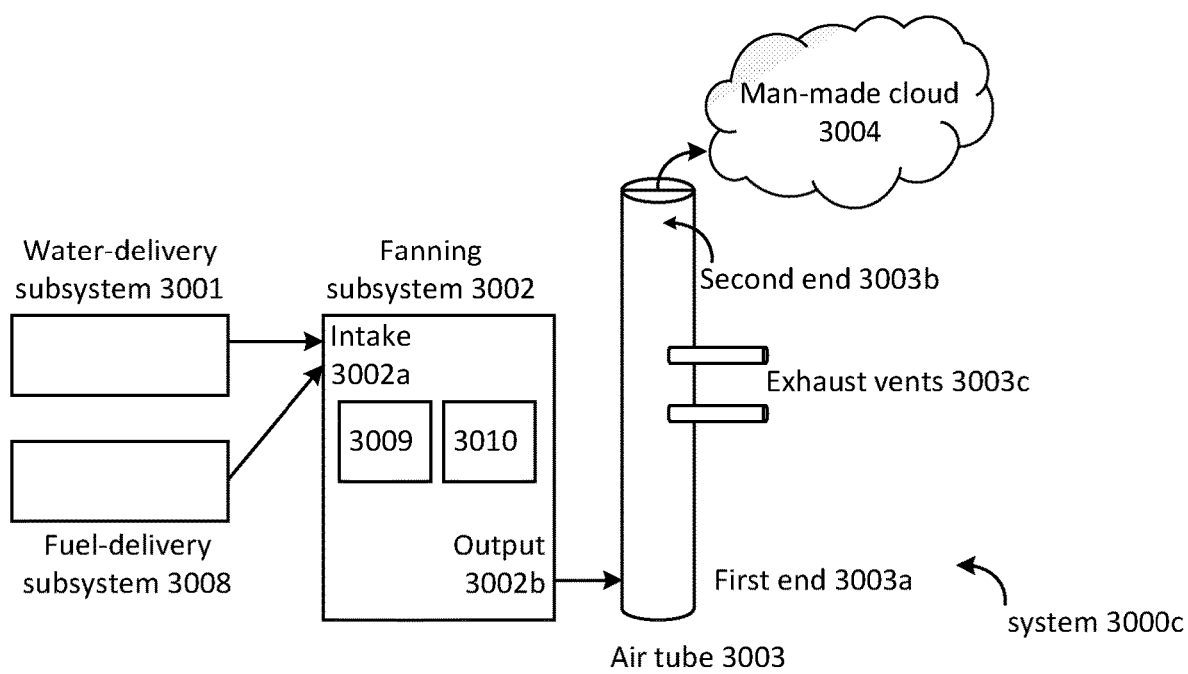
FIG. 31 illustrates a block diagram of a system configured to produce a man-made cloud, in accordance with one or more implementations.

In some implementations, system 3000 (and/or its variations such as system 3000*b* and/or system 3000*c*) may include additional components (not depicted in FIGS. 30A-30B-31), including but not limited to a polymer electrolyte membrane (PEM) electrolysis system, a set of wind power electrical generators, and/or other components and features described elsewhere in this disclosure. The polymer electrolyte membrane (PEM) electrolysis system may be configured to produce oxygen and hydrogen, e.g., as described in relation to FIGS. 17-18. In some implementations, the set of wind power electrical generators may be configured to generate electrical power, powered by wind, e.g., as described in relation to FIGS. 21-22. The set of wind power electrical generators may be carried by a boat. In some implementations, the boat may include a main mast, one or more stays, a bow sprit, and a spinnaker coupled to the main mast, the one or more stays, and the bow sprit, such that an additional amount of electrical power is generated by the set of wind power electrical generators by virtue of the wind applying force to the spinnaker, e.g., as described in relation FIGS. 21A-21C. In some implementations, the electrical power generated by the set of wind power electrical generators may be used to power the polymer electrolyte membrane (PEM) electrolysis system such that the produced oxygen and the produced hydrogen may be provided to fuel-delivery subsystem 3008.

FIG. 32 illustrates a method 3200 for producing a man-made cloud and deliver the man-made cloud into the troposphere at an altitude targeted for downwind delivery of precipitation from the man-made cloud, in accordance with one or more implementations. The operations of method 3200 presented below are intended to be illustrative. In some implementations, method 3200 may be accomplished with one or more additional operations not described, and/or without one or more of the operations discussed. Additionally, the order in which the operations of method 3200 are illustrated in FIG. 32 and described below is not intended to be limiting.

At an operation 3202, water is delivered from a water source to a fanning subsystem. The water source may be disposed at or near ground level (e.g., the surface of an ocean). In some embodiments, operation 3202 is performed by a water-delivery subsystem the same as or similar to water-delivery subsystem 3001 (shown in FIG. 30A and described herein).

At an operation 3204, by an intake of the fanning subsystem, oxygen, hydrogen, air, the delivered water, and/or the aerosol produced from the delivered water is taken in. The delivered water is or has been combined with the air to produce aerosol. In some embodiments, operation 3204 is performed by an intake the same as or similar to intake 3002*a* (shown in FIG. 30A and described herein).

At an operation 3206, by an output of the fanning subsystem, the aerosol produced from either the oxygen and the hydrogen or from the delivered water, and/or the air is output. The air is or has been combined with the delivered water to produce the aerosol. In some embodiments, operation 3206 is performed by an output the same as or similar to output 3002*b* (shown in FIG. 30A and described herein).

At an operation 3208, the aerosol is transported from the fanning subsystem into an air tube, the air tube having a first end and a second end. The first end is arranged at or near the fanning subsystem. The second end is disposed into the troposphere by coupling the second end to the airborne vessel while the airborne vessel is flying in the troposphere. The air tube is at least 400 feet long from the first end to the second end. In some embodiments, operation 3208 is performed by a fanning subsystem the same as or similar to fanning subsystem 3002 (shown in FIG. 30A and described herein).

At an operation 3210, the aerosol is transported by the air tube from the first end through the air tube to the second end.

In some embodiments, operation 3210 is performed by an air tube the same as or similar to air tube 3003 (shown in FIG. 30A and described herein).

At an operation 3212, a portion of the aerosol is exhausted from the air tube into atmosphere, by multiple exhaust vents disposed between the first end and the second end of the air tube. In some embodiments, operation 3212 is performed by one or more exhaust vents the same as or similar to exhaust vents 3003c (shown in FIG. 30A and described herein).

At an operation 3214, the man-made cloud is produced, by the aerosol exiting the air tube at the second end of the air tube, at the altitude targeted for the downwind delivery of the precipitation from the man-made cloud. In some embodiments, operation 3214 is performed by an air tube the same as or similar to air tube 3003 (shown in FIG. 30A and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to produce a man-made cloud and deliver the man-made cloud into the troposphere, the system being operable in conjunction with an airborne vessel, the system comprising:
    a fanning subsystem including an intake and an output, wherein the intake is configured to take in one or more of:
        (i) air,
        (ii) water, wherein the water is or has been combined with the air to produce aerosol, and/or
        (iii) the aerosol produced from the water,
    wherein the output is configured to output one or more of:
        (i) the aerosol produced from the water, and/or
        (ii) the air, wherein the air is or has been combined with the water to produce the aerosol,
    and wherein the fanning subsystem is further configured to transport the aerosol from the fanning subsystem into an air tube;
    the air tube having a first end and a second end, wherein the first end is arranged at or near the fanning subsystem, wherein the air tube is configured to transport the aerosol from the first end through the air tube to the second end, wherein the second end is disposed into the troposphere by coupling the second end to the airborne vessel while the airborne vessel is flying, wherein the aerosol, upon exiting the air tube at the second end, produces the man-made cloud such that precipitation from the man-made cloud is delivered downwind.

2. The system of claim 1, wherein the system further comprises:
    a water-delivery subsystem configured to deliver the water from a water source to the fanning subsystem, wherein the water source is disposed at or near ground level.

3. The system of claim 1, wherein the air tube is at least 400 feet long from the first end to the second end.

4. The system of claim 1, wherein the air tube includes multiple exhaust vents disposed between the first end and the second end, wherein individual ones of the multiple exhaust vents are configured to exhaust a portion of the aerosol from the air tube into atmosphere.

5. The system of claim 4, wherein the exhausted portion increases as pressure within the air tube at the individual ones of the multiple exhaust vents increases and such that the exhausted portion decreases as the pressure within the air tube at the individual ones of the multiple exhaust vents decreases.

6. The system of claim 4, wherein wind external to the air tube is applying force to the air tube, wherein at least some of the multiple exhaust vents are configured to provide thrust to push the air tube into the wind, wherein the air tube includes one or more fins disposed between the first end and the second end of the air tube, wherein individual ones of the one or more fins are configured to counteract rotation of the air tube such that the individual ones of the one or more fins are aimed in a leeward direction by the force applied by the wind to the air tube.

7. The system of claim 1, wherein one or more components of the system are carried by a watercraft, wherein the watercraft is configured to navigate in water.

8. The system of claim 1, wherein an alignment of the air tube is forced towards being substantially vertical at least in part by one or more guy-wires that are configured to couple the air tube to ground level.

9. The system of claim 1, wherein the air tube includes one or more pressure-control components disposed between the first end and the second end of the air tube, wherein individual ones of the one or more pressure-control components are configured to control pressure within the air tube at or near the individual ones of the one or more pressure-control components.

10. The system of claim 1, wherein the fanning subsystem includes one or both of a gas turbine and/or a fan configured to transport the aerosol into the air tube.

11. A method to produce a man-made cloud and deliver the man-made cloud into the troposphere, the method comprising:
    taking in, by an intake of a fanning subsystem, one or more of:
        (i) air,
        (ii) water, wherein the water is or has been combined with the air to produce aerosol, and/or
        (iii) the aerosol produced from the water;
    outputting, by an output of the fanning subsystem, one or more of:
        (i) the aerosol produced from the water,
        (ii) the air, wherein the air is or has been combined with the water to produce the aerosol;
    transporting the aerosol from the fanning subsystem into an air tube, the air tube having a first end and a second end, wherein the first end is arranged at or near the fanning subsystem, wherein the second end is disposed into the troposphere by coupling the second end to an airborne vessel while the airborne vessel is flying;
    transporting, by the air tube, the aerosol from the first end through the air tube to the second end; and
    producing the man-made cloud, by the aerosol exiting the air tube at the second end of the air tube, such that precipitation from the man-made cloud is delivered downwind.

12. The method of claim 11, further comprising:
    delivering the water from a water source to the fanning subsystem.

13. The method of claim 12, wherein the water source is disposed at or near ground level.

14. The method of claim 11, wherein the air tube is at least 400 feet long from the first end to the second end.

15. The method of claim 11, wherein the air tube includes multiple exhaust vents disposed between the first end and the second end, wherein individual ones of the multiple exhaust vents exhaust a portion of the aerosol from the air tube into atmosphere.

16. The method of claim 15, wherein the exhausted portion increases as pressure within the air tube at the individual ones of the multiple exhaust vents increases and such that the exhausted portion decreases as the pressure within the air tube at the individual ones of the multiple exhaust vents decreases.

17. The method of claim 15, wherein at least some of the multiple exhaust vents provide thrust to push the air tube into the wind.

18. The method of claim 11, further comprising:
    selecting a target area for the delivery of the precipitation from the man-made cloud;
    obtaining a wind and weather forecast for a geographical area that includes at least a portion of a water source and the target area, wherein the wind and weather forecast includes expected wind velocities at various altitudes and locations;
    determining a suitable time, a suitable location, and a suitable altitude for production of the man-made cloud, wherein the determinations are based on the selected target area, the wind and weather forecast, the expected wind velocities, and topology of the geographical area; and
    deploying, by a watercraft, the air tube at a time, a location, and an altitude in accordance with the determinations, and wherein the air tube and the fanning subsystem are carried by the watercraft.

19. The method of claim 18, further comprising:
    deploying either a ground cable or a ground wire, the ground cable being suspended between the airborne vessel and the ground level, the ground wire being coupled to a high altitude insulator support at a higher altitude than the second end of the air tube, to protect the air tube from lightning strikes and/or to protect the man-made cloud from discharging electricity.

20. A system configured to produce a man-made cloud and deliver the man-made cloud into the troposphere, the system being operable in conjunction with an airborne vessel, the system comprising:
    a fanning subsystem including an intake and an output, wherein the intake is configured to take in:
        (i) oxygen and hydrogen, wherein the oxygen and hydrogen are ignited to produce aerosol,
        wherein the output is configured to output:
        (i) the aerosol produced from the oxygen and the hydrogen water,
    and wherein the fanning subsystem is further configured to transport the aerosol from the fanning subsystem into an air tube;
    the air tube having a first end and a second end, wherein the first end is arranged at or near the fanning subsystem, wherein the air tube is configured to transport the aerosol from the first end through the air tube to the second end, wherein the second end is disposed into the troposphere by coupling the second end to the airborne vessel while the airborne vessel is flying, wherein the aerosol, upon exiting the air tube at the second end, produces the man-made cloud such that precipitation from the man-made cloud is delivered downwind.

* * * * *